United States Patent [19]

Inamoto et al.

[11] Patent Number: 5,610,688
[45] Date of Patent: Mar. 11, 1997

[54] IMAGE FORMING APPARATUS HAVING ILLEGAL USE PREVENTION

[75] Inventors: Kiyoshi Inamoto, Sakai; Masao Miyaza, Osaka; Yasuhiro Nakai, Kyoto, all of Japan

[73] Assignee: Sharp Kabushiki Kaisha, Osaka, Japan

[21] Appl. No.: 333,348

[22] Filed: Nov. 2, 1994

[30] Foreign Application Priority Data

Nov. 5, 1993 [JP] Japan .................................. 5-276596
Nov. 11, 1993 [JP] Japan .................................. 5-282822

[51] Int. Cl.$^6$ .................................................. G03G 21/00
[52] U.S. Cl. ............................ 399/366; 399/15; 399/81
[58] Field of Search .................................. 355/201, 202, 355/208, 203–209; 356/71; 382/181; 371/22.4, 22.1, 24

[56] References Cited

U.S. PATENT DOCUMENTS

| | | | |
|---|---|---|---|
| 3,997,873 | 12/1976 | Thornton | 340/149 R |
| 4,105,156 | 8/1978 | Dethloff | 235/441 |
| 4,974,172 | 11/1990 | Nakai | 364/521 |
| 5,138,618 | 8/1992 | Honda et al. | 371/16.4 |
| 5,214,699 | 5/1993 | Monroe et al. | 380/23 |
| 5,283,422 | 1/1994 | Storch et al. | 235/375 |
| 5,430,525 | 7/1995 | Ohta et al. | 355/201 |
| 5,480,239 | 1/1996 | Kim et al. | 400/120.09 |

FOREIGN PATENT DOCUMENTS

| | | |
|---|---|---|
| 0342060A | 11/1989 | European Pat. Off. . |
| 0506469A | 9/1992 | European Pat. Off. . |
| 0506332A | 9/1992 | European Pat. Off. . |
| 1285978 | 11/1989 | Japan . |
| 1-285978 | 11/1989 | Japan . |
| 1-316783 | 12/1989 | Japan . |
| 2-83571 | 3/1990 | Japan . |
| 2083571 | 3/1990 | Japan . |
| 4-205272 | 7/1992 | Japan . |
| 4-302267 | 10/1992 | Japan . |
| 4-294682 | 10/1992 | Japan . |
| 5139641 | 6/1993 | Japan . |
| 6-60165 | 3/1994 | Japan . |
| 6-70134 | 3/1994 | Japan . |

OTHER PUBLICATIONS

"Die Neuen Fernkopierer HF2020 und HF2021"; 2323 Telcom Report, vol. 7, No. 5, Sep. 1984, Munich Germany, pp. 305–309.

*Primary Examiner*—Thu A. Dang

[57] ABSTRACT

An image forming apparatus stores an ID number input through an auditor in a memory section when a paper money judging section judges that image data obtained from an image reading section is the image data of paper money. With this structure, the fact that an attempt to perform counterfeiting was made is known by reading out the ID number stored in the memory section. In this case, since it is understood that a counterfeiter knew a specific ID number, the counterfeiter can be detected from a limited number of people. It is thus possible to take some measures to prevent recurrence of counterfeiting by, for example, enhancing the inspection of the image forming apparatus and giving a warning to the counterfeiter.

58 Claims, 31 Drawing Sheets

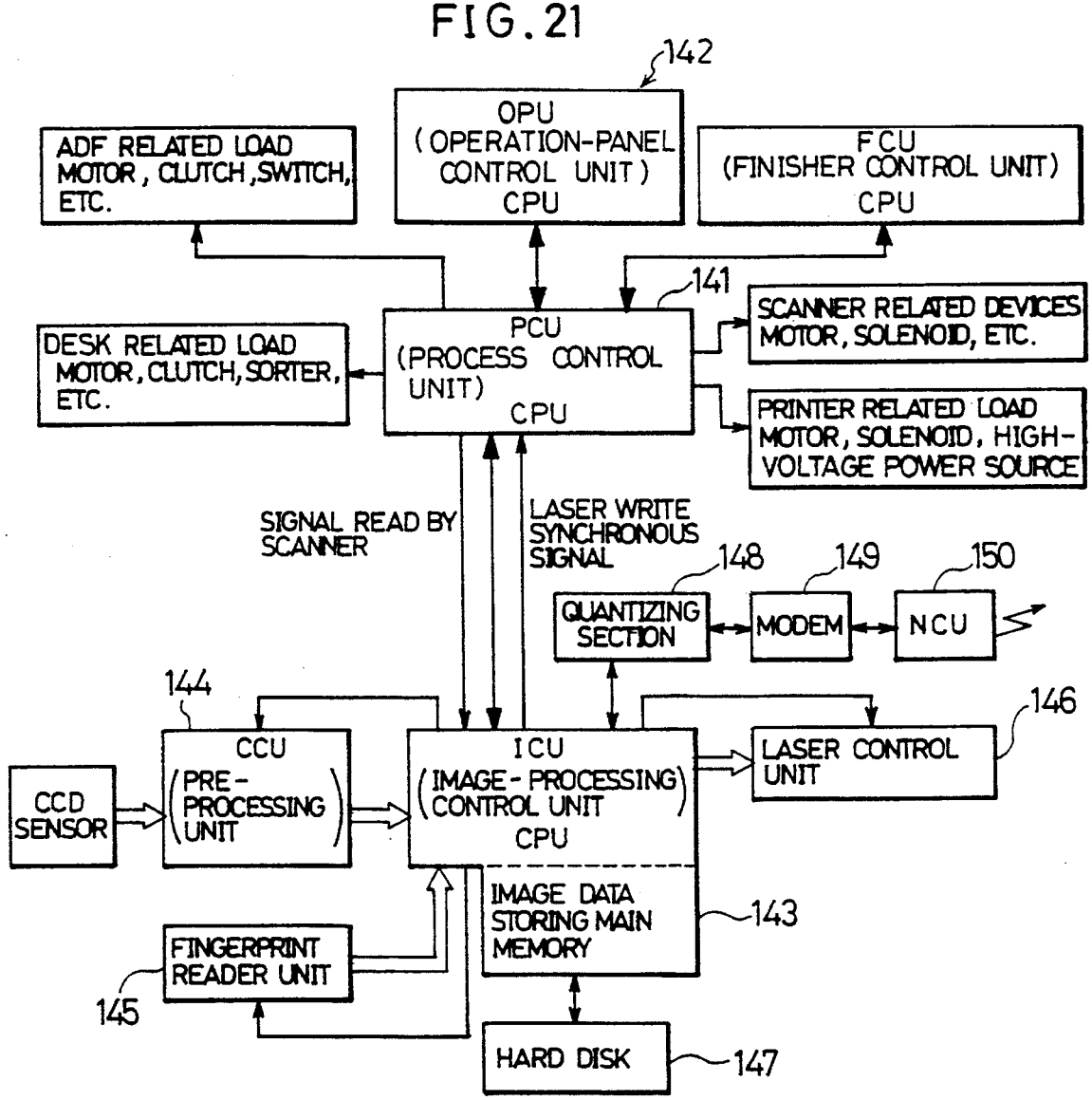

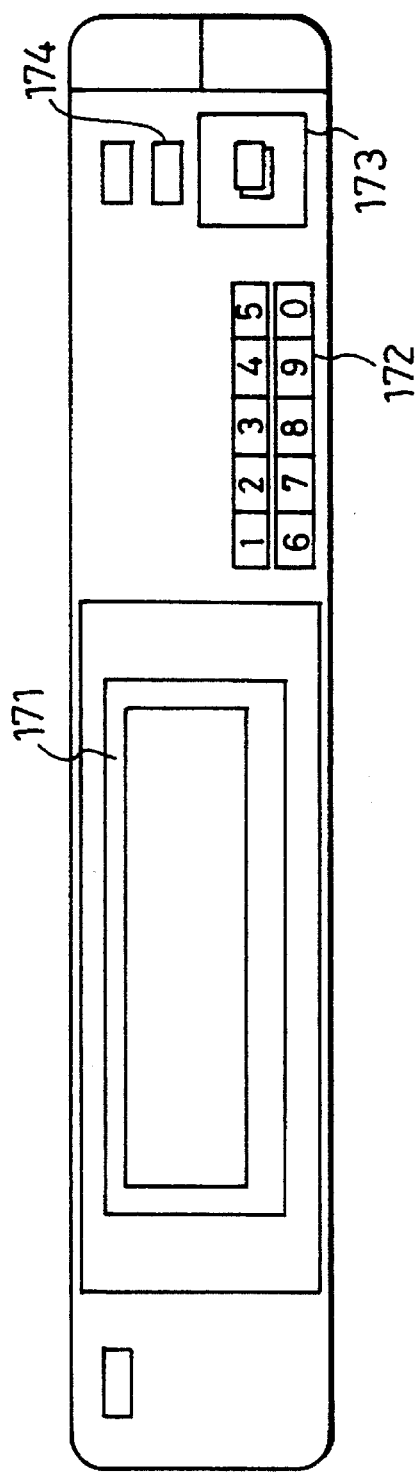
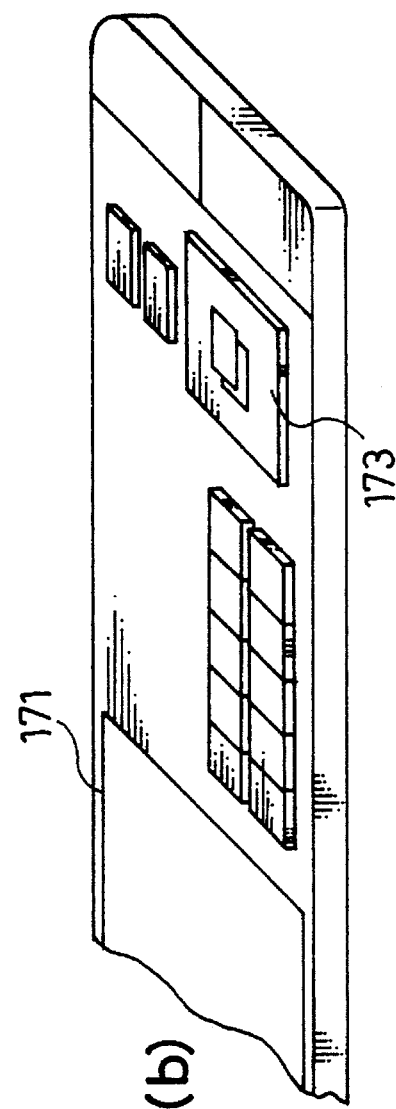
FIG.22(a)
FIG.22(b)

FIG. 25(a) BASIC SCREEN

FIG. 25(b) FUNCTION SETTING SCREEN 1

FIG. 25(c) FUNCTION SETTING SCREEN 2

FIG. 25(d) IMAGE-QUALITY SETTING SCREEN

FIG. 25(e) POST-PROCESSING SETTING SCREEN

FIG. 25(f) SLOPING SETTING SCREEN

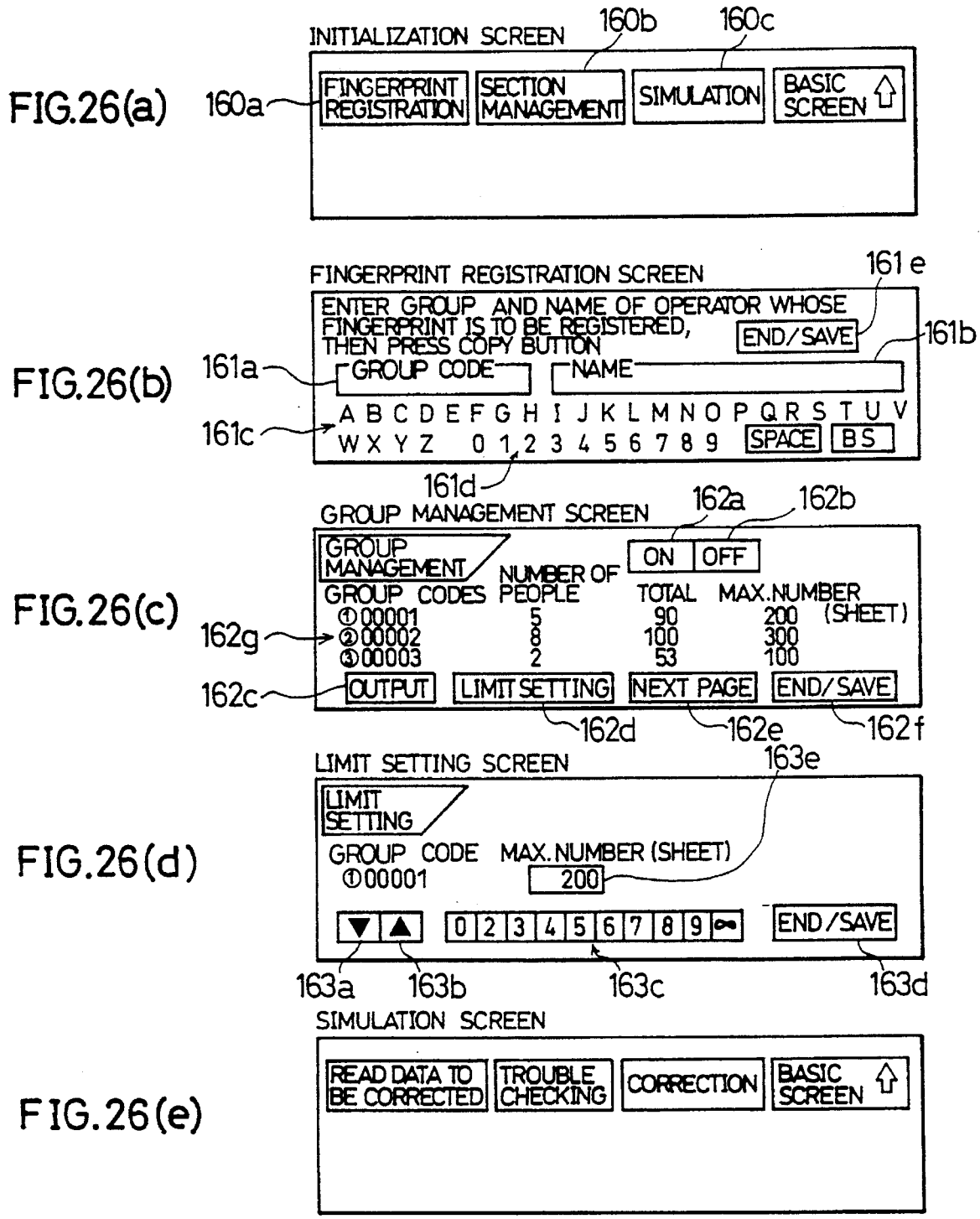

IMAGE FORMING APPARATUS HAVING ILLEGAL USE PREVENTION

FIELD OF THE INVENTION

The present invention relates to an image forming apparatus, such as a color copying machine and a color scanner, for reading images on, for example, a document and outputting the images.

BACKGROUND OF THE INVENTION

In recent years, image forming apparatuses such as full-color copying machines have been developed and widely used. Since these image forming apparatuses produce highly precise reproductions of original images, they may be used for the crime of counterfeiting paper money and securities, for example. In order to prevent such a crime, the following apparatuses have been developed. These apparatuses, for instance, stop copying operations when a copying-prohibited document such as paper money is detected, and prints a particular mark, which has been given to a copying machine, on a copy of the document image so that the copying machine used for producing the copy is identified from the mark on the copy.

For example, apparatuses performing the former function are disclosed in the following documents. Japanese Publication for Unexamined Patent Application No. 83571/1990 and No. 285978/1989 teach apparatuses which store patterns of copying-prohibited documents such as paper money and become inoperable when a document to be copied has one of the patterns stored. Japanese Publication for Unexamined Patent Application No. 205272/1992 and No. 316783/1989 disclose apparatuses which, if a document to be copied is detected as paper money, prints the whole portion corresponding to paper money in deep black or halftone when outputting a copy of the document. The apparatuses which perform the latter function are disclosed in the following documents. Japanese Publication for Unexamined Patent Application No. 294682/1992 and No. 302267/1992 teach apparatuses which print a pattern unique to a copying machine in unnoticeable color or a unique feature of the copying machine, for example, the product number when outputting a copy of the document image.

However, although the above-mentioned conventional structures can prevent a crime, it is impossible to effectively identify the person who committed the socially punishable crime, such as counterfeiting paper money. Hence, the conventional apparatuses can not perfectly prevent counterfeiting of paper money.

SUMMARY OF THE INVENTION

It is an object of the present invention to provide an image forming apparatus capable of effectively preventing its use for illegal purposes, for example, of counterfeiting paper money.

In order to achieve the above object, an image forming apparatus of the present invention includes:
(1) memory means;
(2) image reading means for reading an image on a document and converting the image into image data;
(3) image printing means for forming an image on a sheet based on the image data;
(4) identification-information input means for inputting operator identification information for identifying an operator;
(5) operation controlling means for storing pre-registered operator identification information and controlling the image printing means to form an image only when operator identification information input by an operator coincides with the pre-registered operator identification information;
(6) image processing means for processing the image data for comparison with a specific image;
(7) specific-image judging means for judging whether the image data is the specific image based on an output from the image processing means; and
(8) memory controlling means for storing operation status information including at least the operator identification information in the memory means when the image data obtained from the document is judged the specific image.

With this structure, since the operation controlling means controls the image printing means to form an image only when operator identification information input by an operator coincides with the pre-registered operator identification information, only an operator who has the pre-registered operator identification information is able to perform image forming operations with the image forming apparatus. Moreover, with this structure, when an image read by the image reading means was judged a specific image of, for example, paper money or securities, i.e, when an attempt to counterfeit such a specific image was made, operation status information including at least the input operator identification information is stored in the memory means. Therefore, if a manager or a service engineer of the image forming apparatus reads out the operation status information from the memory means, the fact that an attempt to perform counterfeiting was made is known. For instance, it is possible to detect the counterfeiter from a range of people who know the operator identification information, based on the operator identification information stored as operation status information in the memory means. As a result, the manager of the image forming apparatus can take some measures to effectively prevent recurrence of counterfeiting by, for example, enhancing the inspection of the image forming apparatus and giving a warning to an operator who is suspected of being the counterfeiter.

In addition, with the structure where the operation controlling means judges whether operator identification information input by an operator through the identification information input means coincides with the operator identification information stored in the memory means, and prohibits the image printing means from forming an image when the input operator identification information coincides with the stored operator identification information, it is possible to surely prevent an operator who has made an attempt to perform counterfeiting from executing counterfeiting action again using the image forming apparatus.

With this structure, if the operation controlling means is arranged to prohibit only a predetermined operation among the image forming operations, i.e., an operation which is likely to be used for a counterfeiting operation, it is possible to reduce recurrence of counterfeiting paper money while minimizing the inconvenience of a user. For instance, the predetermined image forming operation means performs an image forming operation executed in a full-color mode for faithfully reproducing the color of a document, a photograph mode for faithfully reproducing the contrast of a document image by giving priority to the gradations of the document image, or a double-sided copy mode for copying images on both sides of a document onto both sides of a sheet. It is also possible to produce the same effects by limiting an available number of sheets having images thereon to be output to a predetermined number, or prohibiting an image from being formed on a sheet supplied from a manual sheet feed section designed for feeding sheets of a desired size.

With the structure where the memory controlling means stores the date and time when an attempt to perform counterfeiting was made, the number of copies to be output by the counterfeiting operation, the size of and the image data of an image used as an original in the counterfeiting action as operation status information together with the operator identification information in the memory means, it is possible to obtain detailed information about the counterfeiting action. Thus, recurrence of counterfeiting operation is effectively prevented. Moreover, by including data compressing means for compressing the image data of the image to be counterfeited or character-area separating means for separating only a character area from the image data, it is possible to reduce such a problem that necessary data can not be stored due to a shortage of the storage capacity of the memory means.

If the memory means is constructed by a non-volatile memory or a volatile memory having a backup power source, it is possible to prevent data about the counterfeiting action stored in the memory means from being lost when supply of power is cut off, thereby improving the reliability of the image forming apparatus.

With the structure where initialization permitting means is provided for judging whether to permit inputting of an instruction to erase the operation status information from the memory means and where erasing of the operation status information is executed only by an instruction of an operator permitted to input such an instruction by the initialization permitting means, it is possible to effectively prevent the operation status information from being erased by mistake or by the counterfeiter's intention.

With the structure where initialization permitting means determines whether an instruction to erase the operation status information is effective or not and where the operation status information is erased only when the initialization permitting means determines that the instruction is effective, the above-mentioned effect is also produced.

The image forming apparatus may also include:
(1) specific-image judging means having a first criterion and a second criterion, for judging whether the image data is the specific image based on the first criterion, and further judging whether the image data is the specific image based on the second criterion when the image data is judged different from the specific image based on the first criterion, the second criterion being less severe than the first criterion so that the image data is more likely to be judged identical to the specific image based on the second criterion;
(2) operation controlling means for prohibiting forming an image when the specific-image judging means judges that the image data is the specific data based on the first criterion;
(3) memory controlling means for storing operation status information including at least the operator identification information in the memory means when the specific-image judging means judges that the image data is the specific image based on the second criterion;
(4) identification-information judging means for judging whether operator identification information input by an operator through the identification-information input means coincides with the operator identification information stored in the memory means; and
(5) criteria controlling means for changing the first criterion to be closer to the second criterion when the identification-information judging means judges that the input operator identification information coincides with the operator identification information stored in the memory means.

With this structure, it is possible to restrict a document which does not have the specific image from a wrongly judged document having the specific image and to surely prevent recurrence of counterfeiting the specific image while minimizing the inconvenience of an operator.

The image forming apparatus may also include:
(1) receiving means for receiving image data which was transmitted together with operator identification information from an external device through communication means by an operator; and
(2) identification-information judging means for judging whether the operator identification information received by the receiving means together with the image data coincides with the operator identification information stored in the memory means.

In this image forming apparatus, if the operation controlling means is designed to prohibit the image printing means from forming an image when the identification-information judging means judges that the received operator identification information coincides with the stored operator identification information, it is possible to surely prevent recurrence of counterfeiting the specific image based on the data received from the external device. Moreover, with the structure where the operator identification information and the image data are input to the image forming apparatus from an external device, for example, a host device connected to the image forming apparatus, is is possible to perform the image forming operation without requiring the operator to directly input the operator identification information to the image forming apparatus. It is thus possible to manage the image forming apparatus by the external device, and to handle the apparatus in an improved manner.

The image forming apparatus may also include:
image reading means for reading an image on a document and converting the image into image data;
transmitting means for transmitting the image data to an external device through communication means; and
operation controlling means for prohibiting the image reading means from reading an image when the identification-information judging means judges that the input operator identification information coincides with the operator identification information stored in the memory means. This structure surely prevents the specific image read by the image forming apparatus from being counterfeited using an external device.

The image forming apparatus may also include:
transmitting means for transmitting data to an external device through communication means; and
transmission controlling means for controlling the transmitting means to transmit the operation status information to the external device when the specific-image judging means judges that the image data obtained from a document is the specific image. With this structure, by monitoring the image forming apparatus, the fact that counterfeiting is taking place can be immediately known. Consequently, for example, the manager and the security guards of the image forming apparatus can swiftly take some measures, surely preventing counterfeiting.

The image forming apparatus may also include:
(1) fingerprint reading means for reading a fingerprint of an operator;
(2) management-information storage means in which a fingerprint of an operator and at least which group the operator belongs to are registered as operator management information;

(3) fingerprint comparing means for judging whether an operator is a registered operator based on a fingerprint of the operator read by the fingerprint reading means and the registered operator management information in the management-information storage means, and judging a group to which the operator belongs based on the operator management information when the operator is judged the registered operator; and (4) operation controlling means for permitting the operator to start an operation in a predetermined operation mode to which the group to which the operator belongs is allowed to access. With this structure, the group to which the operator belongs is judged based on the fingerprint read by the fingerprint reading means, and the operator is permitted to execute an operation only in the operation mode to which the group has been allowed to access. This structure prevents people other than the registered operators from unjustly using the image forming apparatus. Moreover, since the operator is identified by the fingerprint, it is possible to prevent an unregistered operator from unjustly obtaining a password or an ID card and using the image forming apparatus.

The image forming apparatus may also include:

specific-image judging means for judging whether image data obtained from a document is a specific image;

memory controlling means for storing operation status information including at least the fingerprint of the operator in the memory means when the specific-image judging means judges that the image data is the specific image; and output controlling means for controlling the image output means to generate an output image by adding a predetermined pattern, for example, a pattern of scattered toner spots to the image data when the specific-image judging means judges that the image data is the specific image. With this structure, since the specific image having thereon the added predetermined pattern is output, the output image is not considered as a real image. It is thus possible to surely prevent counterfeiting the specific image. Additionally, since the counterfeiter can be determined based on the fingerprint, recurrence of counterfeiting is effectively prevented.

With the structure where the fingerprint reading means includes an optical sensor installed in a switch which is to be depressed by an operator when instructing the start of the image forming operation, since the fingerprint is read when the switch which is to be depressed for performing operations is depressed, the operator may not feel uncomfortable even when his fingerprint is being read. Unlike the entry of a password or the insertion of an ID card, an extra action is not required. Thus, the image forming apparatus is operated in a simplified manner.

The image forming apparatus may also include:

transmitting means for transmitting a warning to an external security system through communication means; and transmission controlling means for controlling the transmitting means to transmit the warning to the security system when the specific-image judging means judges that the image data is the specific image. With this structure, counterfeiting is prevented by activating the external security system.

The image forming apparatus may also include:

password input means through which an operator inputs a password;

password comparing means for judging whether a password input by an operator coincides with a predetermined password; and operation controlling means for permitting the operator to activate a management-information registration mode for registering operator management information of the operator only when the password comparing means judges that the input password coincides with the predetermined password. With this structure, it is possible to prevent an operator who does not know the predetermined password from unjustly registering operator management information such as fingerprints, and perfectly preventing counterfeiting from taking place.

Furthermore, with the structure where a fingerprint of a service engineer has been stored as special operator management information distinguishably from operator management information of ordinary operators and where the operation controlling means is constructed to permit an operator, who was judged the service engineer by the fingerprint comparing means based on the fingerprint of the operator read by the fingerprint reading means and the special operator management information, to activate a simulation mode to which only the service engineer are allowed to access, the service engineer can activate the simulation mode without performing an extra action. It is therefore possible to prevent ordinary operators from activating the simulation mode by mistake. In addition, unlike a conventional device, since there is no need to perform complicated operations for activating the simulation mode, it is possible to reduce the work of the service engineer.

The image forming apparatus may also include:

output means for outputting a sheet having thereon a formed image;

counting means for counting a total number of sheets output by the output means for each group;

upper limit setting means for setting a maximum number of sheets allowed to be output by each group; and operation controlling means for prohibiting an operator belonging to a group which has output the set maximum number of sheets from performing an image forming operation. With this structure, since the number of output sheets having a formed image thereon can never exceed the set maximum number, it is possible to prevent the cost of image formation from exceeding a predetermined budget set for each group.

For a fuller understanding of the nature and advantages of the invention, reference should be made to the ensuing detailed description taken in conjunction with the accompanying drawings.

BRIEF DESCRIPTION OF THE DRAWINGS

FIG. 21 is a schematic block diagram of control sections of a digital copying machine according to still another embodiment of the present invention.

FIGS. 22(a) and 22(b) are explanatory views of an operation panel of the copying machine, FIG. 22(a) showing a front view of the operation panel, FIG. 22(b) being a partial perspective view thereof.

FIGS. 25(a) to 25(f) are explanatory views showing examples of a display state of screens.

FIGS. 26(a) to 26(e) are explanatory views showing further examples of a display state of screens.

DESCRIPTIONS OF THE PREFERRED EMBODIMENTS

[EMBODIMENT 1]

The following description discusses one embodiment of the present invention with reference to FIGS. 1 to 4.

Figure 2:
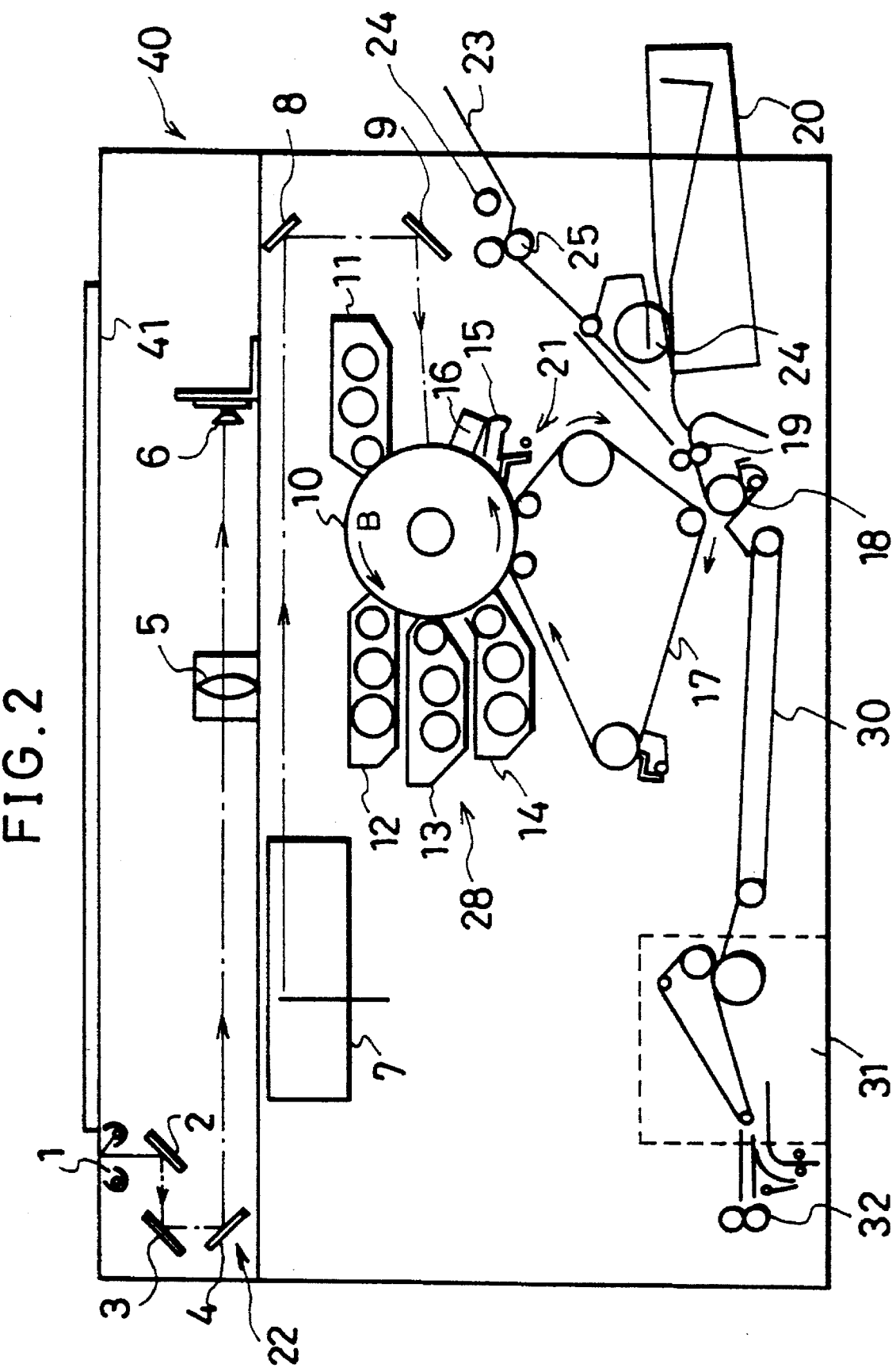
FIG. 2 is a cross section schematically showing an overall structure of the copying machine.

As illustrated in FIG. 2, a digital color copying machine (hereinafter referred to as the copying machine) 40 as an image forming apparatus of this embodiment includes a document platen 41 made of a hard transparent glass on an upper part thereof. Disposed under the document platen 41 is a scanner 22 including a lamp unit 1, mirrors 2, 3 and 4, a lens unit 5, and a CCD sensor (charge coupled device) 6. In the scanner 22, the lamp unit 1 illuminates an image on a document (not shown) placed on the document platen 41, and reflected light from the document is guided to a light receiving surface of the CCD sensor 6 through the mirrors 2, 3 and 4 and the lens unit 5 so as to convert the image into electric signals.

A laser driver unit 7 is disposed under the scanner 22. The document data which has been converted into electric signals by the CCD sensor 6 is processed in an image-data processing section, to be described later, for processing an image for copying. Then, the laser driver unit 7 emits laser light according to the input document data by, for example, driving a light source such as a semiconductor laser included therein.

The laser light emitted by the laser driver unit 7 is reflected by mirrors 8 and 9 disposed on the light path, and is directed to a photoreceptor drum 10 which rotates in the direction of arrow B so as to form an electrostatic latent image on the photoreceptor drum 10. Mounted on the periphery of the photoreceptor drum 10 is a charger 16. A surface of the photoreceptor drum 10 is charged to a predetermined potential by the charger 16 before being exposed to the laser light.

Moreover, a developing device 28, a transfer belt 17, a cleaning device 21, and a charge-removing lamp 15 are arranged in this order from the transfer charger 16 along a rotating direction of the photoreceptor drum 10. The developing device 28 develops the electrostatic latent image on the photoreceptor drum 10 into a toner image by supplying toner thereto. As to be described later, the transfer belt 17 temporarily copies the toner image on the photoreceptor drum 10 to a sheet. The cleaning device 21 removes toner remaining on the surface of the photoreceptor drum 10. The charge-removing lamp 15 removes residual charges on the photoreceptor drum 10 prior to the next charging operation.

The development device 28 includes a black developer container 11, a yellow developer container 12, a magenta developer container 13, and cyan developer container 14 which store black, yellow, magenta and cyan toner, respectively. The transfer belt 17 is endless and movable in the direction of arrows. Since a part of the transfer belt 17 is pressed against the photoreceptor drum 10, the toner image on the photoreceptor drum 10 is transferred to the transfer belt 17.

Disposed on a sheet feed side seen from the transfer belt 17 are a register roller 19, a sheet feed cassette 20 and a manual sheet feed section 23 for timely supplying a sheet to the transfer belt 17. A feed roller 24 and a transport rollers 25 for transporting a sheet are provided in the vicinity of the sheet feed cassette 20 and the manual sheet feed section 23. Also, provided under the transfer belt 17 is a transfer roller 18 which presses a sheet fed from the register rollers 19 against the transfer belt 17 for transferring the toner image on the transfer belt 17 to the sheet.

A transport belt 30, a fixing device 31 and discharge rollers 32 are disposed on a sheet discharge side when seen from the transfer belt 17. The fixing device 31 fuses the toner image onto the sheet. The discharge rollers 32 discharge the sheet carrying the fused toner image thereon from the machine.

With this structure, a color copy (three-color copy) is produced through the following sequence of operations. First, when the transfer charger 16 uniformly charges the surface of the photoreceptor drum 10, the scanner 22 performs first scanning. At this time, yellow data is generated in the image-data processing section according to document data (R, G, and B) received by the CCD sensor 6. The yellow data is output as laser light by the laser driver unit 7. A yellow electrostatic latent image is formed on an area of the surface of the photoreceptor drum 10 exposed to the laser light. Subsequently, yellow toner is supplied from the yellow developer container 12 to the electrostatic latent image so as to form a yellow toner image.

Next, the yellow toner image is transferred to the transfer belt 17 pressed against the photoreceptor drum 10. At this time, some toner is not transferred and remains on the surface of the photoreceptor drum 10. Such remaining toner is scraped by the cleaning device 21. The charge-removing lamp 15 removes charges remaining on the photoreceptor drum 10.

When the above-mentioned sequence of operations are complete, the transfer charger 16 again uniformly charges the surface of the photoreceptor drum 10, and the scanner 22 performs second scanning. The document data thus obtained is output as magenta data from the image-data processing section, and output as laser light to the photoreceptor drum 10 by the laser driver unit 7 so as to form a magenta electrostatic latent image. Subsequently, magenta toner is supplied from the magenta developer container 13, and a magenta toner image is formed on the photoreceptor drum 10.

Then, the magenta toner image is transferred and superimposed on the yellow toner image on the transfer belt 17. Thereafter, the cleaning device 21 and the charge-removing lamp 15 perform the operations described above. Next, the transfer charger 16 uniformly charges the photoreceptor drum 10, and the scanner 22 performs third scanning. Cyan data is generated in the image-data processing section in a manner similar to the above, and output as laser light to form a cyan electrostatic latent image on the photoreceptor drum 10. Cyan toner is supplied from the cyan developer container 14 to the photoreceptor drum 10 so as to form a cyan toner image. The cyan toner image is transferred onto the magenta toner image on the transfer belt 17. As a result, three color images of yellow, magenta and cyan are superimposed.

The superimposed toner image on the transfer belt 17 is transferred to the sheet by the transfer roller 18, fused by the fixing device 31, and discharged from the copying machine 40 by the discharge rollers 32.

The above-mentioned sequence of processes is programmed for the production of a three-color copy. When making a four-color copy, a process using black toner in the black developer container 11 is added to the sequence. A black-and-white copy is produced by supplying black toner from the black developer container 11 to an electrostatic latent image and transferring the toner image to a sheet through the transfer belt 17.

Figure 3:
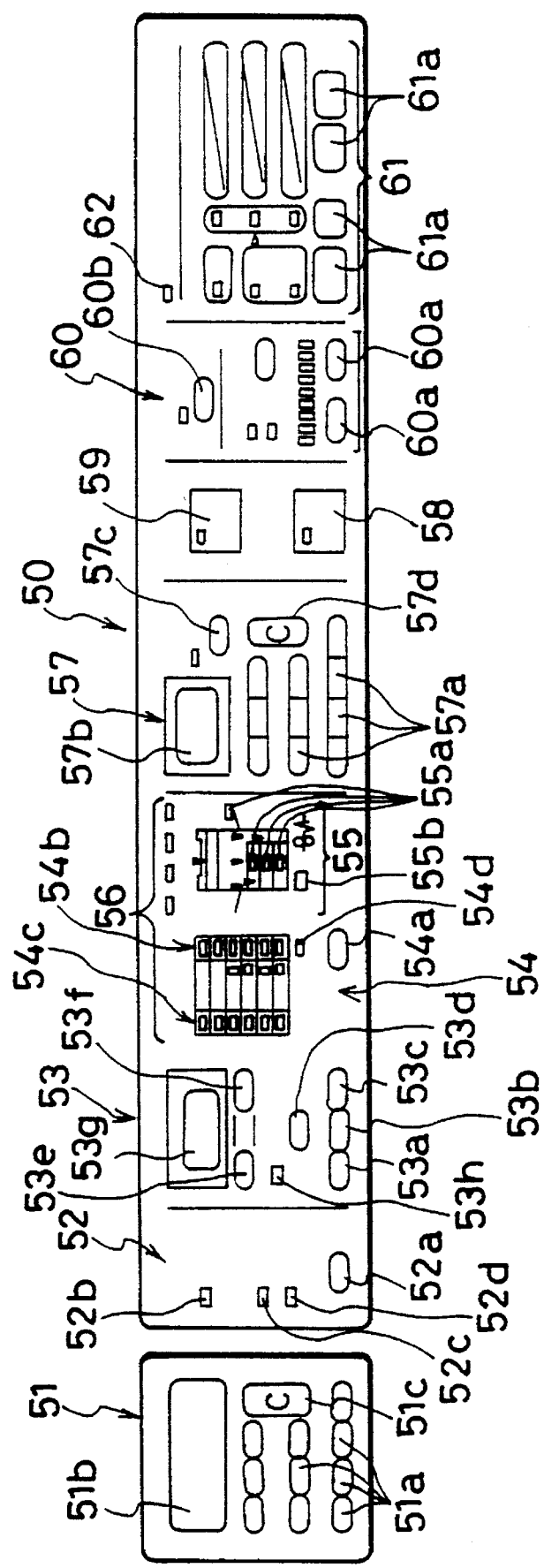
FIG. 3 is a front view of an operation panel of the copying machine.

The copying machine 40 is provided with a operation panel 50 shown in FIG. 3. An auditor 51 for inputting an ID number is provided on one end of the operation panel 50. An ID number is an identification number which identifies a person or a group in a company who is allowed to use the copying machine 40. An ID number is input using numeral keys 51a representing the numbers 0–9. In the copying machine 40, copying is carried out only when a number which is input using the numeral keys 51a is identical to an ID number registered in a memory of the copying machine 40.

The auditor 51 includes a display section 51b and a clear key 51c. The display section 51b displays a total number of copies produced by a person or a group identified by the ID number. The clear key 51c is an input key which is depressed after finishing a copying operation so as to change a copying available state which has been set by the entry of the ID number into a copying prohibiting state. More specifically, when the clear key 51c is depressed, the copying machine 40 enters into a copying prohibiting state. In this state, even when copying start keys 58 and 59 are depressed, copying is not performed unless an ID number is again entered. The number of copies produced in the copying machine 40 is separately totaled for each ID number by a counter, not shown, in the copying machine 40, and displayed on the display section 51b when a counter display mode is selected. This information is, for example, used as billing information to an individual group. The functions of the auditor 51 have been known and practically carried out.

The operation panel 50 has a copying mode selecting section 52, a copy size selecting section 53, a size display section 54, a selected-tray and paper-jam-location indicating section 55, a warning display section 56, a copy number setting section 57, a black-and-white copying start key 58, a color copying start key 59, a copy density and mode setting section 60, a balance and contrast adjusting section 61 and a paper money detection lamp 62. These sections are arranged in this order from an end of the auditor 51 toward the opposite end.

The copying mode setting section 52 has an automatic double-side copying selecting key 52a. The copying machine 40 performs the function to automatically process both a document and a copy sheet for double-sided copying. Specifically, by successively depressing the automatic double-side copying selecting key 52a, a desired mode is selected from a mode in which a double-sided copying is produced from a single-sided document (i.e., a mode in which single-sided documents are copied onto both sides of a copy sheet), a mode in which a double-sided copy is produced from a double-sided document, a mode in which single-sided copies are produced from a double-sided document, and a mode in which a single-sided copy is produced from a single-sided document. When the copying machine 40 is switched on, the mode in which a single-sided copy is produced from a single-sided document is initially selected. When other modes are selected, the corresponding indicator lamps 52b, 52c and 52d are turned on.

The magnification setting section 53 includes a reduction key 53a, a life-size copy key 53b, an enlargement key 53c, an automatic magnification selecting key 53d, a reduction zoom key 53e, an enlargement zoom key 53f, and a magnification indicating section 53g. The reduction key 53a is provided so that relatively frequently used reduction rates, for example, 86%, 81%, 70%, 50%, and 86% are cyclically selected in this order by repeatedly depressing the reduction key 53a. If the life-size copy key 53b is depressed, the magnification is set to 100%. The enlargement key 53c is provided so that relatively frequently used enlargement rates, for example, 115%, 122%, 141%, 200%, and 115% are cyclically selected in this order by repeatedly depressing the enlargement key 53c. The reduction zoom key 53e and the enlargement zoom key 53f decreases and increases the magnification of a copy by 1%, respectively, every time they are depressed. A magnification rate set using these keys is displayed on the magnification indicating section 53g.

The automatic magnification selecting key 53d is provided to select the automatic magnification selecting mode. When the automatic magnification selecting mode is selected, the indicator lamp 53h is turned on. In the automatic magnification selecting mode, a suitable reduction or enlargement rate is automatically calculated from a detected document size and a currently selected sheet size, and set. The detected document size and the currently selected sheet size are displayed on the size display section 54. The automatic magnification selecting mode is cancelled by depressing any of the magnification setting keys 53a, 53b, 53c, 53e, and 53f.

The size indicating section 54 includes a sheet selecting key 54a, a sheet size indicating section 54b, a document size indicating section 54c, and an indicator lamp 54d. A desired sheet size is cyclically selected by repeatedly depressing the sheet selecting key 54a. When the power switch is turned on, the automatic sheet selecting mode is initially selected, and a suitable sheet is selected according to a detected document size and a selected magnification rate. When the automatic sheet selecting mode is selected, the indicator lamp 54d is turned on. This mode is cancelled by depressing the sheet selecting key 54a, and a manual sheet selecting mode is selected. The manual feed section 23, the sheet feed cassette 20 shown in FIG. 2, an intermediate tray and a lower tray in a sheet feed mechanism (not shown) in a lower part of the copying machine 40 are selected by turns by repeatedly depressing sheet selecting key 54a. A selected state is indicated by a tray indicator lamp 55a in the selected-tray and paper-jam-location indicating section 55. The size of sheets stored in the selected tray is indicated by the sheet size indicating section 54b of the size indicating section 54. At this time, if the selected tray stores no sheet, an empty lamp 55b is turned on. If the sheet selecting key 54a is depressed when the lower tray is selected, the automatic sheet selecting mode is again selected. The selected-tray and paper-jam-location indicating section 55 includes a lamp for indicating the occurrence of a paper jam, and a lamp for indicating the location of the paper jam.

The warning display section 56 includes a lamp for indicating the need for periodical maintenance, a lamp for indicating the need for developer replacement, a lamp for indicating that a waste toner developer container is full, and a lamp for indicating the need for supplying toner. When the developer replacement lamp and the toner supply lamp are turned on, the corresponding lamps among lamps indicating toner colors, i.e., Y, M, C and B are also switched on.

The copy number setting section 57 includes copy number setting keys 57a, and a copy number indicating section 57b. The number of copies to be produced is selected from the numbers 1 to 99. The copy number setting section 57 includes an interrupting key 57c for letting a copying operation to be preferentially carried out when another copying operation is in progress, and a clear key 57d. When the interrupting key 57c is depressed, a indicator lamp is turned on to indicate that the interruption mode is selected. At this time, the copy number, magnification rate, modes set for the copying operation which started before the interrupting key 57c was depressed is retained in an internal memory. In the interruption mode, if the interrupting key 57c is depressed after setting a desired copy number and a desired magnification rate and performing interrupting copying, the indicator lamp is turned off to indicate the cancellation of the interruption mode. Then, all the settings return to the state before the interruption mode was selected, and therefore the interrupted copying is easily restarted.

The black-and-white copying start key 58 is provided to start the process of producing a black-and-white copy, while the color copying start key 59 is provided to start the process of producing a color copy. When the production of each copy is available, the corresponding indicator lamp is turned on. On the other hand, when copying is prohibited, the indicator lamp is turned off so that an operator is informed of this state. Copying is prohibited when copying requirements of the copying machine 40 are not satisfied, for example, when the fusing temperature has not been raised to a sufficient temperature and when supply of toner is necessary because of shortage of toner. Copying is also prohibited when paper jam or trouble occurs and when an ID number input is not identical to the registered ID number.

The copy density and mode setting section 60 includes a copy density setting key 60a and a photograph mode selecting key 60b. The copy density setting key 60a is used for adjusting the copy density when the copy density is to be manually set. The photograph mode selecting key 60b is used to select a photograph mode. When the photograph mode selecting key 60b is depressed, an indicator lamp is turned on to indicate that the photograph mode is selected. In the photograph mode, the image is processed so that the gradation of the document takes priority over the clearness of characters and lines to produce a natural copy of the photograph document. However, the resolution of characters and fine lines is slightly lowered compared to the resolution thereof in the normal copy mode.

The balance and contrast adjusting section 61 includes keys 61a for adjusting the balance and contrast among the respective colors in a color copy. A mode to be adjusted is selected from the density balance among colors, the contrast of the entire image and the contrast among colors, and a color to be adjusted is selected from blue, green and red by depressing desired keys among the keys 61a. Blue, green and red represent yellow, magenta, and cyan, respectively. Then, adjustment is carried out.

When a paper-money judging section 75, to be described later, detects a document which is seemingly paper money, the paper money detection indicator lamp 62 indicates that various data including the ID number, the date and time of copying, and the document image is stored in the internal memory.

The following description explains the steps of producing a copy in the copying machine 40.

First, a document is placed on a predetermined position on the document platen 41, and an ID number is input by depressing numeric keys 51a of the auditor of the operation panel 50. Then, the indicator lamps of the black-and-white copying start key 58 and the color copying start key 59 are turned on to indicate that copying is available. In this state, a desired number of copies to be produced, a desired magnification rate, and desired modes are set. Thereafter, the color copying start key 59 or the black-and-white copying start key 58 is depressed depending on whether a full-color copy or a black-and-white copy is to be produced. Subsequently, the lamp unit 1 performs preliminary scanning while illuminating the document. In this state, copying process has not been started, and a document size is detected to prepare for copying. According to the result of the detection, a lamp of the document size indicating section 54c is turned on. At this time, a paper money detecting function is performed to judge whether the document is paper money or not. According to the result, the following operations are carried out.

Figure 4:
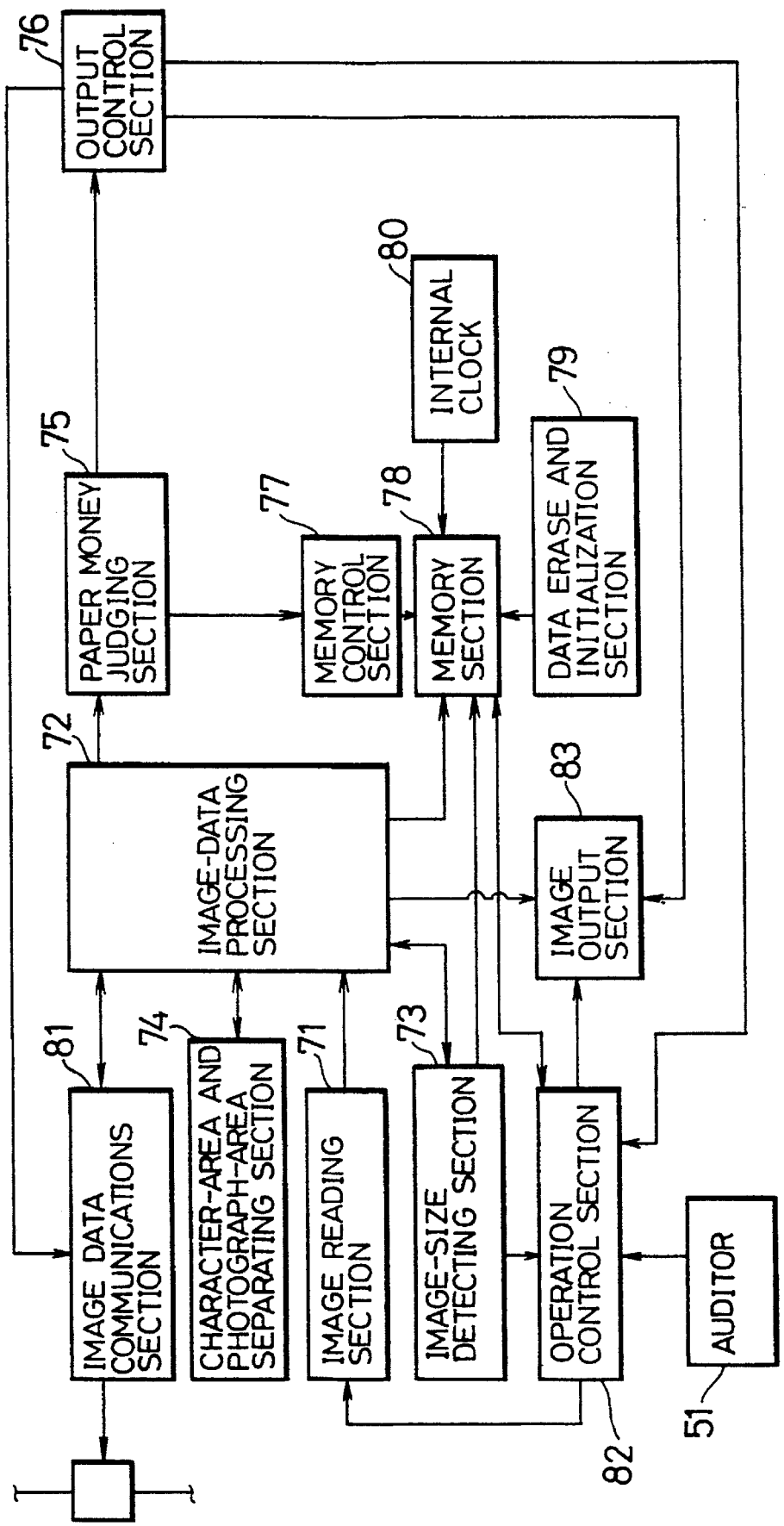
FIG. 4 is a block diagram showing a structure of the counterfeiting preventive device.

As illustrated in the block diagram of FIG. 4, the copying machine 40 is provided with a counterfeiting preventive device including various processing sections which are composed mainly of microcomputers. More specifically, the counterfeiting preventive device includes an image reading section 71, an image-data processing section 72, an image-size detecting section 73, a character-area and photograph-area separating section 74, the paper-money judging section 75, an output control section 76, a memory control section 77, a memory section 78, a data erase and initialization section 79, an internal clock 80, an image data communications section 81, an operation control section 82, an image output section 83, and the auditor 51.

The image reading section 71 includes the scanner 22 and an A/D converter. The image reading section 71 reads an image on the document and converts it into image data in the form of digital signals. The image-data processing section 72 is composed of a plurality of blocks and performs various image processing necessary for printing, such as color correction, on the image data input from the image reading section 71. The image output section 83 finally outputs the image data processed by the image-data processing section 72 onto a sheet as a printed image. With the structure shown in FIG. 2, the image output section 83 is constructed by the members located under the scanner 22.

The image-size detecting section 73 obtains information at the stage of the intermediate processing of the image data input to the image-data processing section 72 so as to detect a size of the document image. The size of the document image is detected during preliminary scanning performed prior to scanning of the document for producing a copy. The result is sent to the operation control section 82. The detected document size is indicated by the document size indicating section 54c of the size indicating section 54 shown in FIG. 3, and used for selecting a sheet, for example. The image-data processing section 72 distinguishes the image area of the document from other according to the result of detection.

The character-area and photograph-area separating section 74 obtains the information at the stage of the intermediate processing of the image data input to the image-data processing section 72, and separates the document image into an area including characters and fine lines and other area. According to this information, the image-data processing section 72 performs edge enhancement image processing on the characters and fine lines so as to achieve high resolution, and performs image processing on other area so as to obtain natural gradations.

The paper-money judging section 75 stores the image pattern of paper money, and detects whether the document is paper money or not by comparing the image pattern of the document with the image patterns of paper money using the information obtained from the image-data processing section 72 during preliminary scanning. In the comparison of image patterns, characteristic features of the document image are extracted and whether they match the characteristic features of the image of paper money or not are detected. When the document is detected as paper money by the paper-money judging section 75, the output control section 76 instructs the image output section 83 and the image data communications section 81 to perform predetermined operations. At this time, the memory control section 77 stores necessary information about the image of the document as paper money in the memory section 78. The memory section 78 is a volatile memory which loses data stored therein when the power supply is turned off or a non-volatile memory which retains data even when the power supply is turned off. When the memory section 78 is the volatile memory, the data stored therein are backed up by a power supply such as a battery, not shown.

Data erase and initialization section 79 erases and initializes the data stored in the memory section 78. The internal clock 80 outputs the date and time of copying. The image data communications section 81 transmits and receives data including an ID number and the image data of a document to/from an external device.

The operation control section 82 controls the operations of the copying machine 40 according to inputs entered through the keys on the operation panel 50 shown in FIG. 3. For example, the operation control section 82 stores pre-registered ID numbers, and judges whether an ID number input through the auditor 51 is identical to one of the ID numbers stored therein. When the input ID number matches the stored ID number, the operation control section 82 permits the copying machine 40 to perform copying. On the other hand, when the input ID number does not match the stored ID number and when the ID number is cleared after copying, the operation control section 82 stops the image reading section 71 and the image output section 83 from operating, thereby prohibiting copying.

Figure 1:
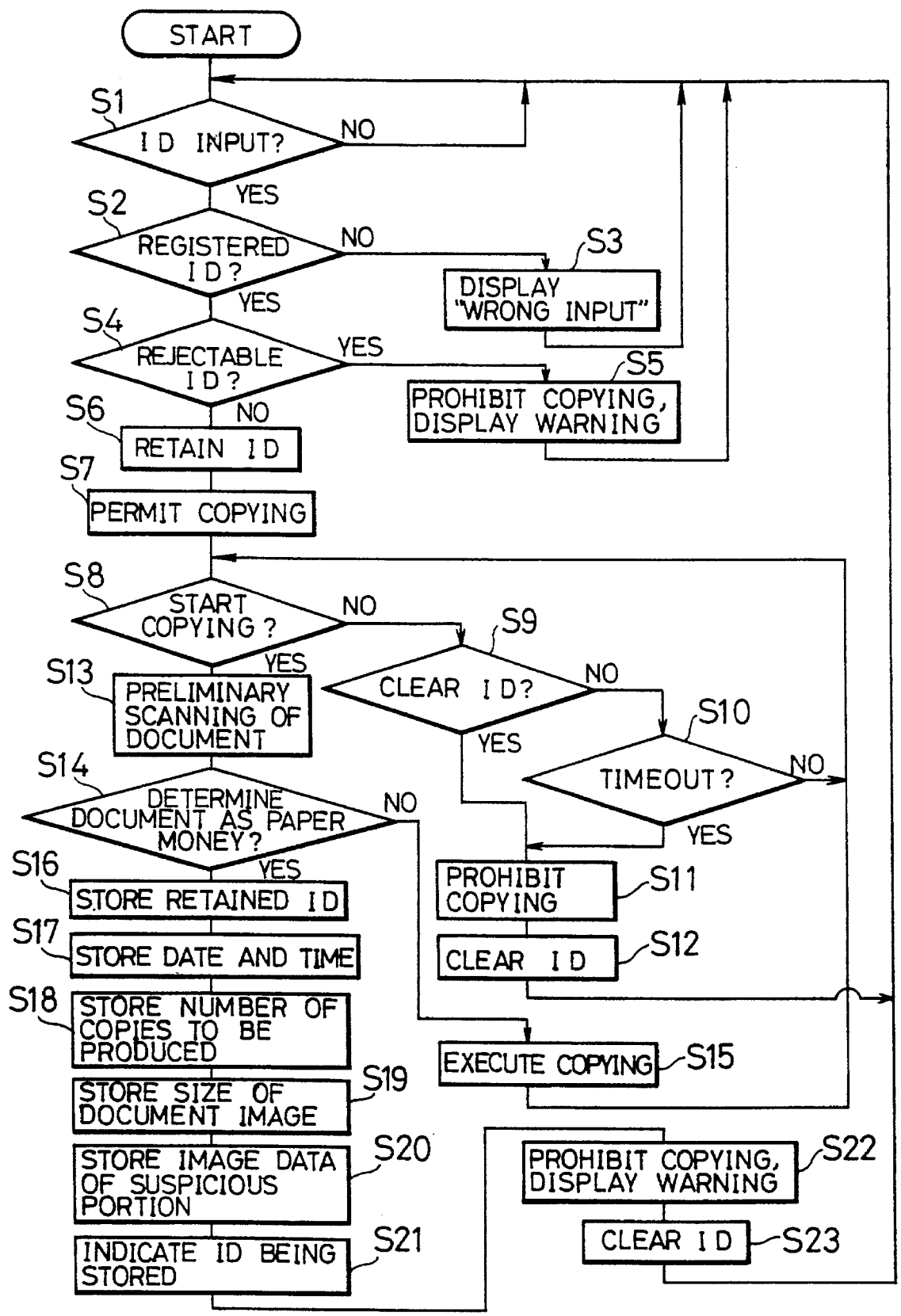
FIG. 1 is a flowchart of the operation of a counterfeiting preventive device of a digital color copying machine (image forming apparatus) according to one embodiment of the present invention.

Referring now to the flowchart of FIG. 1, the operation of the counterfeiting preventive device shown in FIG. 4 is explained based on the above-mentioned structure.

When the copying machine 40 is on standby, copying is prohibited. Namely, the image reading section 71 and the image output section 83 are stopped from operating. In this state, when an operator inputs an ID number through the numeric keys 51a of the auditor 51 shown in FIG. 3 (step 1), the operation control section 82 judges whether or not the ID number is identical to one of a plurality of pre-registered ID numbers (step 2). If the result is NO, the operation control section 82 judges that the input is false, and a warning message such as "false input" is displayed on the display section 51b of the auditor 51 (step 3). Then, the operation returns to step 1.

On the other hand, if the result is YES, the operation control section 82 judges whether the input ID number matches a rejectable ID number which is stored as a rejectable number in the memory section 78 (step 4). If the result of the judgement is YES, copying is prohibited and a warning message such as "copying unavailable" is displayed on the display section 51b of the auditor 51 (step 5). Whereas, if the result of the judgement is NO, the input ID number is retained (step 6) and copying is permitted (step 7). Namely, the image reading section 71 and the image output section 83 are set operable.

The operation control section 82 permits the copying operation and simultaneously starts a timer therein in step 7, and observes whether the black-and-white copying start key 58 or the color copying start key 59 is depressed (step 8). If the clear key 51c of the auditor 51 is depressed (step 9) or if the timer counts a predetermined time (step 10) when neither of the copying start keys 58 and 59 is depressed, copying is prohibited (step 11), the retained ID number is cleared (step 12), and the operation returns to step 1.

If there is no request to clear the ID number in step 9 and if one of the copying start keys 58 and 59 is depressed in step 8 before the timer finishes counting of the predetermined time in step 10, the operation control section 82 controls the image reading section 71, i.e., the scanner 22 to perform preliminary scanning of the document on the document platen 41 prior to the copying operation (step 13). As a result, the image data of the document is input to the image-data processing section 72. Subsequently, the image-data processing section 72 performs image processing on image data to recognize a copy-prohibited document as a specific image, for example, paper money, and image processing to execute the copying operation. The image-size detecting section 73 detects a size of the document image from the image data obtained from the image-data processing section 72.

The paper-money judging section 75 judges if the document is paper money or not (step 14) by comparing the pattern of the image data of the document obtained from the image-data processing section 72 with the pattern of the image data of paper money which is stored in advance. If the result is NO, the output control section 76 permits the image output section 83 to operate, and copying of the document is performed (step 15).

On the other hand, if the result of the judgement is YES, the memory control section 77 stores the ID number retained in the operation control section 82 as a rejectable ID number (step 16). The memory control section 77 also controls the memory section 78 to store the date and time shown by the internal clock 80 (step 17), the number of copies to be produced set in the copy number setting section 57 (step 18), the size of document image detected by the image-size detecting section 73 (step 19), and the image data of a portion of the document which is suspected as being of paper money and from which the document is judged as paper money in the paper-money judging section 75 (step 20). The operation control section 82 switches on the paper money detection lamp 62 to indicate that the ID number has been stored (step 21) according to then instruction from the output control section 76. The output control section 76 stops the image output section 83 from operating, while the operation control section 82 controls the display section 51b of the auditor 51 to display a warning message such as "document is paper money" (step 22) according to the instruction from the output control section 76. Then, the retained ID number is cleared (step 23).

As described above, with the structure of this embodiment, the copying prohibited state is cancelled when an input ID number matches a pre-registered ID number that permits the use of the copying machine 40. When the document image read is judged paper money, i.e., when an attempt to counterfeit paper money is made, the input ID number is stored in the memory section 78 and the copying operation is prohibited, thereby preventing counterfeiting of paper money.

As described above, since the ID number is stored, the attempt to counterfeit paper money is recorded. Therefore, for example, a manager or a service engineer of the copying machine 40 can know the attempt to counterfeit paper money by reading out the data stored in the memory section 78. Additionally, since this case proves that a person who has tried to counterfeit paper money knew the ID number, it is possible to detect the person from a limited range of people. Hence, the manager of the copying machine can more strictly supervise the machine and use means for giving warning, thereby preventing recurrence of counterfeiting paper money.

Moreover, as described above, by storing the date and time the attempt to counterfeit paper money is made as well as the ID number, the counterfeiter is more easily identified. Furthermore, by storing the entered number of copies to be produced in the memory section 78, whether a large number of paper money was attempted to be counterfeited or not is known and the scale of the attempted counterfeiting operation is estimated. These functions thus prevent recurrence of counterfeiting paper money.

Additionally, as described above, by storing the size of the document image as well as the ID number in the memory section 78 when an attempt to counterfeit paper money is made, it is possible to identify the counterfeiter. It is also possible to accurately judge whether the copying operation which was judged a counterfeiting action was really attempted to counterfeit paper money based on the size of document image stored. Also, by storing in the memory section 78 the data of a portion of the image data which was suspected of being paper money and from which counterfeiting was judged together with the ID number, it is possible to identify the counterfeiter and to accurately judge whether the copying operation suspected of being a counterfeiting action was really attempted to counterfeit paper money based on the stored data.

In this counterfeiting preventive device, when an ID number which is identical to a rejectable ID number stored in the memory section 78 is entered, copying is prohibited, and the auditor 51 displays a warning on the display section 51b to actively warn the counterfeiter. This structure definitely prevents recurrence of counterfeiting paper money. Displaying a warning is controlled by the operation control section 82, and a warning may be given by a buzzer.

As described above, if copying is prohibited when the entered ID number is identical to the stored rejectable ID number, people who, for example, work in the same section of a company and use the same ID number as the counterfeiter are also stopped from using the copying machine 40. In order to overcome such a drawback, the copying machine 40 includes a data erase and initialization section 79 which enables the manager of the copying machine 40 to erase the data stored in the memory section 78 after reading out the rejectable ID number. After erasing the data by the data erase and initialization section 79, the warning is cancelled and the copying machine 40 is used normally by entering an ID number. Next, how to operate the data erase and initialization section 79 is discussed below.

In general, an internal memory such as the memory section 78 in the copying machine 40 stores not only data related to prevention of counterfeiting paper money, but also the counts indicating the number of copies produced for billing individual sections in the company, the counts for noting the timing of replacement of expendable supplies and of maintenance, adjustment data about copy quality and the operations of the copying machine 40 which has been adjusted by a service engineer, and setting data including settings related to the machine operation which has been set and stored by an operator. In order to read out or correct these data, a simulation mode is selected instead of the normal copy mode.

The copying machine 40 is operated in the simulation mode by following a special procedure which is different from a normal procedure for performing a copying operation. For example, the power switch is turned on while depressing a specific key, for example, an interruption key 57c on the operation panel 50 shown in FIG. 3, and the interruption key 57c is kept pressed for one second after the power switch is turned on. With this procedure, when the power switch is turned on, the copying machine 40 is operated in the simulation mode, and data is read and written in the memory section 78 using the keys and the display section of the operation panel 50. When the power switch is turned off after the data is read and written, the set data is retained in the memory section 78 and the settings become effective.

For example, when reading out and erasing the data stored in the memory section 78, first a predetermined two digit number is entered through the copy number setting keys 57a of the copy number setting section 57 in the simulation mode so as to select a correction to be made in the simulation. The input number is displayed on the copy number display section 57b. The two-digit number represents the content of the correction. For example, if "90" represents reading of information relating to counterfeiting paper money stored after judgement and if "91" represents erasing of the stored information, "90" is entered using the copy number setting key 57a and then the color copying start key 59 is depressed to indicate the completion of input. Subsequently, the stored rejectable ID number and other information are printed on a sheet and output. When the clear key 57d is depressed after the output of the information is complete, the copying machine 40 returns to a state for waiting an input of a simulation number. In this state, when a two-digit number representing specific information is depressed, the information corresponding to the entered number is erased from the memory section 78. However, in the data erase and initialization section 79, even if a number "91" corresponding to the information relating to counterfeiting paper money is entered, this information is not erased.

More specifically, in the case where anyone can freely erase the information relating to counterfeiting paper money stored in the memory section 78 by moving into the simulation mode, if a potential counterfeiter knows the procedure for operating the copying machine 40 in the simulation mode, he can easily access the information in the memory section 78 and use the copying machine 40. Therefore, in the data erase and initialization section 79, the above-mentioned procedure is not carried out or effective without a special tool, or the procedure is not effective unless an additional special procedure is carried out.

For example, a key which is possessed by only the manager of the copying machine 40 or the service engineer is used as the special tool. In this case, for instance, a keyhole is provided in a section which is exposed when a lid which covers the inner parts of the copying machine 40 is opened. If the number "91" is entered when the key is put into the keyhole, the information relating to the counterfeiting paper money is erased.

Regarding the additional special procedure to be carried out, for example, the step of entering a password may be added. In this case, when the number "91" is entered and the color copying start key 59 is depressed in the simulation mode, a message requesting the password is displayed on the copy number display section 57b. In this state, when a pre-registered password is entered using the copy number setting keys 57a, the entry of the number "91" becomes effective and the information relating to the counterfeiting paper money is erased. Meanwhile, when a wrong password is input, a warning is displayed on the copy number display section 57b, the entry of the number "91" becomes ineffective, and the information is retained without being erased.

In this counterfeiting preventive device, whether or not an ID number is stored in the memory section 78 is at least indicated by the paper money detection indicator lamp 62. Therefore, the manager or the service engineer of the copying machine 40 can promptly know such a fact that an attempt to counterfeit paper money was made and that the used ID number was stored in the memory section 78. It is thus possible to swiftly deal with the attempted counterfeiting of paper money.

Moreover, it is not necessarily to install the paper money detection indicator lamp 62 on the operation panel 50. If the disclosure of a fact that the paper money detection indicator lamp 62 is turned on is unwanted, the paper money detection indicator lamp 62 may be installed somewhere inside the copying machine 40 which is covered when a repair lid of the copying machine 40 is closed.

Furthermore, in this embodiment, when the paper-money judging section 75 judges the document is paper money, the memory section 78 stores various information including the date and time, the entered copy number to be produced, the size of document image, the image data of a portion of the document suspected of being paper money as well as the entered ID number. However, it is not necessary to store all the information as long as the ID number is stored. It is also possible to store the ID number, or to store a kind or several kinds of information among the various information in addition to the ID number.

[EMBODIMENT 2]

Figure 5:
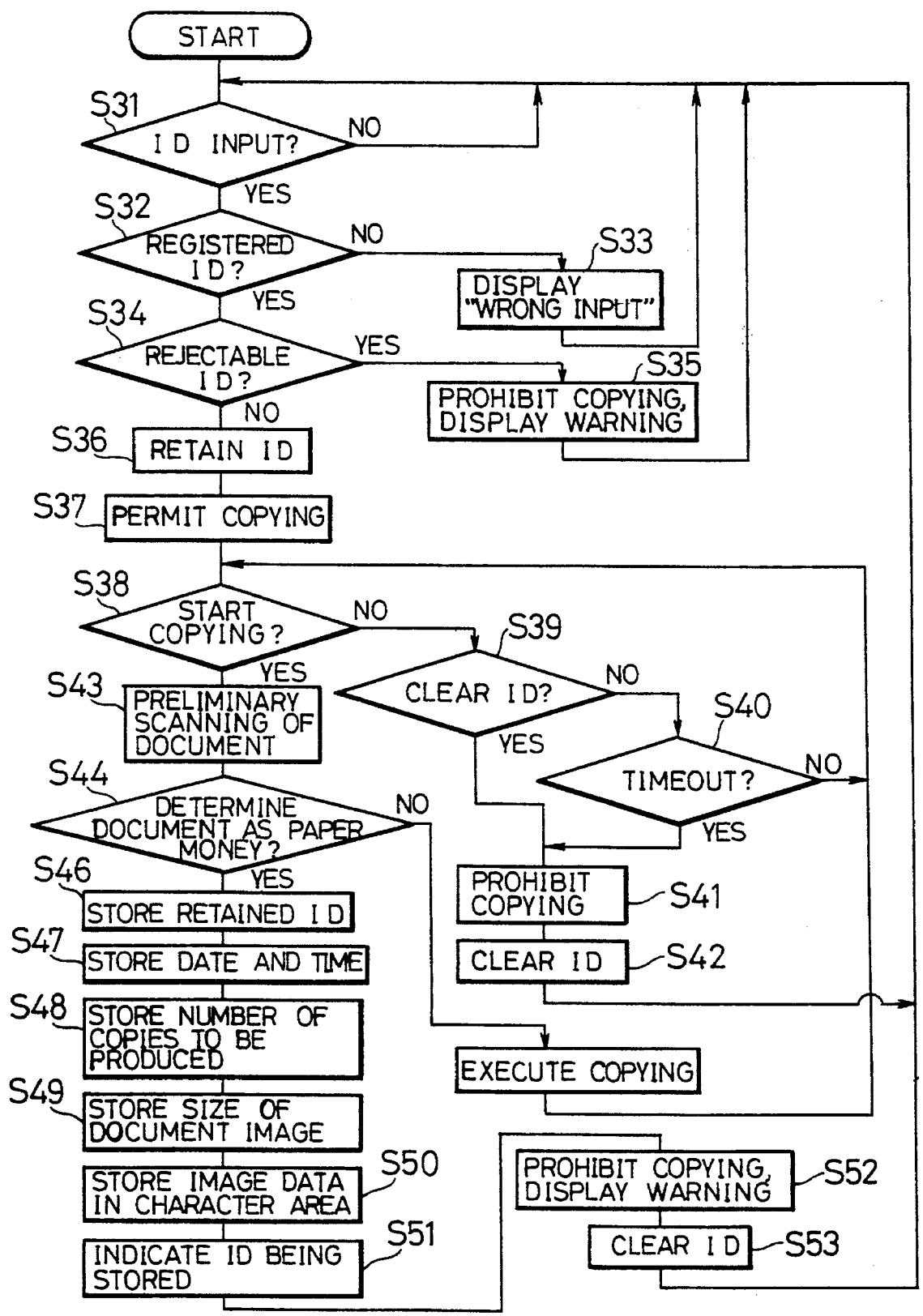
FIG. 5 is a flowchart showing operations of a counterfeiting preventive device according to another embodiment of the present invention.

The following description discusses another embodiment of the present invention with reference to FIGS. 1, 4 and 5. The members having the same function as in the above-mentioned embodiment will be designated by the same code and their description will be omitted. The same is also said to all the embodiments described below.

The copying machine 40 of this embodiment includes a counterfeiting preventive device which has the structure shown in FIG. 4 and performs the sequence of operations shown in FIG. 5. As described above, in order to achieve higher resolution and better gradation, the character-area and photograph-area separating section 74 shown in FIG. 4 obtains information at the stage of the intermediate processing of the image data input to the image-data processing section 72 and separates the document image into an area having characters and fine lines and other areas.

In the operations of the counterfeiting preventive device shown in FIG. 5, when the document is judged paper money (step 44), the memory control section 77 stores in the memory section 78 only the data of the character area among the image data of the document (step 50), instead of the image data of a portion of the document image which is suspected of being paper money in step 20 of FIG. 1.

As described above, in the counterfeiting preventive device of this embodiment, when an attempt to counterfeit paper money is made, the image data of the photograph area whose volume is large is ignored, and only the image data of the character area whose volume is small is stored together with the ID number in the memory section 78. It is thus possible to reduce such a trouble that necessary image data is not stored because of a shortage of the memory capacity of the memory section 78.

The operations of steps 31 to 53 except the operation of step 50 shown in FIG. 5 are the same as those of steps 1 to 23 except the operation of steps 20 shown in FIG. 1. Regarding other functions, the counterfeiting preventive device of this embodiment performs the same functions as those in EMBODIMENT 1.

[EMBODIMENT 3]

Figure 6:
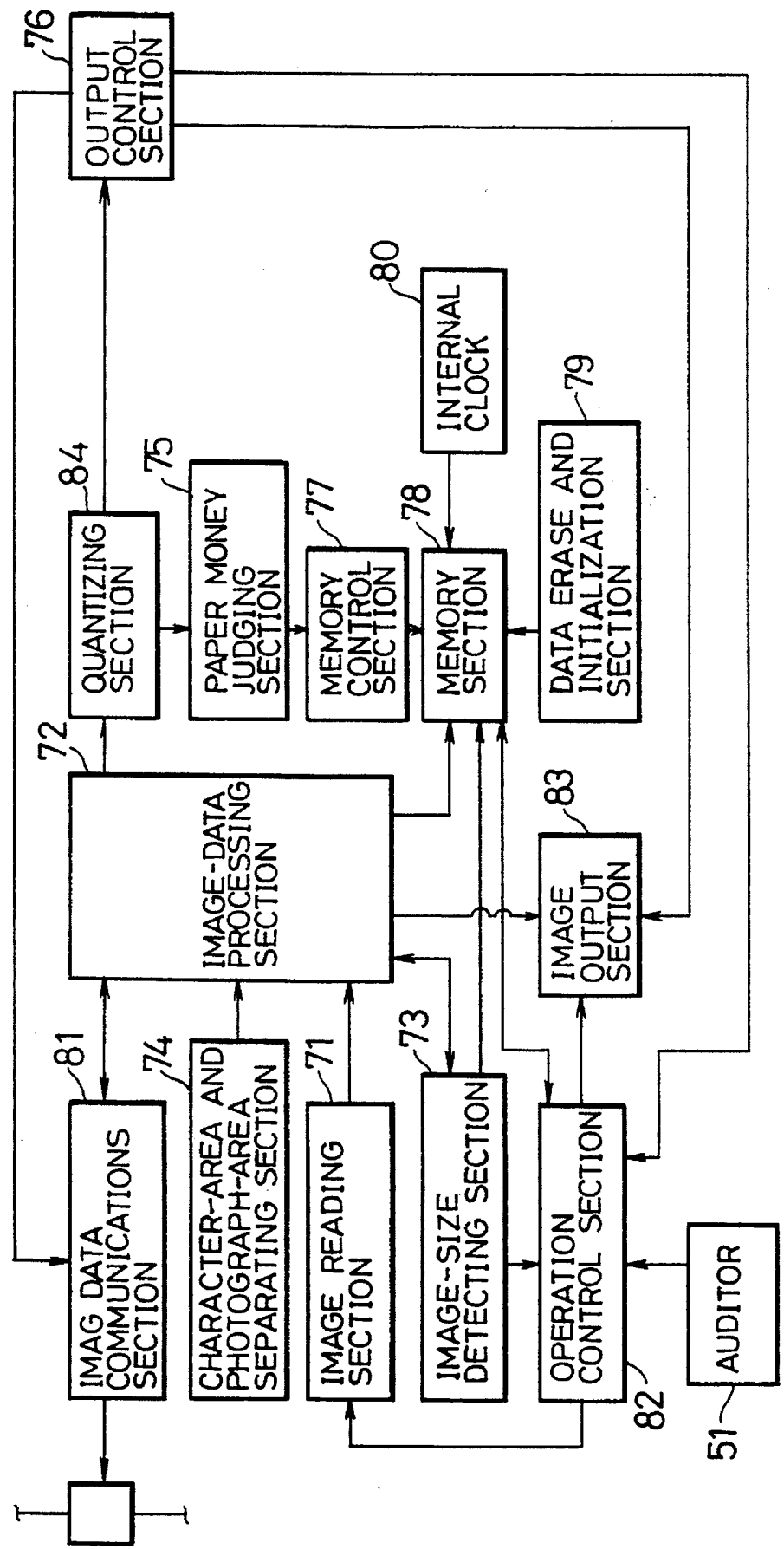
FIG. 6 is a block diagram showing a structure of a counterfeiting preventive device according to still another embodiment of the present invention.
Figure 7:
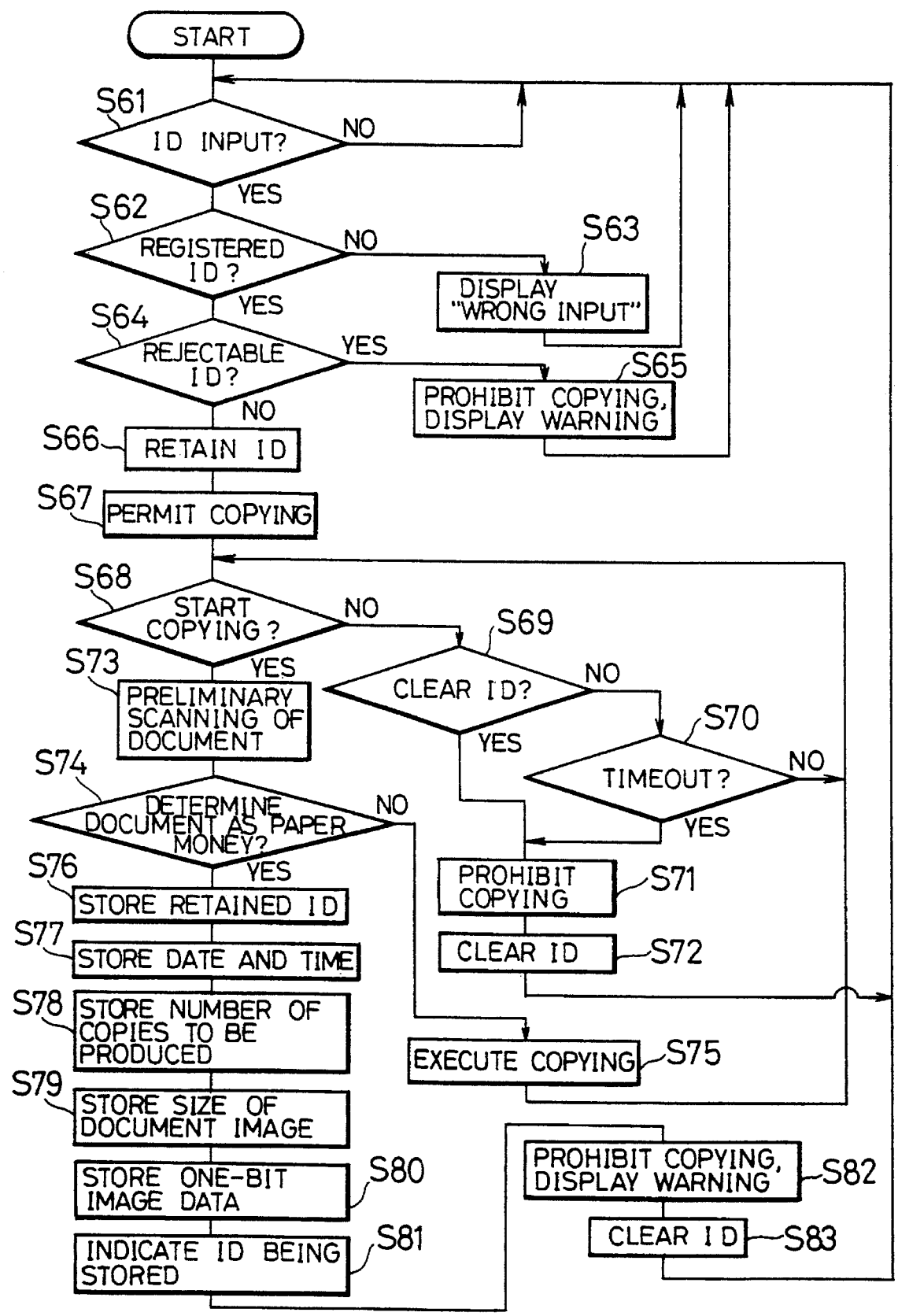
FIG. 7 is a flowchart showing operations of the counterfeiting preventive device of FIG. 6.

The following description discusses still another embodiment of the present invention with reference to FIGS. 1, 6 and 7.

The copying machine 40 of this embodiment incorporates a counterfeiting preventive device which has the structure shown in FIG. 6 and performs the sequence of operations shown in FIG. 7. As illustrated in FIG. 6, an image-data to one-bit quantizing section 84 receives information at the stage of intermediate processing of the image data of the document input to the image-data processing section 72, and compresses the image data by quantizing the image data into one bit.

Converting the image data into one bit performed in the image-data to one-bit quantizing section 84 is generally carried out during image reading by scanners in facsimile machines and word processors. For example, the gradation of one dot of a document which is represented by 8 bits is represented by one bit by quantizing the image data to one bit, thereby reducing the memory capacity required in the memory section to one eighth.

The simplest method for quantizing image data into one bit represents image densities in the document exceeding a predetermined threshold value as black and image densities below the threshold value as white. Although this method is suitable for processing a character document, it is not suitable for processing half-tone documents such as photograph and pictorial images. Paper money is of this type, the dither method and the error diffusing method are generally used when processing such a half-tone document. The dither method is known by a relatively simple algorithm. Although this method is suitable for processing half-tone images, line images are not so good. The error diffusing method is suitable for processing both half-tone images and line images, and often used in recent years. The image-data to one-bit quantizing section 84 is required to represent whether an image is paper money or not by a binary number when printing the image data stored in the memory section 78. Considering the balance of the image quality and the costs, the image-data to one-bit quantizing section 84 quantifies the image data to one bit by selecting one of the methods.

In the operations of the counterfeiting preventive device shown in FIG. 7, when the document is judged paper money (step 74), the memory control section 77 controls the image data of the document which has been quantized to one bit by the image-data to one-bit quantizing section 84 to be stored (step 80) instead of the image data of a portion of the document image which is suspected of being paper money in step 20 shown in FIG. 1.

As described above, in the counterfeiting preventive device of this embodiment, when an attempt to counterfeit paper money was made, the image data of the document which has been quantized to one bit is stored in the memory section 78 together with the ID number. It is therefore possible to reduce such a trouble that the image data can not be stored due to a shortage of the memory capacity of the memory section 78.

The operations in steps 61 to 83 except step 80 of FIG. 7 are the same as those in steps 1 to 23 except step 20 of FIG. 1. Regarding other functions, the counterfeiting preventive device of this embodiment performs the same functions as those carried out by the counterfeiting preventive device of EMBODIMENT 1.

[EMBODIMENT 4]

Figure 8:
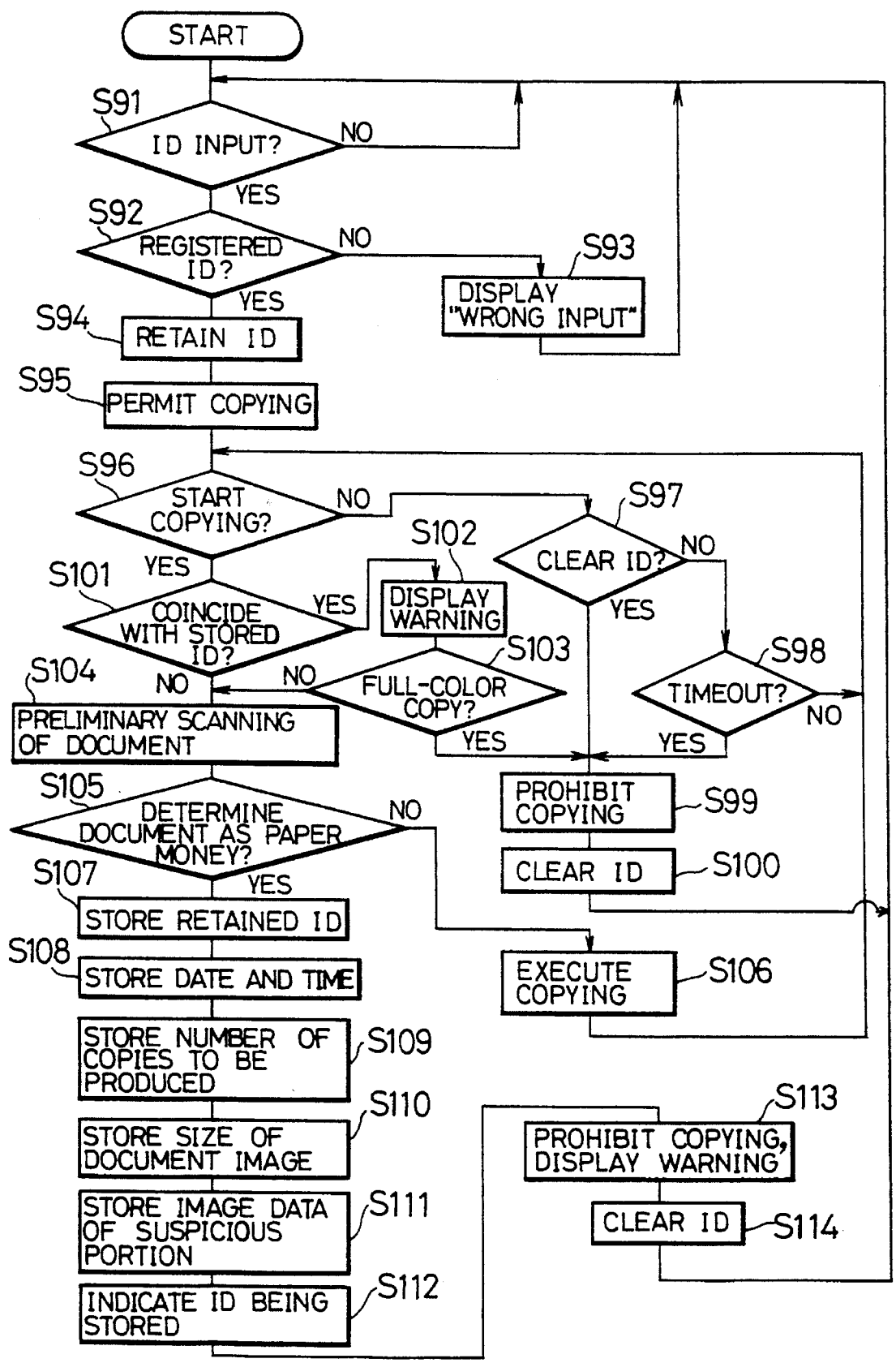
FIG. 8 is a flowchart showing operations of a counterfeiting preventive device according to still another embodiment of the present invention.

The following description discusses still another embodiment of the present invention with reference to FIGS. 1, 4 and 8.

The copying machine 40 of this embodiment incorporates a counterfeiting preventive device which has the structure shown in FIG. 4 and performs the sequence of operations shown in FIG. 8. The copying machine 40 is capable of producing black-and-white, mono-color and full-color copies.

In the counterfeiting preventive device shown in FIG. 8, when the paper-money judging section 75 judges that a document read is paper money (step 105), the memory control section 77 controls the memory section 78 to store the entered ID number (step 107), and the output control section 76 prohibits the image output section 83 from carrying out copying and transmits an instruction to the operation control section 82 to display a warning on the display section 51b of the auditor 51 (step 113). When the operation control section 82 judges that an ID number entered thereafter coincides with the above-mentioned ID number stored in the memory section 78 (step 101), the display section 51b of the auditor 51 displays a warning message such as "copying is unavailable" under the control of the operation control section 82 and the output control section 76 (step 102). In addition, if a full-color copy is requested at this time (step 103), the output control section 76 prohibits the image output section 83 from carrying out copying (step 99).

As described above, the counterfeiting preventive device of this embodiment prevents a full-color copy from being made when an ID number coincides with the ID number stored in the memory section 78. It is therefore possible to reduce recurrence of counterfeiting paper money while minimizing the inconvenience of a user.

More specifically, in the copying machine 40 operated in black-and-white, mono-color and full-color copying modes, when counterfeiting paper money, the full-color copying mode is usually used. In order to prevent counterfeiting of paper money, it is necessary to prohibit only full-color copying. In an office, black-and-white copies are usually produced more frequently than full-color copies. With the above-mentioned structure, when an ID number is given to each section of a company, even if a person in a group makes an attempt to counterfeit paper money, other people in the group are able to produce copies other than full-color copies. Namely, the effect on other people in the group is reduced. Moreover, there is a possibility that the paper-money judging section 75 makes a wrong judgement. With this structure, even if a wrong judgment is made, only full-color copying which is less frequently performed is prohibited, thereby eliminating a problem that copying is prohibited until the manager or service engineer of the copying machine 40 cancels the prohibition of the use of the copying machine 40. However, if paper money is printed in one color, the above-mentioned structure may become useless.

The operations in steps 91 to 114 except steps 102 and 103 of FIG. 8 are the same as those in steps 1 to 23 except step 5 of FIG. 1. Regarding other functions, the counterfeiting preventive device of this embodiment performs the same functions as those carried out by the counterfeiting preventive device of EMBODIMENT 1.

[EMBODIMENT 5]

The following description discusses still another embodiment of the present invention with reference to FIGS. 1, 3, 4 and 9.

Figure 9:
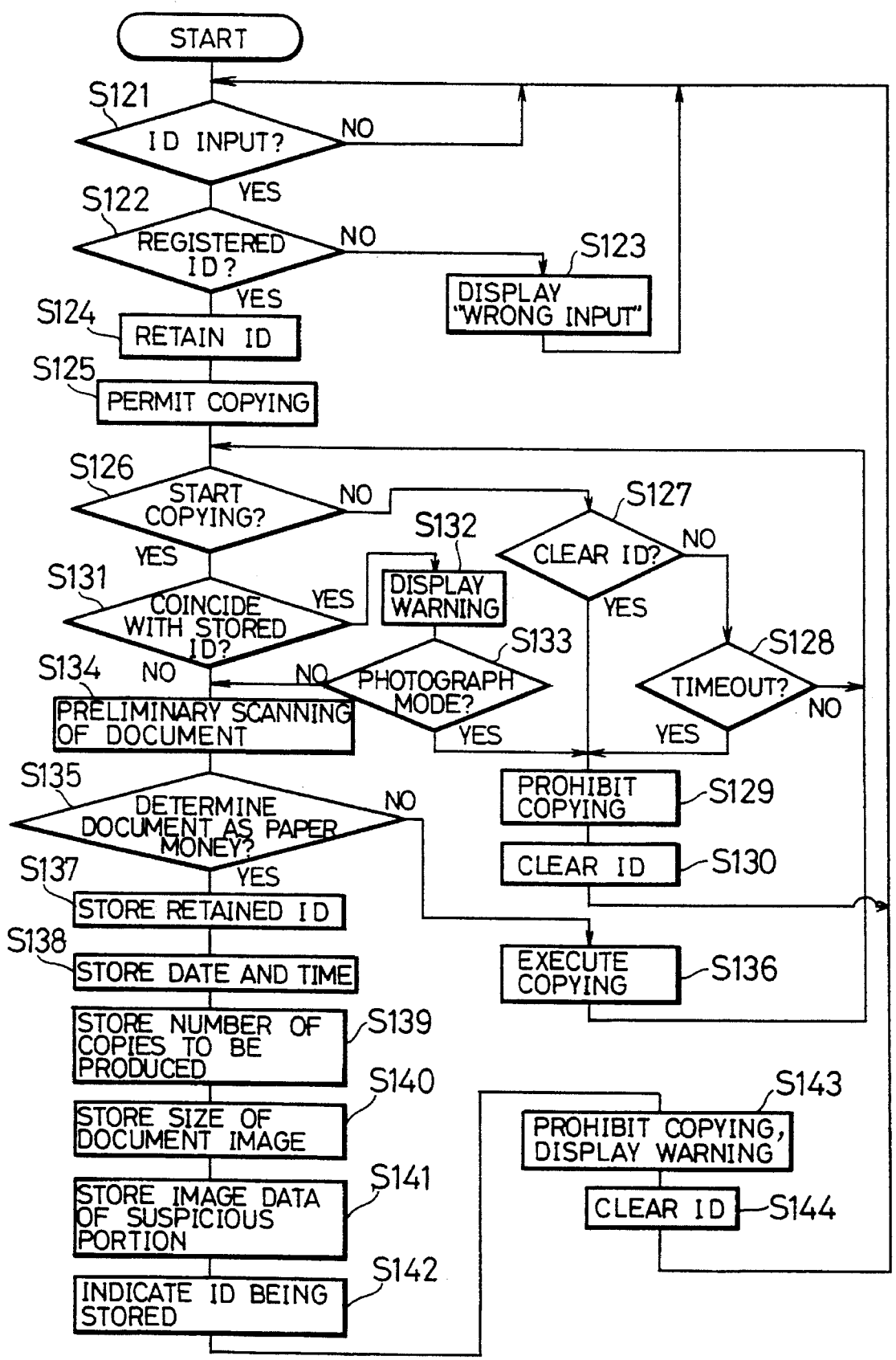
FIG. 9 is a flowchart showing operations of a counterfeiting preventive device according to still another embodiment of the present invention.

The copying machine 40 of this embodiment incorporates a counterfeiting preventive device which has the structure shown in FIG. 4 and performs the sequence of operations shown in FIG. 9. The copying machine 40 is operated in either a photograph mode and a normal mode by depressing the photograph mode key 60b in the copy density and mode setting section shown in FIG. 3. Specifically, the normal mode is initially selected, and switching between the photograph mode and the normal mode is carried out by depressing the photograph mode selecting key 60b.

In the operations of the counterfeiting preventive device shown in FIG. 9, when an entered ID number coincides with the ID number stored in the memory section 78 (step 131), a warning is displayed (step 132). When the photograph mode is selected (step 133) in this state, copying is prohibited (step 129).

As described above, the counterfeiting preventive device of this embodiment prevents copying from being carried out in the photograph mode when an entered ID number coincides with the ID number stored in the memory section 78. It is therefore possible to reduce recurrence of counterfeiting paper money while minimizing the inconvenience of a user.

More specifically, as described above, in the normal mode, the clearness of characters and line images takes priority. On the other hand, in the photograph mode, the gradations of the document image takes priority. Therefore, in order to faithfully copy, i.e., counterfeit paper money, the photograph mode is suitable. In other words, in order to prevent counterfeiting paper money, prohibition of copying in the photograph mode is enough. When the normal mode and photograph mode are compared, generally, the normal mode is more frequently used. Therefore, like the counterfeiting preventive device of EMBODIMENT 4, even if a person in a group makes an attempt to counterfeit paper money, other people in the group, who use the same ID number as the counterfeiter, are able to produce copies in the normal mode, thereby reducing the effect on other people in the group. Moreover, even when the paper-money judging section 75 makes a wrong judgment, only copying in the photograph mode which is less frequently made is prohibited. It is thus possible to eliminate such a problem that copying is prohibited until the manager or service engineer of the copying machine 40 cancels the prohibition of the use of the copying machine 40.

The operations in steps 121 to 144 except steps 132 and 133 of FIG. 9 are the same as those in steps 1 to 23 except step 5 of FIG. 1. Regarding other functions, the counterfeiting preventive device of this embodiment performs the same functions as those carried out by the counterfeiting preventive device of EMBODIMENT 1.

[EMBODIMENT 6]

The following description discusses still another embodiment of the present invention with reference to FIGS. 1, 3, 4 and 10.

Figure 10:
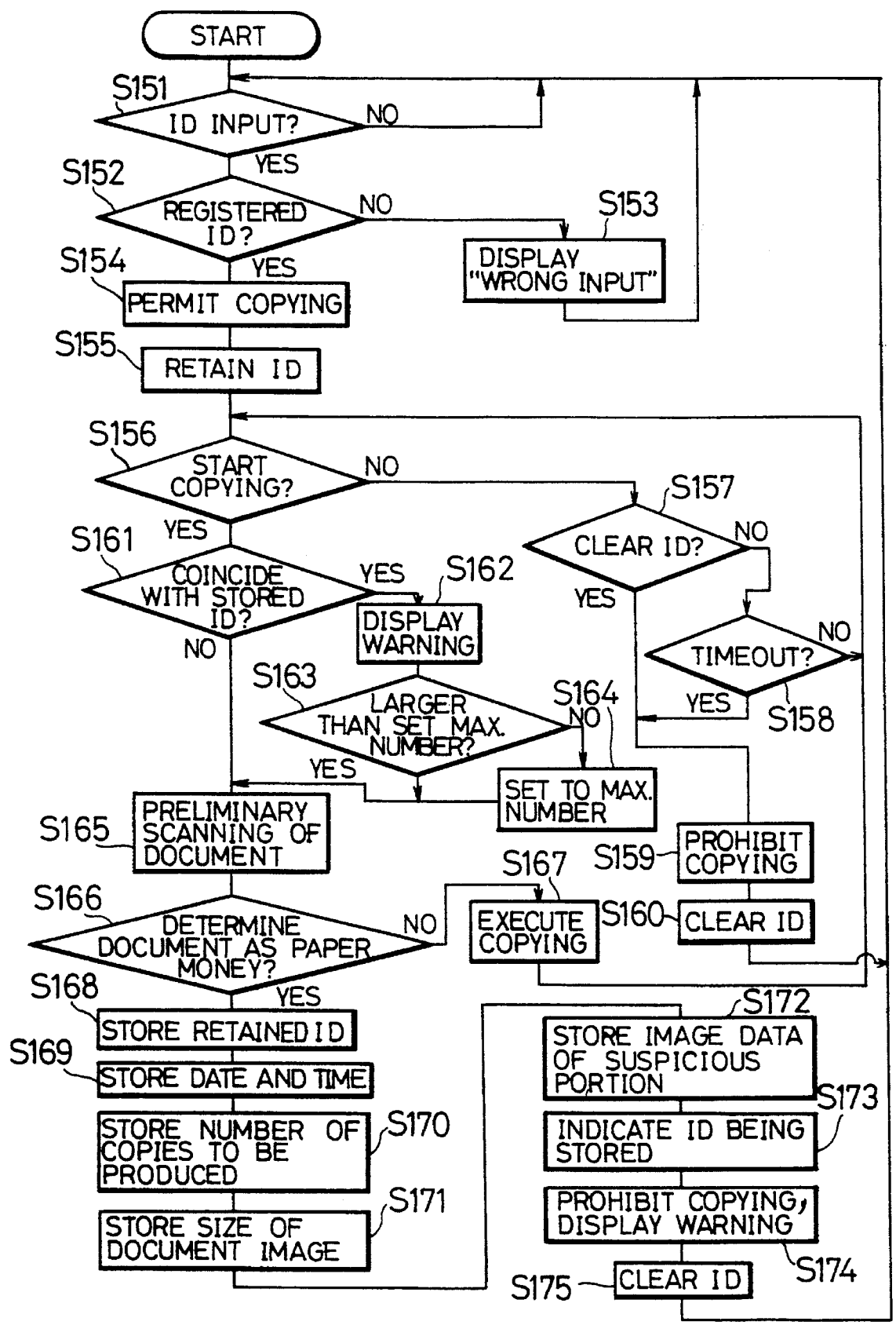
FIG. 10 is a flowchart showing operations of a counterfeiting preventive device according to still another embodiment of the present invention.

The copying machine 40 of this embodiment incorporates a counterfeiting preventive device which has the structure shown in FIG. 4 and performs the sequence of operations shown in FIG. 10. In the operations shown in FIG. 10, when an entered ID number coincides with the ID number stored in the memory section 78 (step 161), a warning is displayed (step 162) and whether the number of copies to be produced set by the copy number setting section 57 is smaller than a predetermined maximum number of copies is judged (step 163). If YES, the set number of copies are produced in step 167. On the other hand, if NO, the number of copies to be produced is reset to the predetermined maximum number (step 164), and the predetermined maximum number of copies are produced in step 167.

As described above, the counterfeiting preventive device of this embodiment limits the available number of copies to be produced when an entered ID number coincides with the ID number stored in the memory section 78. In other words, it is possible to produce copies less than the predetermined maximum number. This structure overcomes such problems that, when a person in a group made an attempt to counterfeit paper money, other people in the group who use the same ID number as the counterfeiter are prohibited from making copies and that, when the paper-money judging section 75 made a wrong judgement, copying is prohibited until the manager or service engineer of the copying machine 40 cancels the copying prohibited state. It is therefore possible to reduce recurrence of counterfeiting paper money while minimizing the inconvenience of a user.

The operations in steps 151 to 175 except steps 162 to 164 of FIG. 10 are the same as those in steps 1 to 23 except step 5 of FIG. 1. Regarding other functions, the counterfeiting preventive device of this embodiment performs the same functions as those carried out by the counterfeiting preventive device of EMBODIMENT 1.

[EMBODIMENT 7]

The following description discusses still another embodiment of the present invention with reference to FIGS. 1, 3, 4 and 11.

Figure 11:
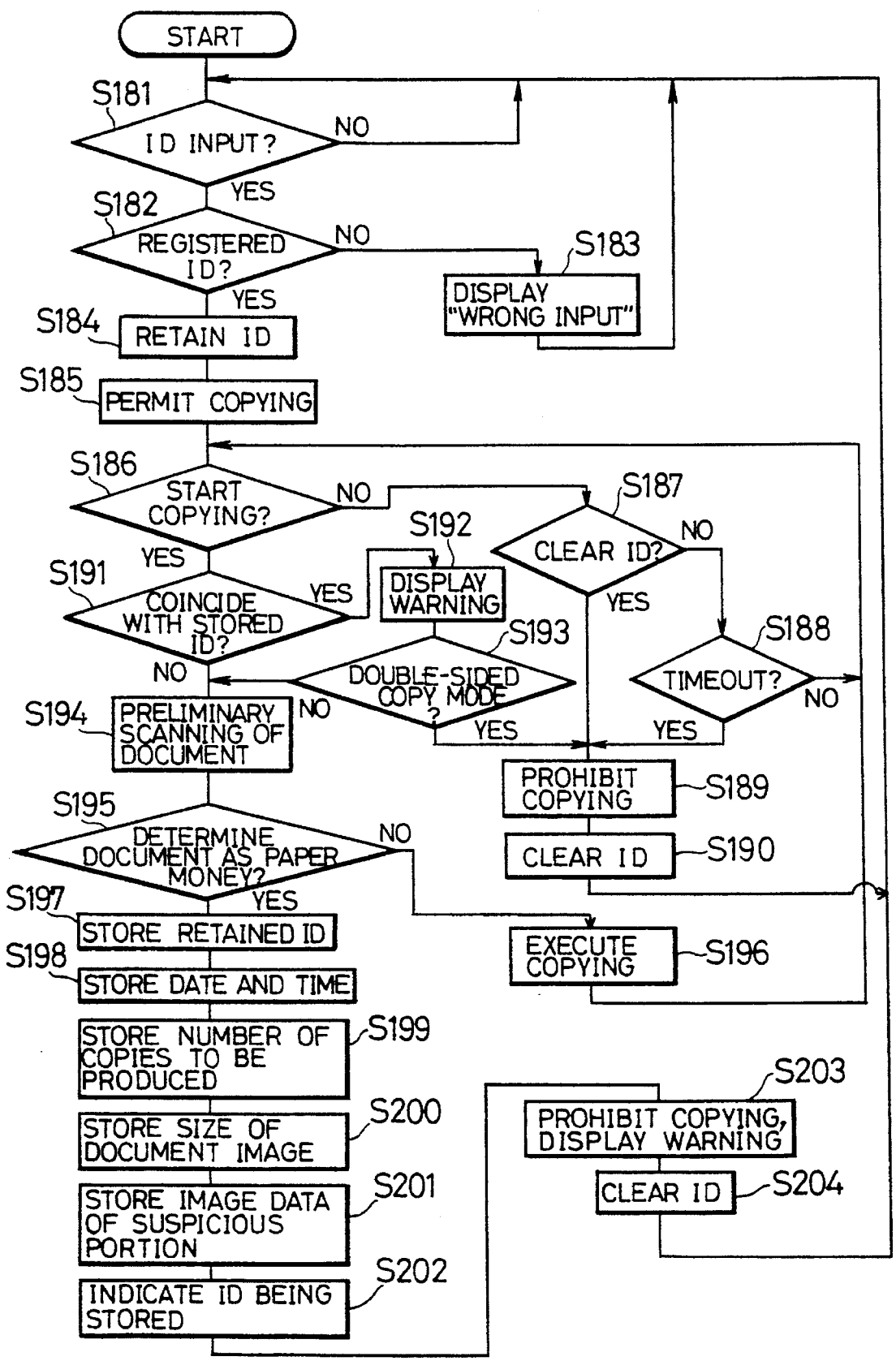
FIG. 11 is a flowchart showing operations of a counterfeiting preventive device according to still another embodiment of the present invention.

The copying machine 40 of this embodiment incorporates a counterfeiting preventive device which has the structure shown in FIG. 4 and performs the sequence of operations shown in FIG. 11. The copying machine 40 includes a well-known automatic document feeder and a sheet inverting feeder mechanism, and is capable of automatically transporting, inverting, and locating a sheet and a document in position. With these functions, as described above, by successively depressing the automatic double-side function selecting key 52a of the copying mode selecting section 52, a desired mode is selected from a mode in which single-sided documents are respectively copied onto each side of a copy sheet, a mode in which a double-sided document is copied to the corresponding sides of a sheet (i.e. a double-sided copying mode which is prohibited by the structure of this embodiment), a mode in which single-sided copies are produced from a double-sided document, and a mode in which a single-sided copy is produced from a single-sided document.

In the operations of the counterfeiting preventive device shown in FIG. 11, when an entered ID number coincides with the ID number stored in the memory section 78 (step 191), a warning is displayed (step 192). At this time, if the double-sided copying mode is selected (step 193), copying is prohibited (step 189).

As described above, the counterfeiting preventive device of this embodiment prevents copying from being carried out in the double-sided copying mode when an entered ID number coincides with the ID number stored in the memory section 78. It is therefore possible to reduce recurrence of counterfeiting paper money while minimizing the inconvenience of a user.

More specifically, in order to counterfeit paper money, it is necessary to copy both sides of paper money to correct positions on both sides of a sheet with precision. It is therefore desirable to perform copying in the double-sided copying mode. In other words, in order to prevent counterfeiting paper money, prohibiting of copying in the double-sided copying mode is enough. This structure overcomes such problems that, when a person in a group made an attempt to counterfeit paper money, other people in the group who use the same ID number as the counterfeiter are prohibited from making copies and that, when the paper-money judging section 75 made a wrong judgement, copying is prohibited until the manager or service engineer of the copying machine 40 cancels the copying prohibited state.

The operations in steps 181 to 204 except steps 192 and 193 of FIG. 11 are the same as those in steps 1 to 23 except step 5 of FIG. 1. Regarding other functions, the counterfeiting preventive device of this embodiment performs the same functions as those carried out by the counterfeiting preventive device of EMBODIMENT 1.

[EMBODIMENT 8]

The following description discusses still another embodiment of the present invention with reference to FIGS. 1, 2, 3, 4 and 12.

Figure 12:
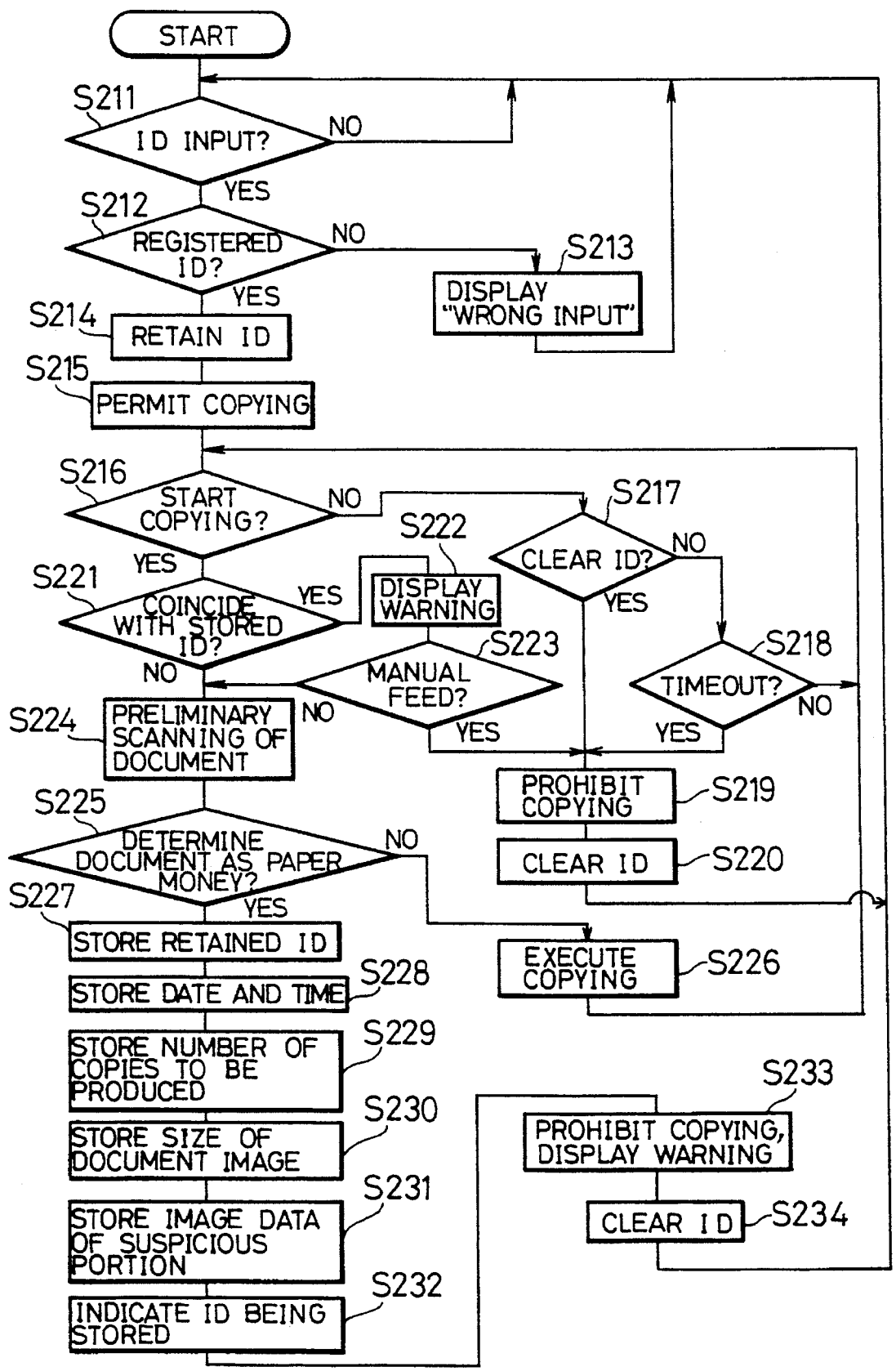
FIG. 12 is a flowchart showing operations of a counterfeiting preventive device according to still another embodiment of the present invention.

The copying machine 40 of this embodiment incorporates a counterfeiting preventive device which has the structure shown in FIG. 4 and performs the sequence of operations shown in FIG. 12. Sheets of a standard size are supplied from the sheet feed cassette 20 shown in FIG. 2, while sheets of a desired size are supplied from the manual sheet feed section 23. A desired sheet feed section is selected by depressing the sheet selecting key 54a shown in FIG. 3.

In the operations of the counterfeiting preventive device shown in FIG. 12, when an entered ID number coincides with the ID number stored in the memory section 78 (step 221), a warning is displayed (step 222). When the manual sheet feed section 23 is selected (step 223), copying is prohibited (step 219).

As described above, the counterfeiting preventive device of this embodiment prevents copying to sheets fed from the manual sheet feed section 23. It is therefore possible to reduce recurrence of counterfeiting paper money while minimizing the inconvenience of a user.

More specifically, the size of paper money differs from generally-used copy sheets of standard sizes. Therefore, in order to counterfeit paper money, it is necessary to use the manual sheet feed section 23 which is capable of feeding sheets of a desired size but not the sheet feed cassette 20 which supplies only sheets of a standard size. In other words, in order to prevent counterfeiting paper money, it is necessary to prohibit only copying to sheets fed from the manual sheet feed section 23. This structure overcomes such problems that, when a person in a group made an attempt to counterfeit paper money, other people in the group who use the same ID number as the counterfeiter are prohibited from making copies and that, when the paper-money judging section 75 made a wrong judgement, copying is prohibited until the manager or service engineer of the copying machine 40 cancels the copying prohibited state.

The operations in steps 211 to 234 except steps 222 and 223 of FIG. 12 are the same as those in steps 1 to 23 except step 5 of FIG. 1. Regarding other functions, the counterfeiting preventive device of this embodiment performs the same functions as those carried out by the counterfeiting preventive device of EMBODIMENT 1.

[EMBODIMENT 9]

Figure 13:
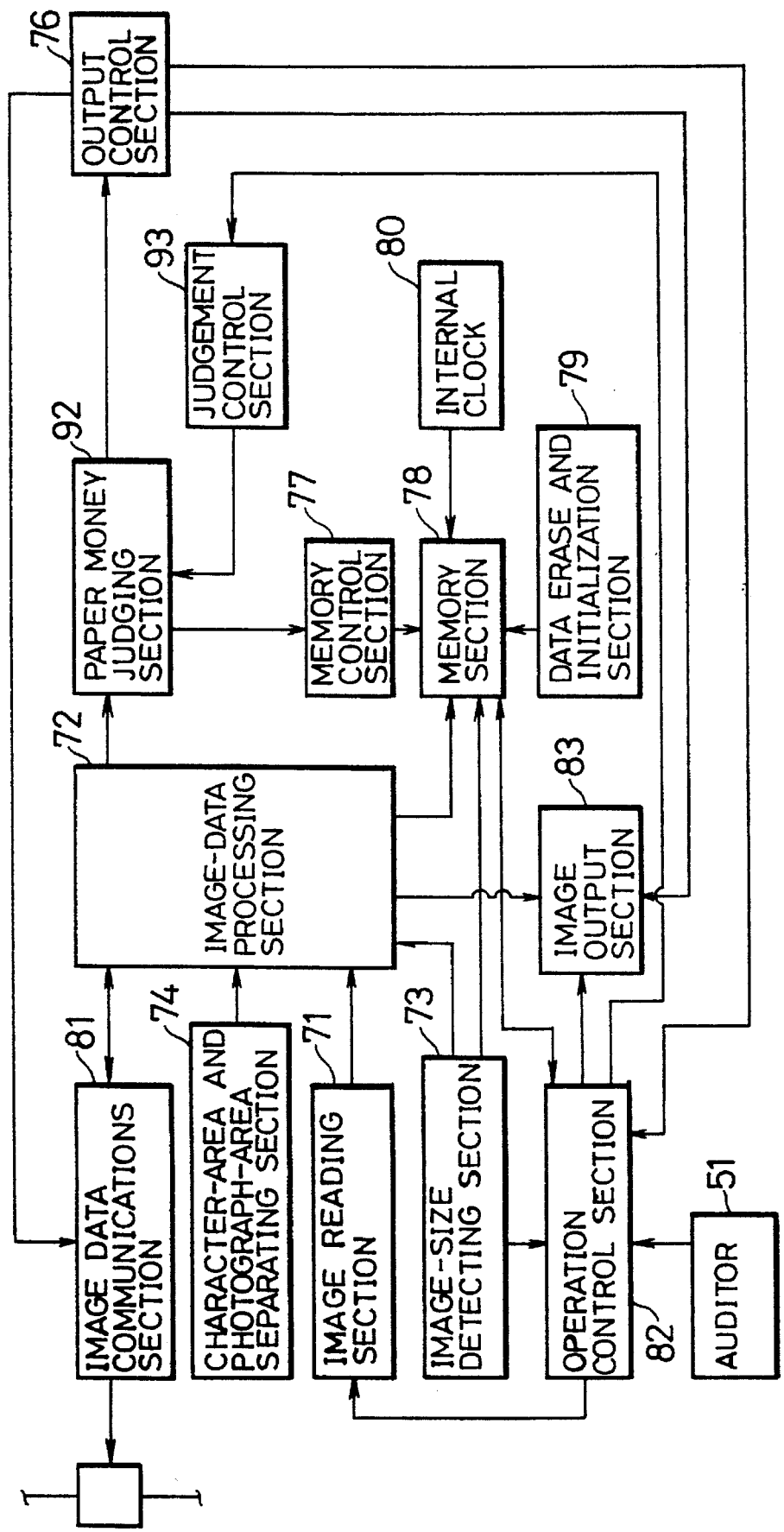
FIG. 13 is a block diagram showing a structure of a counterfeiting preventive device according to still another embodiment of the present invention.
Figure 14:
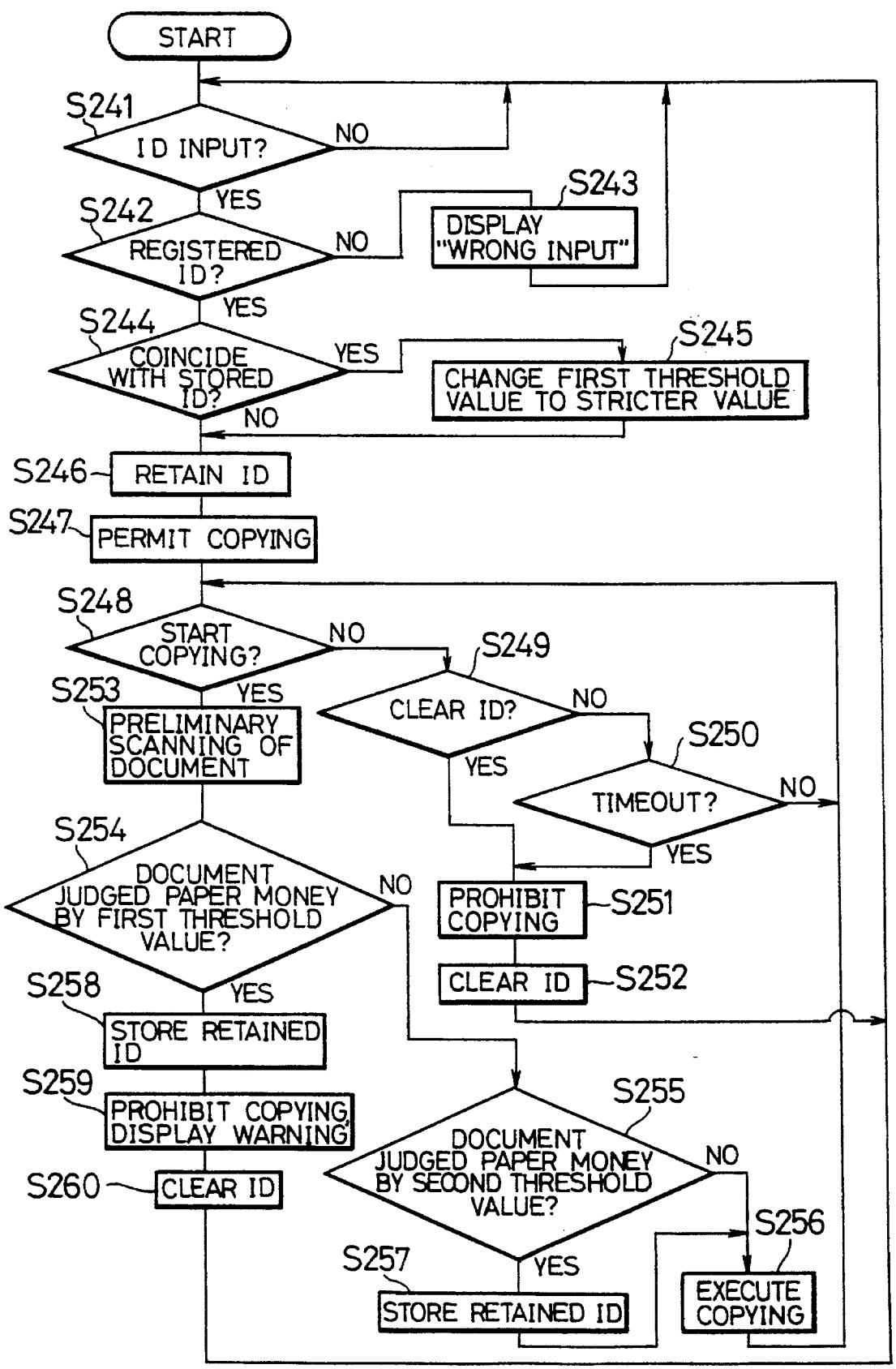
FIG. 14 is a flowchart showing operations of the counterfeiting preventive device of FIG. 13.

The following description discusses still another embodiment of the present invention with reference to FIGS. 13 and 14.

The copying machine 40 of this embodiment incorporates a counterfeiting preventive device which has the structure shown in FIG. 13 and performs the sequence of operations shown in FIG. 14. When judging whether the document is paper money or not, the paper-money judging section 92 shown in FIG. 13 uses a first threshold value as a first criterion which is a relatively relaxed criterion and a second threshold value as a second criterion which is stricter than the first criterion. Two values are used for the first threshold value: one is used when an entered ID number coincides with the ID number stored in the memory section 78, and the other is used when the entered ID number does not coincide with the stored ID number. The judgement control section 93 controls the first threshold value in the paper-money judging section 92 according to the result of a judgement made in the operation control section 82, i.e., whether the entered ID number coincides with the ID number stored in the memory section 78.

In the operations of the counterfeiting preventive device shown in FIG. 14, the paper-money judging section 92 first judges whether an input document is paper money or not based on the first threshold value in step 254. If YES, the ID number retained in the operation control section 82 is stored in the memory section 78 by the memory control section 77 (step 258). Then, copying is prohibited and a warning is displayed (step 259), and the ID number retained in the operation control section 82 is cleared (step 260). When the result is NO in step 254, the paper-money judging section 92 judges whether the input document is paper money or not based on the second threshold value (step 255). If NO, copying is performed (step 256). On the other hand, if YES, copying is performed (step 256) after storing the ID number in the memory section 78 (step 257).

In the state where the ID number has been stored, if an ID number is entered and if it coincides with the stored ID number (step 244), the judgement control section 93 resets the first threshold value used in the paper-money judging section 92 to a value so that the document is more likely to be judged paper money. This newly set value is used as a threshold value when an entered ID number coincides with the ID number stored in the memory section 78. The initially set first threshold value is used when the entered ID number does not coincide with the ID number stored in the memory section 78.

With the above mentioned controlling operations, it is possible to reduce recurrence of counterfeiting paper money while minimizing the inconvenience of a user.

Namely, in order to enhance the counterfeiting preventing functions, the threshold value which is used as a criterion on which a judgement whether a document is paper money or not is based needs to be set to a stricter value so that the document is more likely judged paper money. With this arrangement, however, the rate at which a document is wrongly judged paper money increases, decreasing the reliability of the copying machine 40.

In the present counterfeiting preventive device, the first and second threshold values are set in the paper-money judging section 92, and the first threshold value which is used for prohibiting copying initially takes a value as a relatively relaxed criterion in order to prevent a document which is not paper money from being wrongly judged paper money. When the document is judged not paper money by a judgement based on the first threshold value, a further judgement is made based on the second threshold value which is set stricter than the first threshold value. If the document is judged paper money, the ID number is stored in the memory section 78. Thereafter, when an ID number is entered and if it coincides with the stored ID number, the first threshold value is reset so that a stricter judgement is made based on the reset value. With this structure, the first threshold value is reset and a stricter judgement is made based on the reset value every time an ID number which is identical to the stored ID number is entered. It is therefore possible to surely prevent the recurrence of counterfeiting paper money.

As described above, the first threshold value is reset to the initially set value when the data stored in the memory section 78 is erased.

The operations in steps 241 to 243, 246 to 253, 258 to 260 shown in FIG. 14 are the same as those in steps 1 to 3, 6 to 13, 16, 22 and 23 of FIG. 1.

[EMBODIMENT 10]

Figure 15:
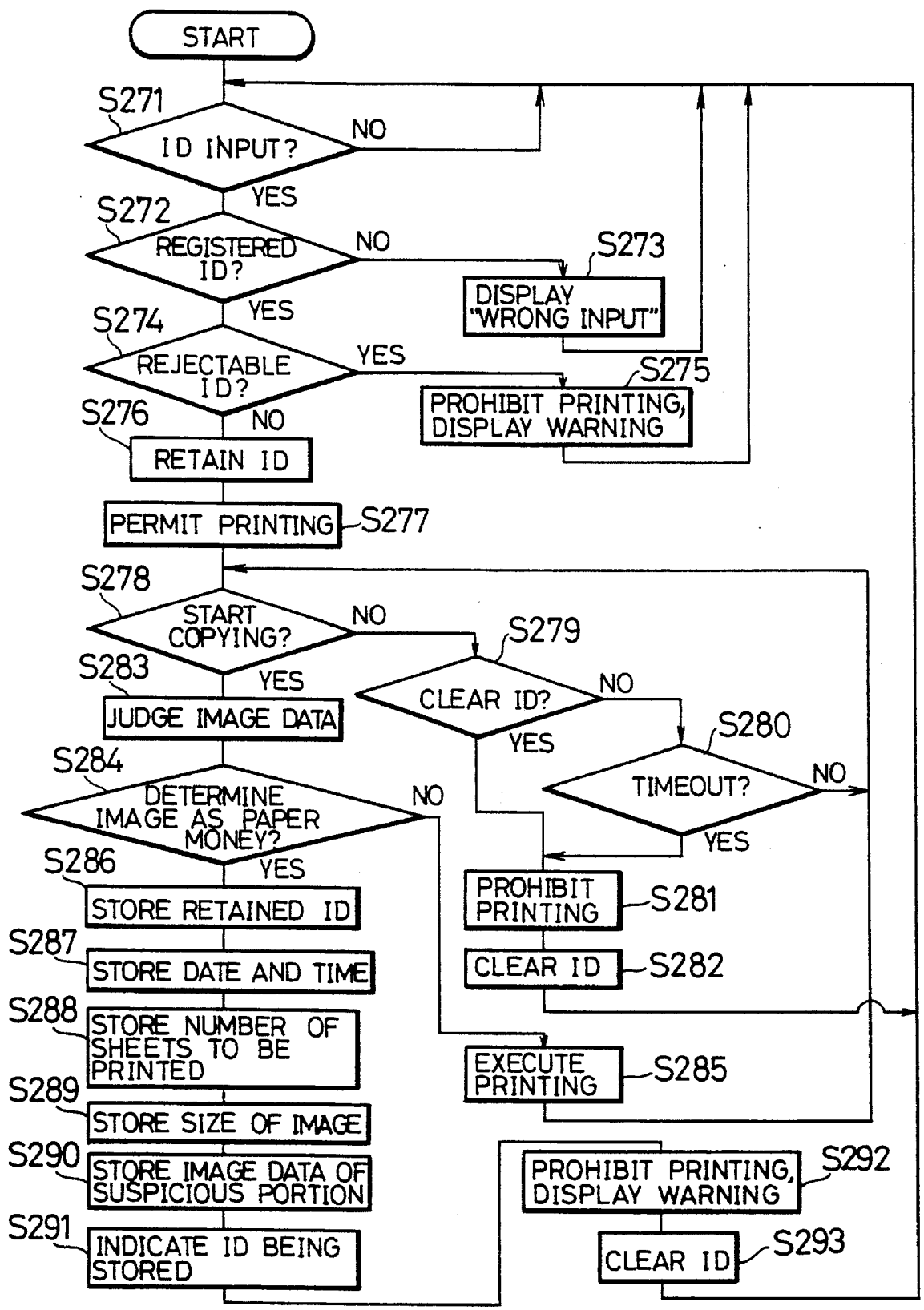
FIG. 15 is a flowchart showing operations of a counterfeiting preventive device according to still another embodiment of the present invention.

The following description discusses still another embodiment of the present invention with reference to FIGS. 1, 4 and 15.

The copying machine 40 of this embodiment incorporates a counterfeiting preventive device which has the structure shown in FIG. 4 and performs the sequence of operations shown in FIG. 15. The image data communications section 81 shown in FIG. 4 transmits and receives data such as an ID number and the image data of a document to/from another device, for example, a host device.

In the operations of the counterfeiting preventive device shown in FIG. 15, when an ID number is entered through the image data communications section 81 (step 271), whether the ID number coincides with a registered ID number or not is judged (step 272). If the ID number is the registered number, whether or not it coincides with a rejectable ID number stored in the memory section 78 is judged (step 274). If YES, printing of the image data entered through the image data communications section 81 is prohibited and a warning is displayed (step 275). On the other hand, if the result is NO and if printing is requested (step 278), whether the input image is paper money or not is judged (steps 283 and 284). If NO, the input image is printed (step 285). On the other hand, if the result is YES, the ID number is stored as a rejectable ID number in the memory section 78 (step 286). Then, printing is prohibited and a warning is displayed (step 292). In the image data communications section 81, image data input through the image data communications section 81 is converted into the same data form as the data form of the image data read by the image reading section 71.

When this structure is used in a copying machine which performs data communications with other devices, the recurrence of counterfeiting paper money is surely prevented.

It is well known that a copying machine provided with such an image data communications section can function as a full-color printer for printing image data sent from a host device or as a full-color image input device for transmitting images to a host device for processing and storage. The structure of this embodiment is designed on such a premise.

Moreover, a machine having communication capabilities for communicating service data instead of image data is also known. For example, such a machine sends the total number of copies produced and the maintenance timing of the machine to a service center through a telephone line. Then, the service center remotely performs a simulation of maintenance. The structure of this embodiment is applicable to a machine incorporating such communication capabilities.

With the structure of the device of this embodiment, since an operator is accessible to the device by transmitting data including an ID number to the present device from another host device which is connected by the image data communications section 81 without directly entering an ID number, the device is handled in an improved manner. In particular, if the present device is used as a network printer which is located far away from a plurality of host devices, the effects of the above-mentioned functions are fully exhibited.

The structure of this embodiment is applicable to all the counterfeiting preventive devices described in the foregoing embodiments. More specifically, with the structures mentioned in the foregoing embodiments, the counterfeiting preventive device is constructed such that data including an ID number and the image data of a document are transmitted to and received from an external device through the image data communications section 81 and that the ID number and the image data of the document input through the image data communications section 81 are processed in the same manners as the ID number entered through the auditor 51 and the image data input through the image reading section 71 are processed.

The operations in steps 271 to 293 shown in FIG. 15 correspond to those in steps 1 to 23 shown in FIG. 1, respectively.

[EMBODIMENT 11]

The following description discusses still another embodiment of the present invention with reference to FIGS. 1, 4, 15 and 16.

Figure 16:
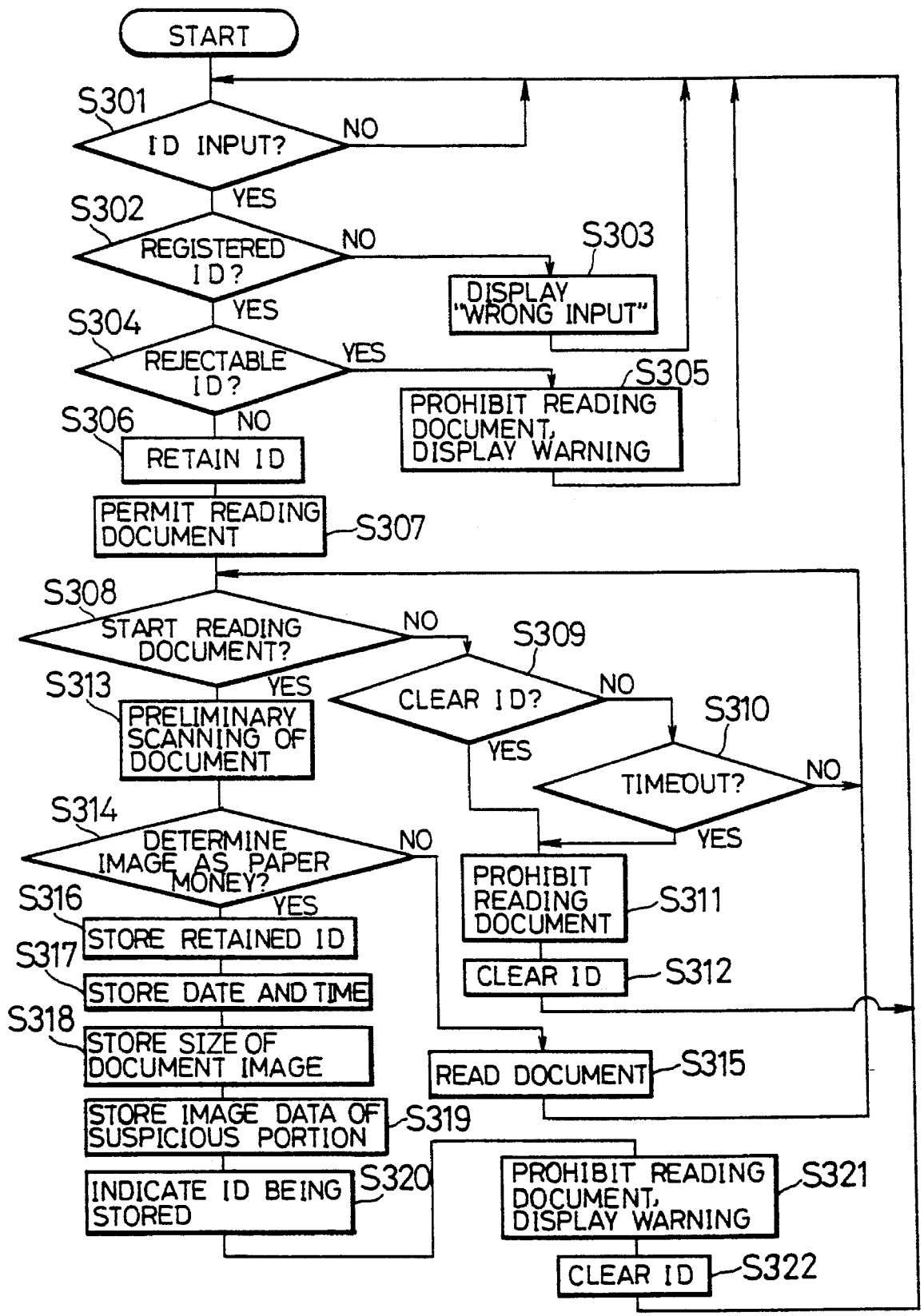
FIG. 16 is a flowchart showing operations of a counterfeiting preventive device according to still another embodiment of the present invention.

The copying machine 40 of this embodiment incorporates a counterfeiting preventive device which has the structure shown in FIG. 4 and performs the sequences of operations shown in FIGS. 15 and 16. The copying machine 40 is capable of transmitting and receiving an ID number and image data to/from an external device. With the structure performing such communication, it is necessary to judge whether the document image to be transmitted is paper money, and also to judge whether the image data received from the external device is paper money. Hence, the present device performs the sequences of operations shown in FIGS. 15 and 16.

With the operations shown in FIG. 15, an ID number and image data to be output onto a sheet are input from an external device through the image data communications section 81. Specifically, when the paper-money judging section 75 judges the input image data is paper money (step 284), the memory control section 77 stores the ID number as a rejectable ID number in the memory section 78 (step 286). Thereafter, when an ID number is entered through the image data communications section 81 and when the operation control section 82 judges that the entered ID number coincides with the rejectable ID number (step 274), the output control section 76 prohibits the image output section 83 from printing the image data input through the image data communications section 81 (step 275).

With the operations shown in FIG. 16, an ID number input through the auditor 51 and image data read by the image reading section 71 are output to an external device through the image data communications section 81. Specifically, the image reading section 71 performs preliminary scanning of a document (step 313). When the paper-money judging section 75 judges that an image data input by the preliminary scanning is not paper money (step 314), the image reading section 71 reads the image data from the document and the read image data is output to an external device, for example, a host device through the image data communications section 81 under the control of the output control section 76 (step 315). In this case, the image data to be output is converted into a transmittable data form.

Meanwhile, when the image data is judged paper money by the paper-money judging section 75 in step 314, the memory control section 77 stores the ID number entered through the auditor 51 as a rejectable ID number in the memory section 78 (step 316). Thereafter, when an ID number is entered and when the operation control section 82 judges that the ID number entered through the auditor 51 coincides with the rejectable ID number (step 304), the operation control section 82 prohibits the image reading section 71 from reading the document image (step 305). Namely, the image data communications section 81 is prohibited from outputting the image data.

When this structure is used in a copying machine which performs data communications with other devices, the recurrence of counterfeiting paper money is surely prevented.

The operations shown in FIG. 16 except steps 305, 307, 308, 311, 315, and 321 correspond to the operations shown in FIG. 1 except steps 5, 7, 8, 11, 15, 18 and 22.

[EMBODIMENT 12]

Figure 17:
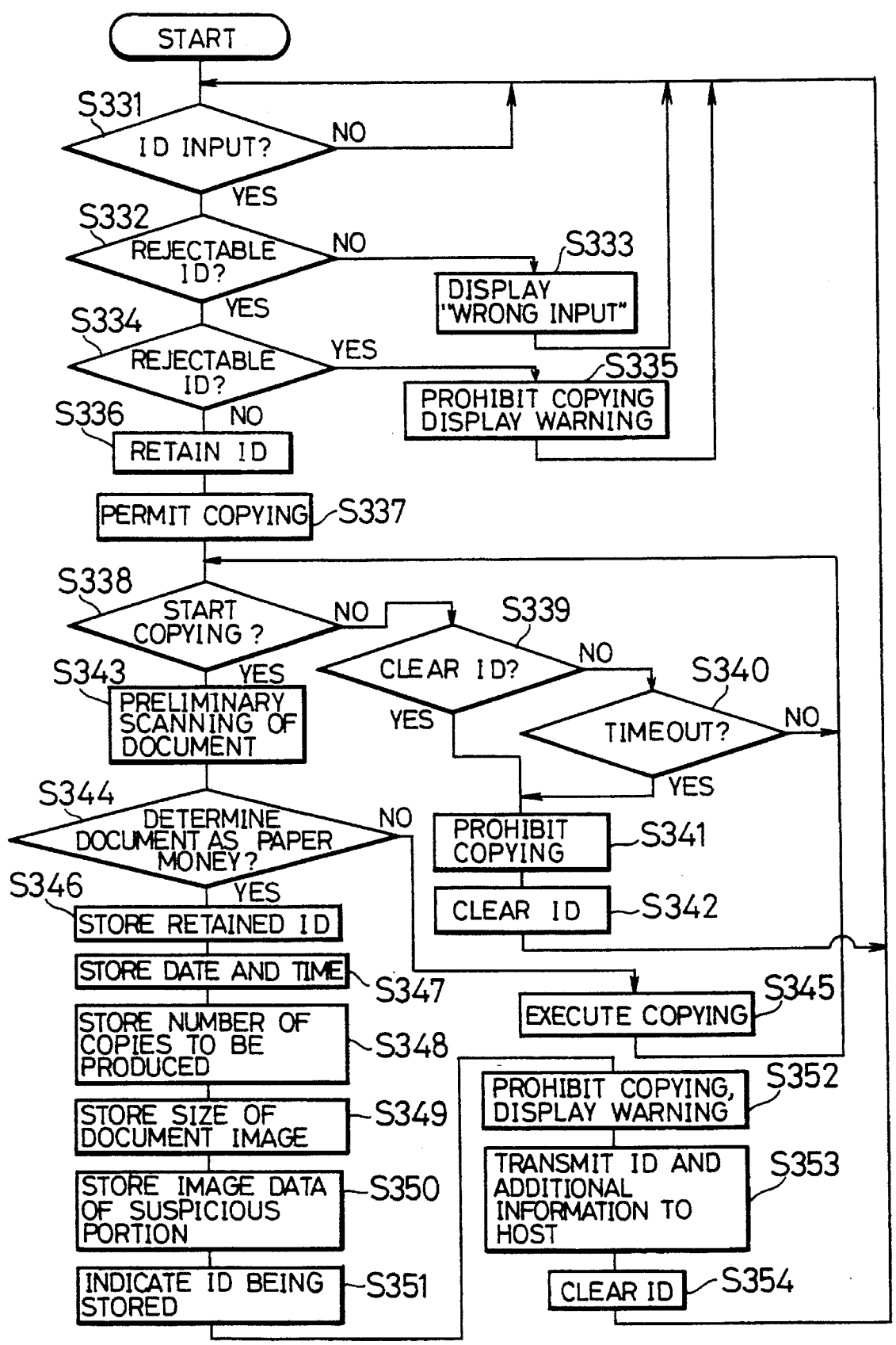
FIG. 17 is a flowchart showing operations of a counterfeiting preventive device according to still another embodiment of the present invention.

The following description discusses still another embodiment of the present invention with reference to FIGS. 1, 4 and 17.

The copying machine 40 of this embodiment incorporates a counterfeiting preventive device which has the structure shown in FIG. 4 and performs the sequence of operations shown in FIG. 17.

With the operation shown in FIG. 17, when the paper-money judging section 75 judges that a document is paper money (step 344), the memory control section 77 stores an entered ID number as a rejectable ID number in the memory section 78 (step 346). At this time, the operation control section 82 prohibits copying and displays a warning (step 352). Then, the output control section 76 outputs the rejectable ID number stored in the memory section 78 and additional information which is stored together with the rejectable ID number through the operations in steps 347 to 350 to an external device by the image data communications section 81 (step 353).

With this structure, the manager or service manager of the copying machine 40 can swiftly know the fact that a counterfeiting action is taking place using the copying machine 40 by monitoring the external device, for example, a host device. It is therefore possible to immediately stop the copying machine 40 and report the fact to the police. Even if the manager is unable to definitely determine that a counterfeiting action is in progress based on the information transmitted through the image data communications section 81, he can promptly take some measures. For example, the manager can go to the spot where copying is being carried out or monitor the copying machine 40 by remotely controlling a security camera which is installed for monitoring the copying machine 40. Moreover, since information including at least the rejectable ID number stored in the memory section 78 is also used by the external device, it is possible to definitely prevent the recurrence of counterfeiting of paper money using the external device into which the information is input.

The operations shown in FIG. 17 except step 353 is the same as those in steps 1 to 23 of FIG. 1. Regarding other functions, the counterfeiting preventive device of this embodiment performs the same functions as those carried out by the counterfeiting preventive device of EMBODIMENT 1.

Figure 18:
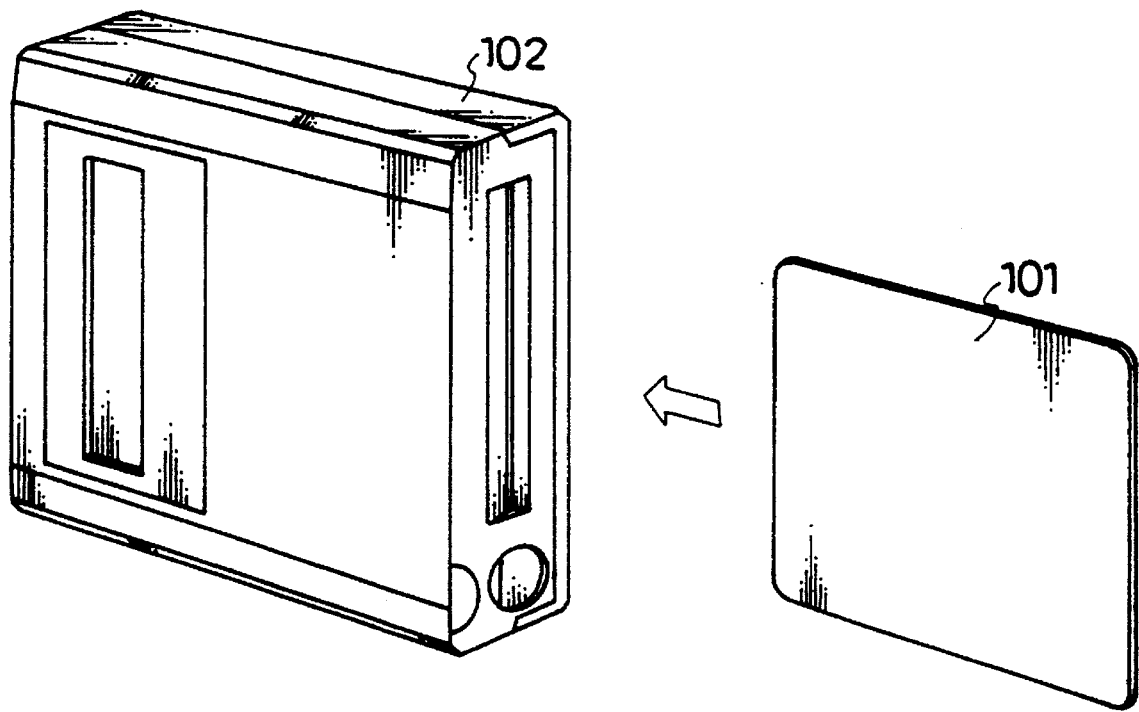
FIG. 18 illustrates perspective views of an ID card and an ID card reader provided for inputting an ID number without using an auditor shown in FIG. 3.

In the above-mentioned embodiments, the auditor 51 is provided as means for inputting an ID number. However, as illustrated in FIG. 18, it is also possible to provide an ID-number input system having an ID card 101 on which an ID number is recorded by, for example, magnetic recording and an ID-number reader 102 for reading the ID number from the ID card when inserted into the ID-number reader 102.

Figure 19:
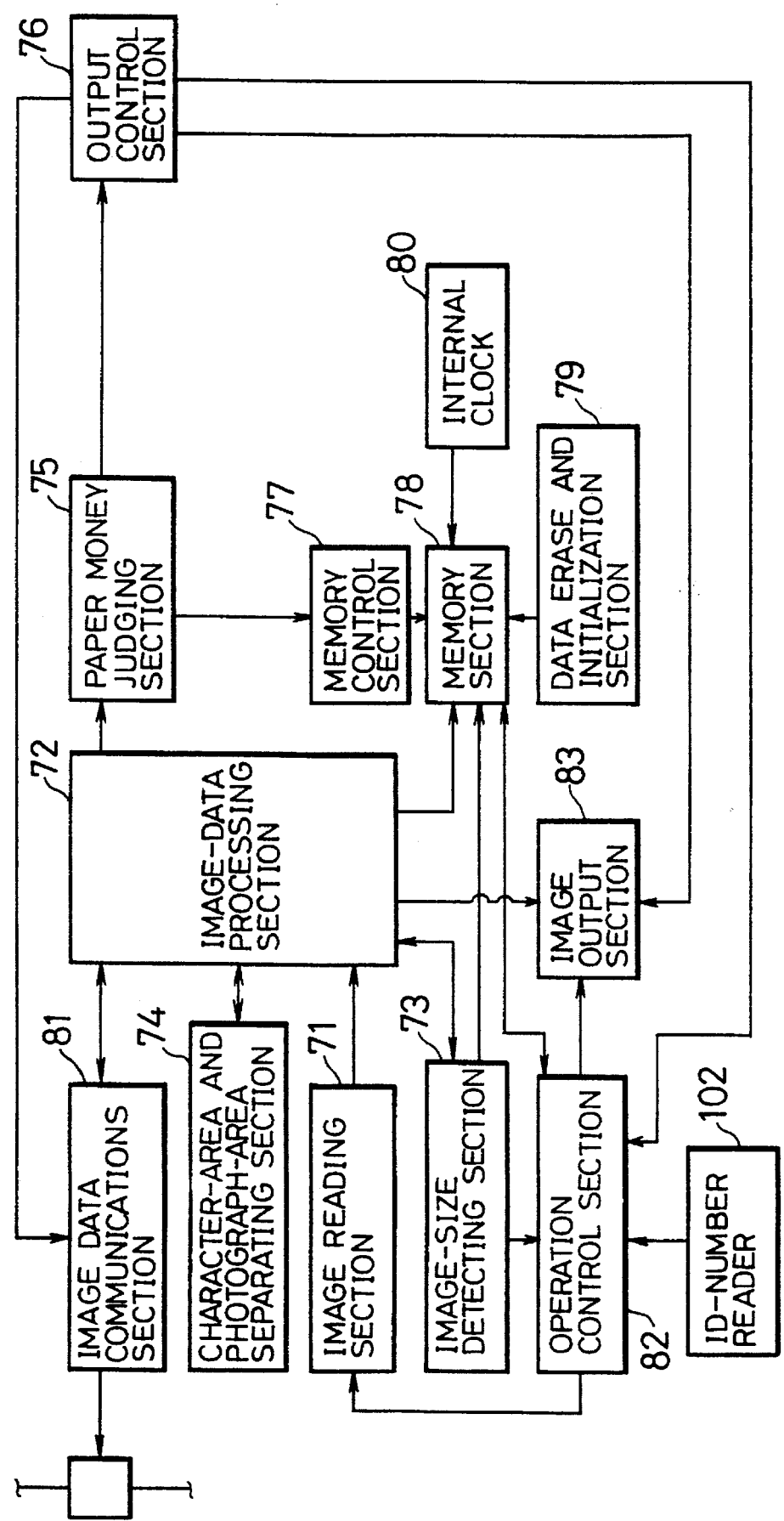
FIG. 19 is a block diagram showing a structure of a counterfeiting preventive device including the ID number reader of FIG. 18.
Figure 20:
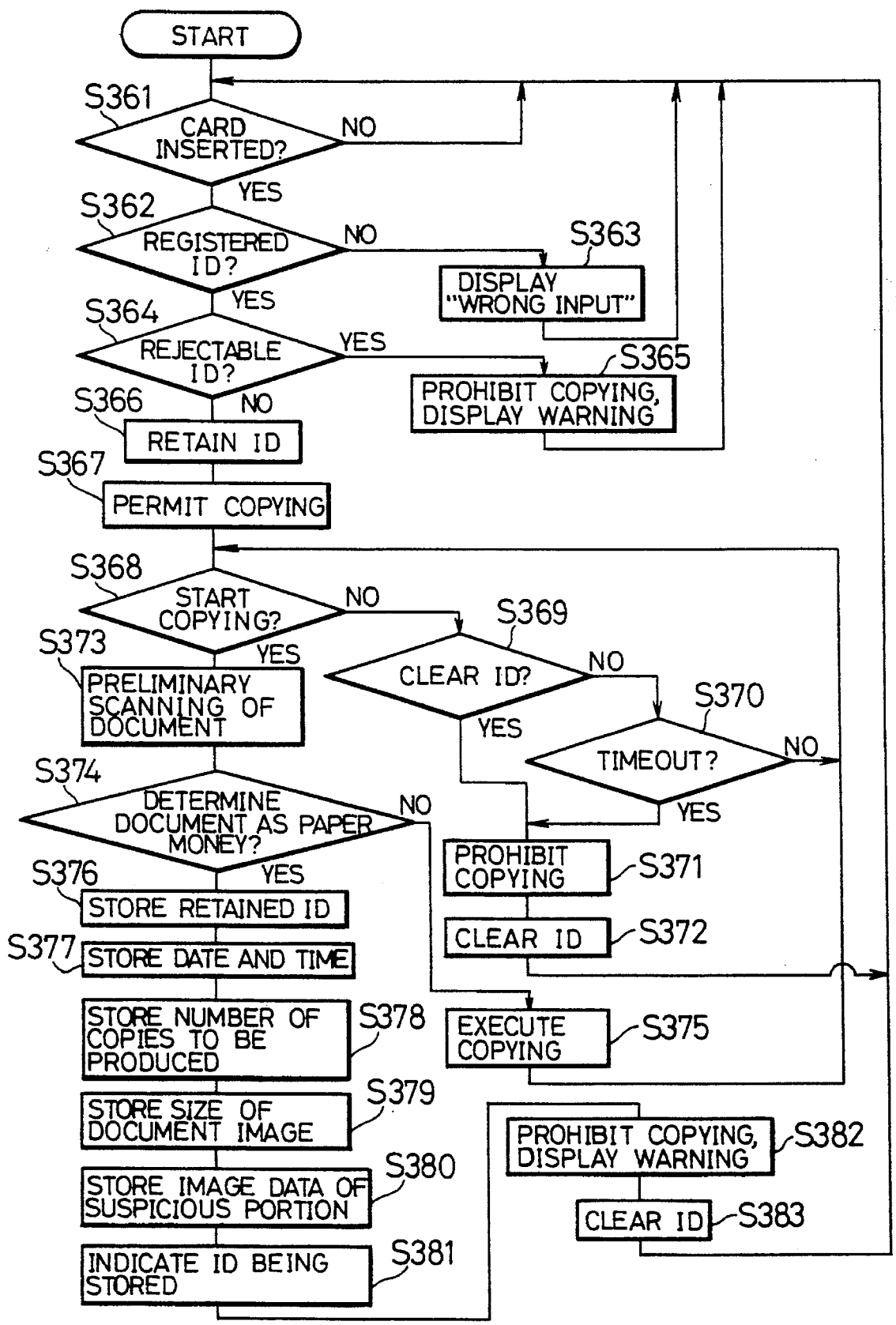
FIG. 20 is a flowchart showing operations of the counterfeiting preventive device of FIG. 19.

In this case, the ID card 101 is possessed by an operator, and the ID-number reader 102 is installed in the copying machine 40. Hence, as illustrated in FIG. 19, the present counterfeiting preventive device includes the ID-number reader 102 instead of the auditor 51. The counterfeiting preventive device judges whether the ID card 101 is inserted into the ID-number reader 102 in step 361 as shown in FIG. 20. Except for this operation, the counterfeiting preventive device executes the same operations as those shown in FIG. 1. In step 369, whether or not there is a request for clearing the ID number is judged depending on whether the ID card 101 is removed from the ID-number reader 102. The number of copies produced is separately totaled for each ID number by a counter in the copying machine 40.

This structure allows an ID number to be input more easily compared with the structure where an ID number is input by depressing numerical keys 51a of the auditor 51.

As for the memory section 78 of the foregoing embodiments, it is preferable to use semiconductor memory such as EEPROM (Electrically Erasable Programmable Read-Only Memory), flash memory and FRAM (Ferroelectric RAM) or non-volatile memory including a recording and reproducing device, a magnetic recording medium such as a hard disk or a magneto-optical recording medium such as a magneto-optical disk rather than volatile memory which is backed up by a battery. The use of semiconductor memory or non-volatile memory increases the reliability of the device.

SRAM (Static RAM) which is backed up by a battery for retaining a relatively small amount of data for control devices installed in the counterfeiting preventive device is most commonly used because of its simplicity and economical efficiency. However, since the battery is used, when the battery loses charge it needs to be replaced. It is therefore necessary to pay attention to the replacement of the battery in order to achieve reliable data storage.

More specifically, the battery must be replaced before it loses charge. A warning is given to replace the battery with sufficient time margin, usually before the battery voltage becomes lower than a guarantee voltage. The replacement of the battery is actually carried out by an operator or a service engineer. It can not be guaranteed that the operator or the service engineer would never miss the timing of replacement. For instance, if supply of voltage to the RAM is cut off for a moment by mistake during replacement, there is a possibility of losing data. The battery is usually replaced by removing a substrate from the device. At this time, if a section to which the battery voltage is applied touches, for example, an electrically conductive table, a short-circuit may occur. Thus, great care must be taken when replacing the battery, causing a heavy burden to the operator.

Considering the importance of the stored data, it is therefore desirable to use a non-volatile memory which does not use a battery although the cost is increased and the circuit becomes complicated.

In the event when a non-volatile memory is used as the memory section 78, if a memory card which is freely inserted into and removed from the counterfeiting preventive device is used, the data stored in the memory section 78 is easily processed.

More specifically, to use the data stored in the memory section 78, it needs to be read out by some means. For example, the data stored may be output by using a printing function of the copying machine 40. However, considering the centralized management of the data about a plurality of copying machines 40 and considering the case where the data includes image data, if the digital data stored in the memory section 78 is arranged to be directly read out in digital form by another device, for example, a computer, the data is flexibly used and easily processed. Furthermore, the memory card is locked using a special key so as to prevent the insertion and removal of the memory card by ordinary users. Namely, only the manager or the service manager of the copying machine 40 can insert or remove the memory card into/from the device.

[EMBODIMENT 13]

The following description discusses one embodiment of the present invention with reference to FIGS. 2 and 21 to 31.

The copying machine 40 of this embodiment has a structure capable of identifying an operator based on the fingerprint of the operator, instead of the structure of a counterfeiting preventive device which identifies an operator by an input ID number or an inserted ID card as described in EMBODIMENTS 1 to 12.

FIG. 21 is a block diagram showing a schematic structure of a control section of the copying machine 40 of this embodiment.

As illustrated in FIG. 21, the copying machine 40 is entirely controlled by a process control unit (PCU) 141. The PCU 141 is connected to an operation-panel control unit (OPU) 142, an image-processing control unit (ICU) 143, an automatic document feeder, a sorter, and a scanner.

First, the OPU 142 and the operation panel controlled by the OPU 142 are explained below.

The OPU 142 is a control unit for the operation panel located in an upper part of the main body of the copying machine 40. FIG. 22(a) and 22(b) show an example of the operation panel. FIG. 22(a) is a plan view of the operation panel and FIG. 22(b) is a partial perspective view thereof. As shown in FIG. 22(a), the operation panel includes a liquid crystal panel 171 for displaying various screens, a ten-key 172 for inputting numeric values, a copy button 173 for instructing the start of copying, and a clear button 174 for clearing the settings.

Figure 24:
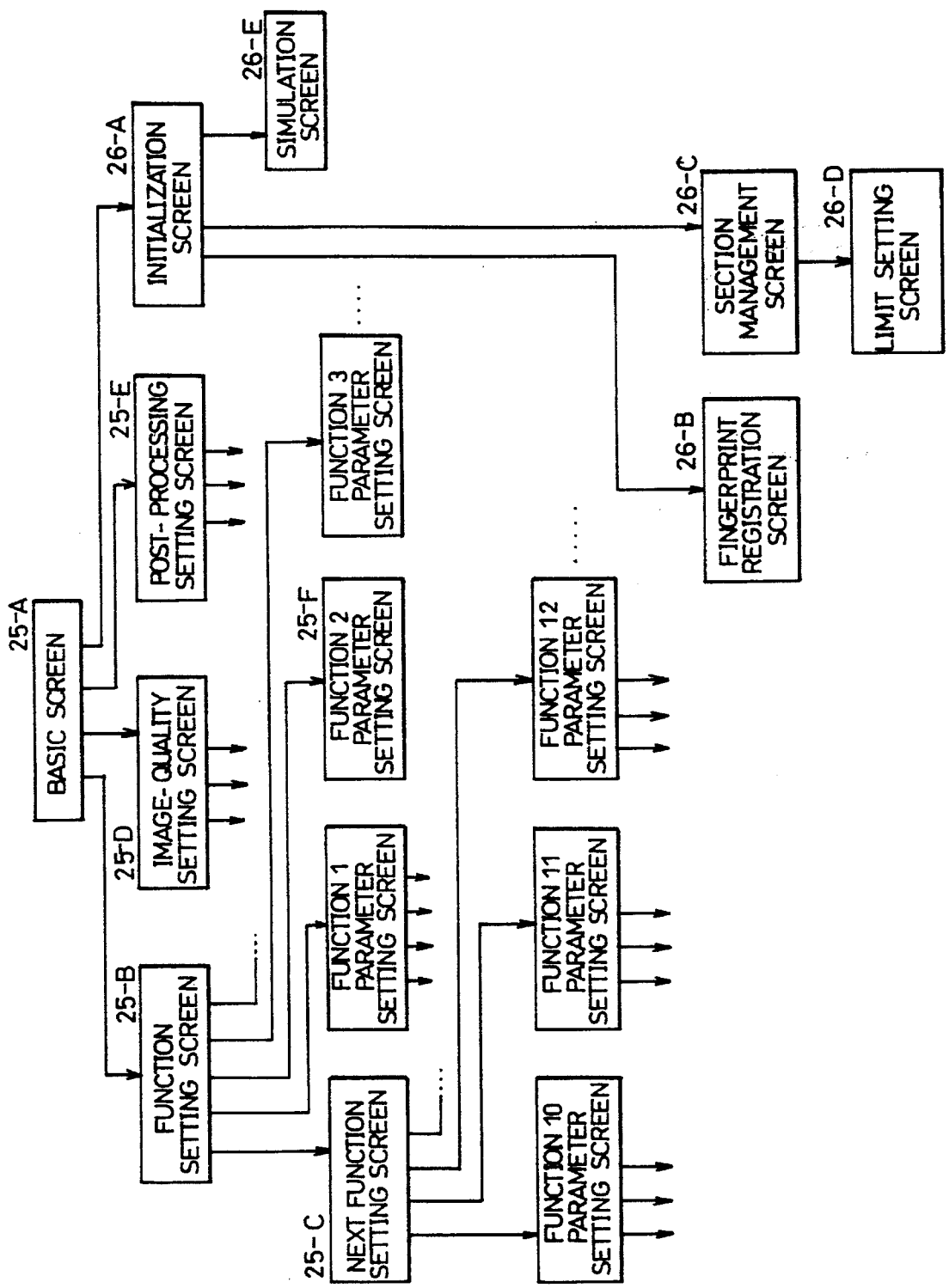
FIG. 24 is an explanatory view showing an example of a hierarchical structure of screens displayed on the operation panel.

The liquid crystal panel 171 displays various screens according to an instruction entered by an operator. The liquid crystal panel 171 is a touch panel which allows the operator to input information by touching the image according to the displayed content. The screens have a hierarchical structure, and a screen is displayed according to an input entered by the operator. FIG. 24 is an explanatory view illustrating an example of the hierarchical structure of the various screens. FIGS. 25(a) to 25(f) and FIGS. 26(a) to 26(e) are examples of some of the screens. Alphanumeric characters shown in upper right or left of each rectangle in FIG. 24 gives a figure number which displays the screen indicated in the rectangle. For example, the basic screen is displayed as shown in FIG. 25(a).

The copy button 173 includes therein a CCD sensor (not shown), and functions as the fingerprint reader unit 145 shown in FIG. 21. For instance, when the copy button 173 is depressed with a finger, the fingerprint is read by the CCD sensor. The image data of the fingerprint read as two-dimensional data is converted into serial data and transmitted to the ICU 143.

The ICU 143 includes a CPU for image processing, and a main memory which is constructed by RAM and stores image data. A modem 149 and an NCU (network control unit) 150 for transmitting and receiving image data to/from an external device is connected to the ICU 143 and the PCU 141 through a quantizing section 148. Moreover, the ICU 143 is connected to a CCU 144, the fingerprint reader unit 145, a laser control unit 146, and a hard disk 147. The CCU 144 processes the image data read from a document by the CCD sensor 6 of the scanner 22 shown in FIG. 2. The ICU 143 processes the image data input from the CCU 144 and the image data of the fingerprint input from the fingerprint reader unit 145, stores the data in the hard disk 147, sends the data as a control signal to the PCU 141 so as to control the respective sections, and outputs the data as image data to be printed to the laser control unit 146.

The fingerprint reader section 145 is controlled by the control signal from the ICU 143 and reads the fingerprint. The fingerprint data thus read is temporarily stored in an internal memory of the ICU 143. Then, in the ICU 143, the fingerprint data is quantized into digital data represented by digits in the image forming section and stored in the hard disk 147 as to be described later. It is thus possible to retain the fingerprint data even when the power switch of the copying machine 40 is turned off.

As illustrated in FIG. 21, the copying machine 40 includes the modem 149 and the NCU 150, and is connected to an external device with a public network. In order to send the image data to an external device as facsimile data, the modem 149 converts the image data in digital form into sound signals which are transmittable over a public circuit and converts facsimile data which is received in the form of sound signals through the public circuit into digital image data. The NCU 150 controls communication, including dialing, and switching of connections of the NCU 150. The public circuit is selectively connected to the modem 149 or a handset, not shown, by the operation of the NCU 150. When transmitting and receiving data to/from an external device by a digital network, for example, ISDN, the data is sent and received without passing through the modem 149. When the copying machine 40 receives information from the external device as a transmitter, a reception signal is sent to the PCU 141. When the PCU 141 receives the reception signal, it instructs the ICU 143 to prepare for storing image data (i.e., the data from the modem 149) so that an internal memory of the ICU 143 stores the image data. Then, the image data is read out from the memory, and an image is formed. On the other hand, when transmitting the image data stored in the memory to an external device, image data to be transmitted is read out from the memory, quantized into one-bit data in a transmittable form in the quantizing section 148, and automatically transmitted by the NCU 150.

Figure 23:
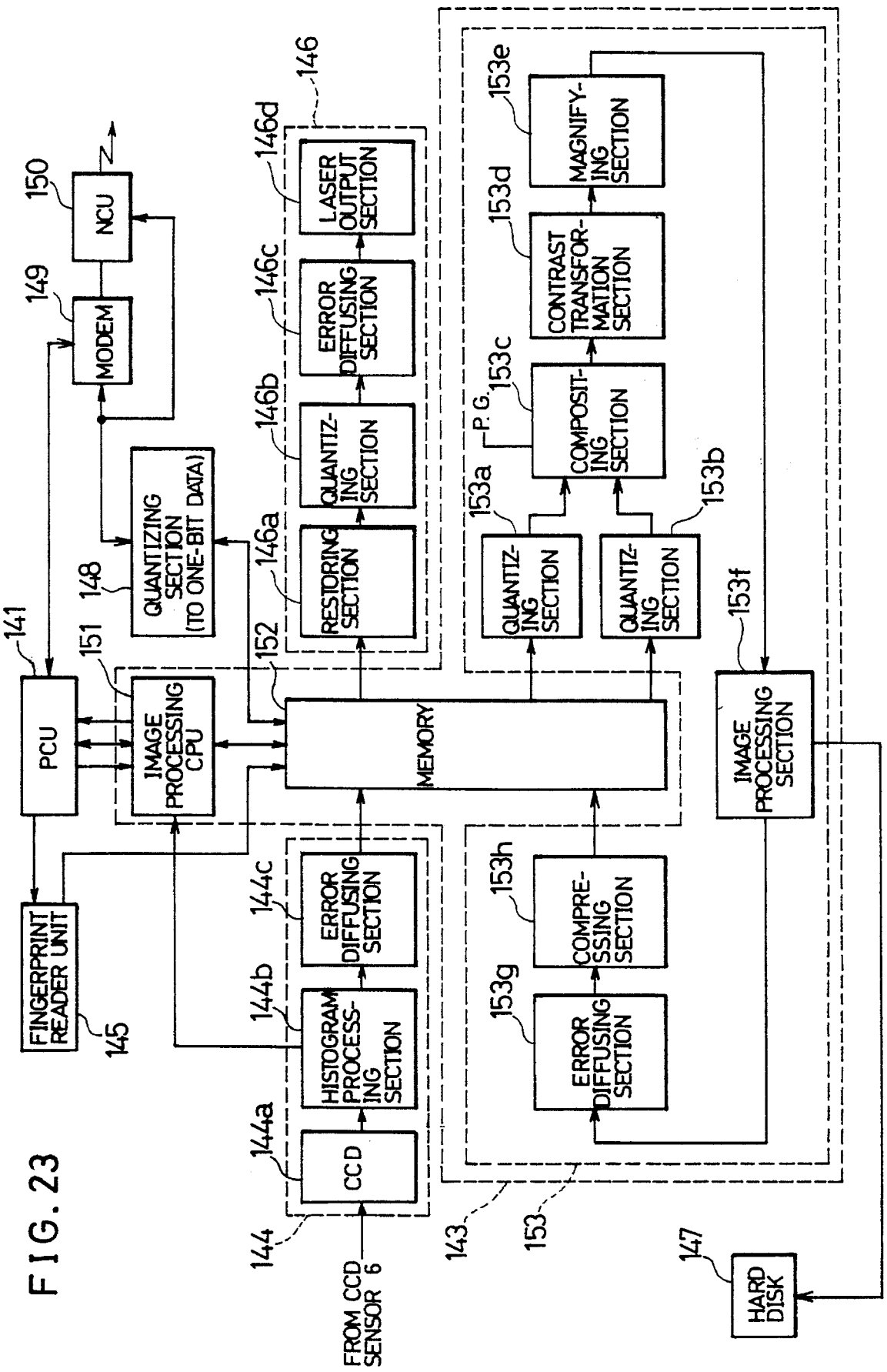
FIG. 23 is a block diagram of image-data processing sections of the copying machine.

Referring now to FIG. 23, the image processing procedure is discussed below in detail.

The ICU 143 includes an image processing CPU 151, a memory 152 having a RAM, and an image forming section 153. Image data is input to the ICU 143 from the CCU 144 and the fingerprint reader unit 145 through a data line. The ICU 143 outputs image data to be printed.

First, the CCU 144 is explained in detail below.

The CCU 144 includes a CCD section 144a, a histogram processing section 144b, and an error diffusing section 144c. The CCU 144 converts the image data of the document read by the CCD sensor 6 in the scanner 22 into one-bit digital data by carrying out the above-mentioned processing, and processes the data by the error diffusing method while making a histogram. The data is then temporarily stored in the memory 152.

More specifically, in the CCD section 144a, the image data input as analog signals representing the densities of pixels of the document image is converted into digital signals by an A/D converter. The digital signals are corrected by the MTF correction, the black-and-white level correction, or the gamma correction. Then, digital signals representing 256 tones are transmitted to the histogram processing section 144b.

In the histogram processing section 144b, the digital signal output from the CCD section 144a is added according to the pixel densities of 256 tones to obtain density information (histogram data). The density information is sent to the error diffusing section 144c as pixel data, and to the image processing CPU 151 if necessary.

In the error diffusing section 144c, the 8-bit/pixel digital signal output from the CCD 144a is converted into 1-bit/pixel digital signal, and relocation is performed for faithfully reproducing the densities of local portions of the document. The result is output to the ICU 143 and stored in the memory 152. The error diffusing method is a type of pseudo-halftone processing, and an error caused by the conversion to one bit is reflected when converting adjacent pixel into one bit.

Next, the ICU 143 is explained in detail.

The image forming section 153 includes quantizing sections 153a and 153b, a compositing section 153c, a contrast transformation section 153d, a magnifying section 153e, an image processing section 153f, an error diffusing section 153g, and a compressing section 153h.

The image forming section 153 converts the input image data into image data of a form desired by an operator. The image forming section 153 processes the image data until all the image data is converted into a desired final form and stored in the memory 152. The processing sections 153a to 153h in the image forming section 153 do not always perform their functions but perform their functions if need be.

As described above, since the image data read out from the memory 152 is stored in a one-bit form by the CCU 144, the quantizing sections 153a and 153b reconvert the data into 256 tones and output it to the compositing section 153c.

In the compositing section 153c, a logical operation, i.e., logical OR, AND, or exclusive-OR operation is selectively carried out on each pixel. The resulting data is output to the contrast transformation section 153d. The data subjected to the operation is the image data of 256 tones from the quantizing sections 153a and 153b and data from a pattern generator (PG).

In the contrast transformation section 153d, the relation between the output density and input density is determined according to a predetermined contrast transformation table with respect to the respective digital signals of 256 tones. The result is output to the magnifying section 153e.

In the magnifying section 153e, interpolation is performed based on the input data according to an instructed magnification rate so as to obtain pixel data (a density level) of target pixels after magnification. And, magnification processing is performed in a main scanning direction after executing magnification processing in a sub-scanning direction.

In the image processing section 153f, the pixel data from the magnifying section 153e is processed to collect necessary information, for example, to extract features from data stream.

The error diffusing section 153g performs a function similar to that of the error diffusing section 144c of the CCU 144, and outputs the result to the compressing section 153h.

In the compressing section 153h, if the image data from the error diffusing section 153g has a final form of output image data, the data is compressed by run length encoding.

The following description discusses the laser control unit 146.

The laser control unit 146 includes a restoring section 146a, a quantizing section 146b, an error diffusing section 146c, and a laser output section 146d.

The laser control unit 146 expands the image data which has been compressed in a form of one bit and stored in the memory 152, reconverts the data into data representing 256 tones, converts the resulting data into data represented by two bits which gives a smoother halftone image than one-bit data does, and converts the data into an ON/OFF signal for switching a laser between ON and OFF.

Namely, as described above, since the image data read from the memory 152 is compressed by the compressing section 153h of the image forming section 153, the restoring section 146a expands the image data and outputs the resulting data to the quantizing section 146b.

The quantizing section 146b performs processing in the same manner as in the quantizing sections 153a and 153b of the image forming section 153.

The error diffusing section 146c executes the same processing as that performed by the error diffusing section 144c of the CCU 144.

The laser output section 146d converts the image data into a laser ON/OFF signal according to the control signal from the PCU 141. The laser is switched between on and off by the ON/OFF signal, and printing of the image is carried out.

The data processed in the CCU 144 and the laser control unit 146 are basically stored in the form of binary data in the memory 152 in order to save the memory capacity of the memory 152. However, considering the degradation of the image data, the data may be stored in the form of quaternary data.

Referring now to FIGS. 27 to 31, the operations of the copying machine 40 having the above-mentioned structure are discussed below.

An operator of the copying machine 40 is required to register the name, the group and the fingerprint in advance in the counterfeiting preventive device in the copying machine 40.

Figure 27:
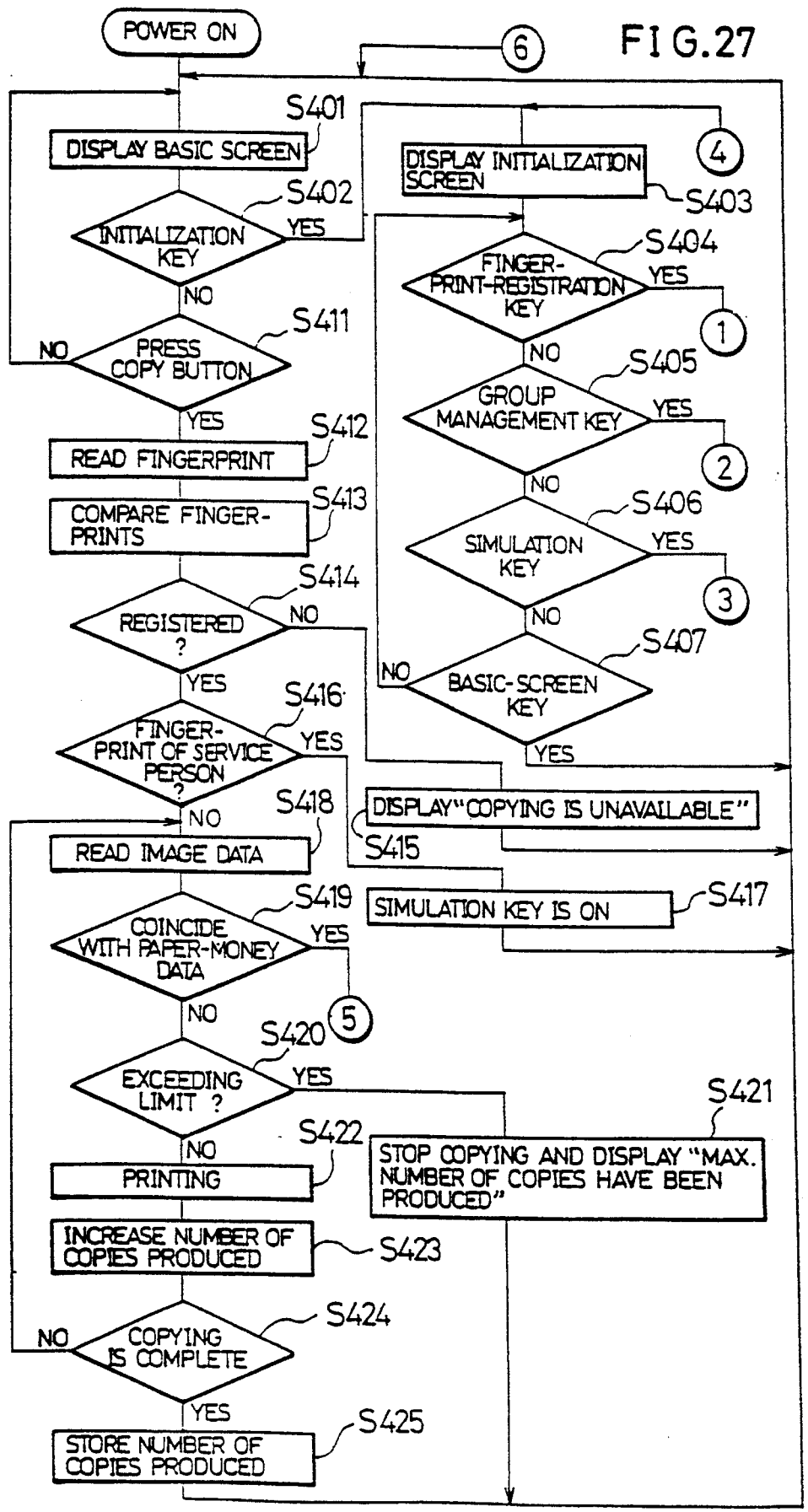
FIG. 27 is a flowchart of copying procedure in the copying machine.
Figure 28:
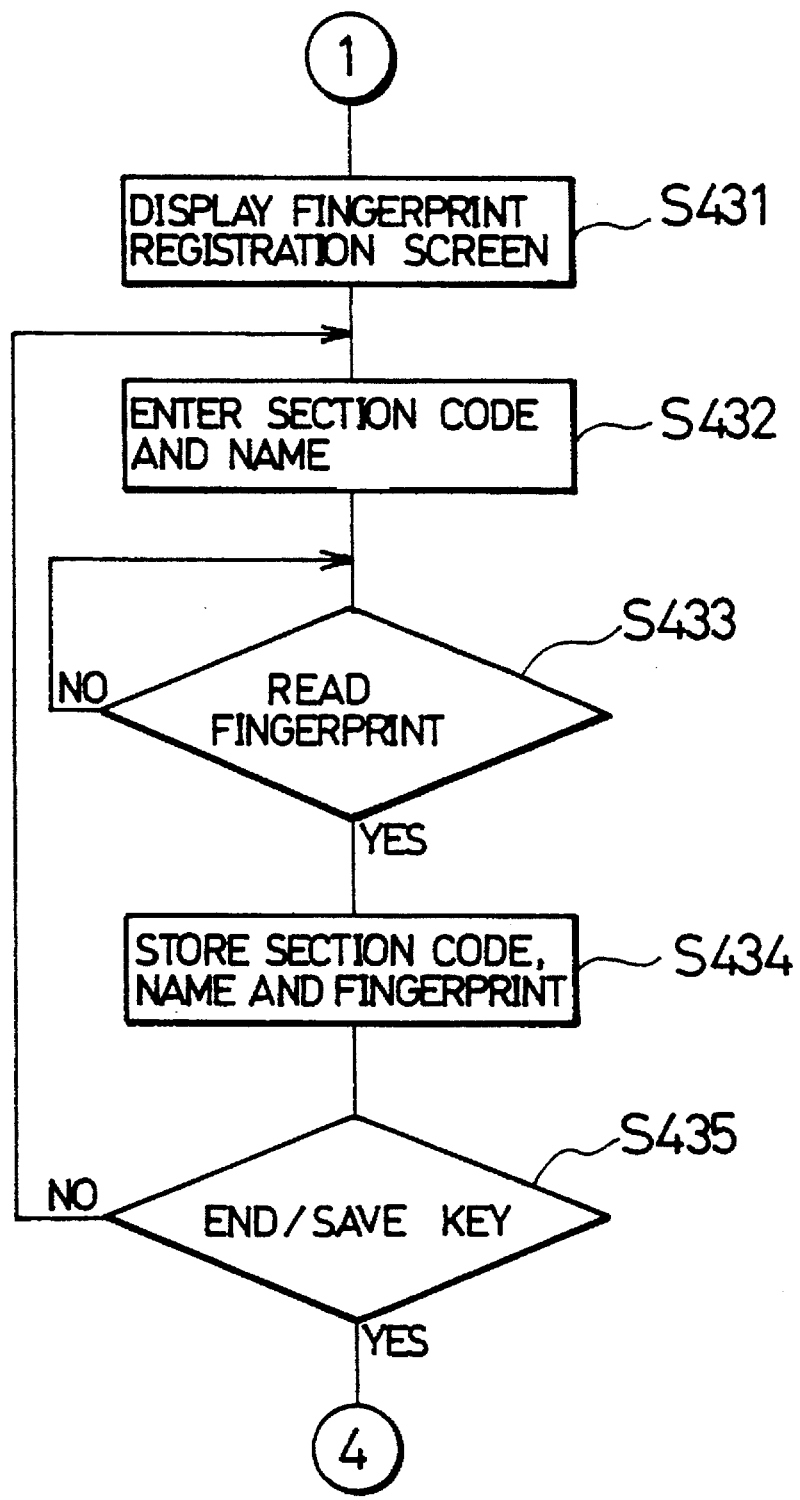
FIG. 28 is a flowchart showing steps of fingerprint registration process in the copying procedure.
Figure 29:
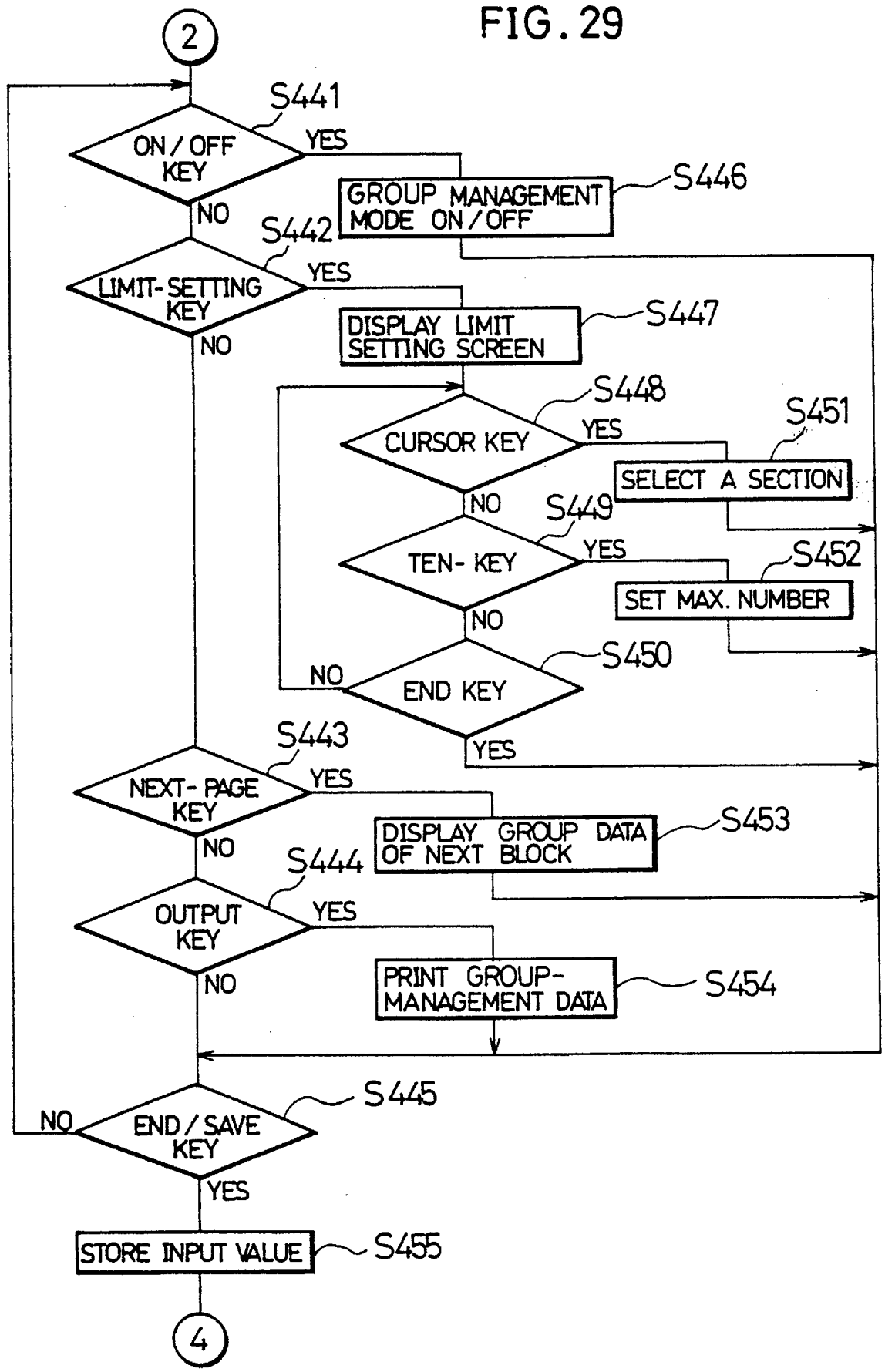
FIG. 29 is a flowchart showing steps of processing in a group management mode in the copying procedure.
Figure 30:
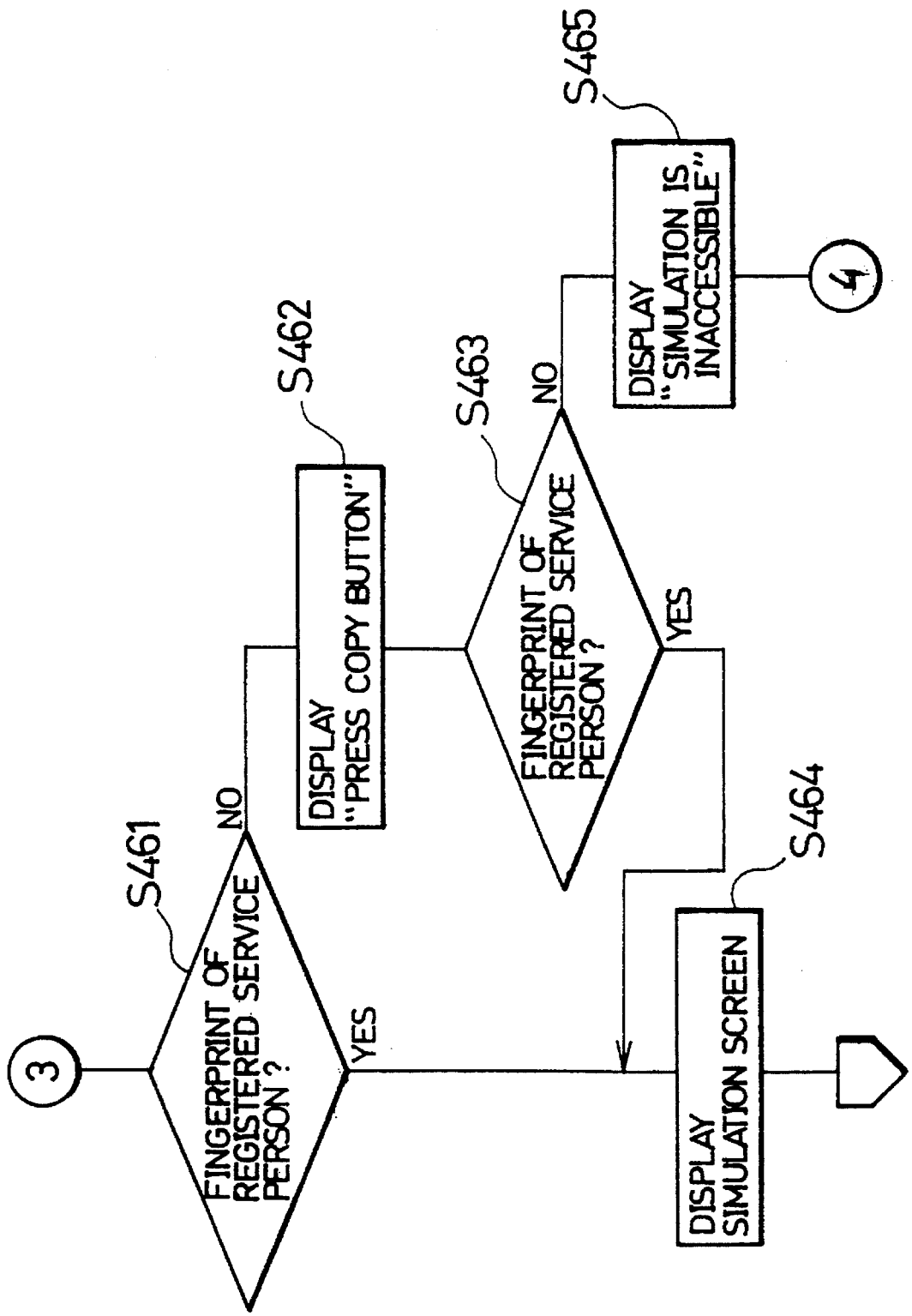
FIG. 30 is a flowchart showing steps of processing in a simulation mode in the copying procedure.

First, the fingerprint registration procedure is explained with reference to the flowcharts of FIGS. 27 and 28.

The basic screen shown in FIG. 25(a) is initially displayed on the liquid crystal panel 171 (step 401). When the operator touches the initialization key displayed on the basic screen (step 402), the initialization screen shown in FIG. 26(a) is displayed on the liquid crystal panel 171 (step 403). When the operator touches the fingerprint registration key 160a on the initialization screen (step 404), a fingerprint registration mode is selected and the fingerprint registration screen shown in FIG. 26(b) is displayed on the liquid crystal panel 171 (step 431).

The fingerprint registration screen shows a group-code section 161a, a name display section 161b, an alphabet-key 161c, a ten-key 161d and a setting enter key 161e.

The group code and the name of an operator are entered using the alphabet-key 161c and the ten-key 161d or the ten-key 172 on the operation panel (step 432). Then, when the copy button 173 on the operation panel is depressed with a finger, the fingerprint of the operator is read by a CCD sensor in the copy button 173 (step 433). The fingerprint thus read is stored together with the group code and name on the hard disk 147 (see step 434). In step 434, the data including the group code, name and the image of the fingerprint is transmitted to the PCU 141 by the communications between the OPU 142 and the PCU 141 shown in FIG. 21, and the data is also transmitted to the ICU 143 from the PCU 141 and stored on the hard disk 147 in the same manner.

The registration of the fingerprint is complete by depressing the setting entry key 161e.

It is possible to prevent, for example, a person who does not belong to specified groups from unjustly registering his fingerprint by requesting an entry of a predetermined person identification number before the registration process.

The fingerprint of a service engineer who performs the maintenance of the copying machine 40 is also be registered in the same manner as the registration of the fingerprints of users. However, in order to distinguish the service engineer from ordinary users, it is necessary to input particular data for identifying the service engineer. For example, the service engineer is required to input "SERV" representing service engineers and a numeric number given to each service engineer after "SERV". In short, for example, "SERV1" and "SERV2" need to be input for identifying the service engineers instead of a group code and name. With this arrangement, when the fingerprint of a service engineer is registered, the service engineer is identified and registered.

An operator who is recognized as a service engineer is allowed to start the simulation mode explained in EMBODIMENT 1. In this embodiment, the copying machine 40 is prearranged so that ordinary operators are allowed to start only the copying mode and service engineers are permitted to start only the simulation mode. Namely, operators can not select modes. However, it is also possible to arrange the copying machine 40 such that an operator is allowed to start some modes to which a group to which the operator belongs is permitted to access. In short, the operator is permitted to select a mode from the accessible modes.

Next, the procedure for setting copy conditions of the individual group in the section-management mode is explained.

When a section-management key 160b in the initialization screen of FIG. 26(a) is touched (step 405), the group management screen shown in FIG. 26(c) is displayed on the liquid crystal panel 171. The group management screen includes a display area 162g, ON/OFF keys 162a and 162b, an output key 162c, a limit key 162d, a next-page key 162e, and a setting entry key 162f.

In the display area 162g, data of each group, such as the number of registered people, the total number of copies produced, a maximum number of copies permitted to be produced, is displayed together with the group code. When the next-page key 162e is depressed (step 443), the data of the next group is displayed (step 453).

The section-management mode is activated or terminated (step 446) by touching the ON/OFF key 162a and 162b (step 441). Registering operators and counting the number of copies produced for each group are carried out in the group-management mode.

When the limit key 162d is touched (step 442), the limit setting screen shown in FIG. 26(d) is displayed (step 447). The limit setting screen includes cursor keys 163a and 163b, a ten-key 163c, a end/save key 163d, and a limit display section 163e.

A group which is allowed to set the limit for the number of copies to be produced is selected (step 451) by touching the cursor keys 163a and 163b (step 448). A maximum number of copies allowed to be produced by the group selected in step 451 is set (step 452) by using the ten-key 163c (step 449). If setting of the maximum number of copies is not required, the ∞ key is touched. When the end/save key 163d is depressed (step 450), the screen returns to the group management screen from the limit setting screen.

The output key 162c in the group management screen of FIG. 26(c) is provided for printing the number of copies counted for each group. When the output key 162c is touched (step 444), the data of each group such as the number of copies produced which has been stored on the hard disk 147 is printed out (step 454).

In the group management screen, when the setting entry key 162f is touched (step 445), the entered settings are stored on the hard disk 147 and the screen returns to the initialization screen from the group management screen (step 455). Storing the various settings on the hard disk 147 is executed in the same manner as the registration of fingerprint.

In the initialization screen, the simulation key 160c is usually flashing as shown in FIG. 26(a). When the simulation key 160c is touched (step 406), a massage "press copy button" is displayed (step 462).

When the copy button 173 is depressed in this state, the fingerprint of the operator is read by the CCD sensor in the copy button 173 as described above, and compared with the fingerprints of service engineers stored on the hard disk 147 (step 463). When the read fingerprint is judged the fingerprint of a service engineer, the execution of simulation is permitted, and the simulation screen shown in FIG. 26(e) is displayed. On the other hand, when a fingerprint is not input or when an input fingerprint does not coincides with the fingerprint of a service engineer stored on the hard disk 147, a warning message "simulation mode is inaccessible" is displayed, and the initialization screen is displayed again (step 465).

In the case when a fingerprint is read before the simulation key 160c is touched and the read fingerprint is judged a service engineer's fingerprint (steps 411→412→413→414→416), the simulation key 160c is turned on (step 417).

With this structure, since simulation is executable only when the fingerprint of a service engineer is recognized, simulation can never be performed by operators other than the service engineer. Therefore, unlike a conventional device, it is not necessary to perform complicated key operations for executing simulation in order to prevent an unregistered person from performing simulation. In short, the above-mentioned structure simplifies the procedure for performing simulation and reduces the work of the service engineer.

In the initialization screen, when the basic-screen key 160d is depressed (step 407), the basic screen is displayed (step 401).

In the basic screen, keys other than the initialization key, namely the function key, image-quality key, and post-processing key are used for setting copying conditions for a copying operation. When these keys are depressed, a function setting screen, an image-quality setting screen, and a post-processing setting screen are displayed and moved from an upper position to a lower position on the screen as shown in FIG. 24 according to an input of the operator. The operator is able to change the settings of copying conditions related to, for example, image quality and post-processing by entering necessary information on the screens.

The normal copying procedure is explained below.

When the copy button 173 is depressed (step 411) after setting necessary copying conditions as described above, the fingerprint of an operator is read (step 412). The read finger print is compared with the fingerprints stored on the hard disk 147 (step 413). If the read fingerprint is judged the fingerprint of a registered user, the copying operation is permitted. When the read fingerprint is judged the fingerprint of a registered service engineer, the simulation key 160c is turned on as mentioned above. On the other hand, when the fingerprint does not coincide with any of the registered fingerprints of users and service engineers, the processing is cleared, a message "copying is unavailable" is displayed (step 415) and the basic screen is displayed again (step 401).

When copying processing is permitted as described above, the scanner 22 reads the image data of a document placed on the document platen 41 (step 418). The image data read is processed in the ICU 143 shown in FIG. 23 and temporarily stored in the memory 152 of the ICU 143.

Next, the image data stored in the memory 152 is compared with the image data of paper money stored on the hard disk 147. If the image data coincides with the stored image data (step 419), counterfeiting preventive processing shown in the flowchart of FIG. 31 is executed.

Figure 31:
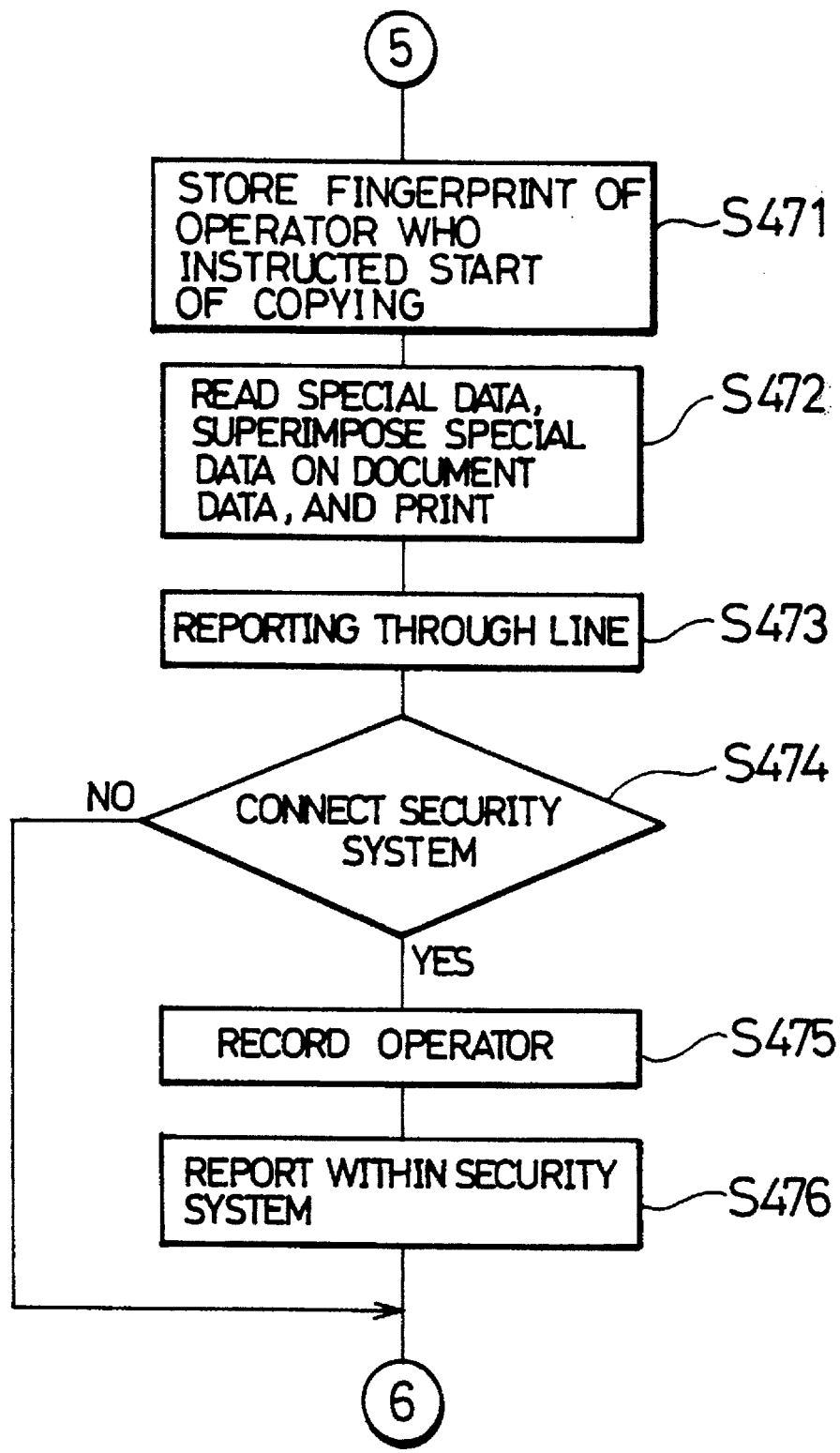
FIG. 31 is a flowchart showing steps of processing in the copying procedure for producing copies of a copy-prohibited document such as paper money.

In this counterfeiting preventive processing, as shown in FIG. 31, the fingerprint of the operator is first stored on the hard disk 147 (step 471), and copying is performed. In this case, however, special data stored on the hard disk 147, for example, data such as a pattern of toner spots is added when generating image data in the ICU 143 so that the generated image is clearly recognized as a counterfeit image. Then, the generated image data is printed out by the laser control unit 146 (step 472). At this time, the fact that counterfeiting paper money is taking place is reported to and the fingerprint data of the counterfeiter is sent to the police (step 473).

It is not necessary to perform counterfeiting preventive processing in the manner shown in steps 471 to 473. For instance, the counterfeiting preventive processing explained in the above-mentioned embodiments may be applied to the processing in steps 16 to 23 in the flowchart shown in FIG. 1 of EMBODIMENT 1 so that fingerprint data is used instead of an ID number.

As for a security system for the copying machine 40, the fact that counterfeiting paper money is taking place can be reported to nearby security guards by installing a security video for recording the vicinity of the copying machine 40 and providing extension lines through which the circumstance is reported to a monitor room of the copying machine 40 (steps 474 to 476).

When the read image data does not coincide with the image data of copying-prohibited material such as paper money in step 419, the set maximum number of copies which is allowed to be produced by a group to which the fingerprint of the operator belong is checked. At this time, if the number of copies produced exceeds the set maximum number (step 420), a warning message "max. number of copies have been produced" is displayed on the operation panel, and copying is prohibited (step 421).

On the other hand, if the number of copies produced does not exceed the set maximum number in step 420, printing is actually performed. More specifically, the image data is read out from the memory 152, sent to the laser control unit 146 and printed (step 422). After the process in step 422 is complete, the number of printed copies is added to the number of copies produced by the group of the operator (step 423). When all the processes set by the operator is completed (step 424), the number of copies produced, the date and time of copying, the group code and name of the operator, are stored on the hard disk 147. Then, the copying machine 40 returns to the initial state (step 425).

As described above, the counterfeiting preventive device in the copying machine of this embodiment recognizes an operator based on a fingerprint. This structure prevents people who do not belong to registered groups from using the copying machine by unjustly obtaining an ID number and an ID card. As for people who belong to the registered groups, if their fingerprints are not registered, they are not permitted to use the copying machine. Furthermore, since the details of the use of the copying machine are stored, unjust use of the copying machine is almost perfectly prevented.

In addition, for example, since a maximum number of copies allowed to be produced by each group is individually set, it is possible to avoid a copying bill which exceeds a predetermined budget for copying.

With the above-mentioned structure, the fingerprints of service engineers are registered in advance, the fingerprint of an operator is compared with the registered fingerprints, and only an operator who is recognized as a registered service engineer is allowed to execute simulation. Therefore, unlike a conventional device, it is not necessary to perform complicated key operations for executing simulation so as to prevent ordinary users from accessing to the simulation mode by mistakenly operating keys. Hence, this structure enables the execution of simulation with a simplified procedure. It is thus possible to reduce the work of service engineers.

If an attempt to produce copies of a copying-prohibited document such as paper money is made, an external security system is activated to prohibit the copying operation. Moreover, since the fingerprint of the operator is stored, a manhunt for the counterfeiter is facilitated. Furthermore, copies of such copying-prohibited documents are printed with a pattern for indicating the produced documents are copies. Namely, copies produced from copying-prohibited documents can not be used as real documents, thereby preventing crimes.

Reading the fingerprint of an operator is carried out using a copy button which needs to be depressed when performing normal copying operations. With this arrangement, the operator may not have an uncomfortable feeling when his fingerprint is being read. Finally, since extra actions, for example, entering an ID number and inserting an ID card are not required, the procedure is simplified.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image forming apparatus comprising:

a memory;

image reading means for reading an image on a document and converting the image into image data;

image printing means for forming an image on a sheet based on the image data;

identification-information input means for inputting operator identification information for identifying an operator;

image processing means for processing the image data for comparison with a specific image;

specific-image judging means for judging whether the image data is the specific image based on an output from said image processing means;

memory controlling means for storing operation status information including at least the operator identification information of an operator who has tried to carry out an image forming process from the specific image in said memory when the image data obtained from the document is judged to be the specific image by said specific-image judging means; and operation controlling means for storing pre-registered operator identification information and controlling said image printing means to form an image that is an exact copy of the image data only when operator identification information inputted by an operator coincides with the pre-registered operator identification information and is not included in the operation status information that has been stored in said memory.

2. The image forming apparatus according to claim 1, further comprising operation status information printing means for printing out the operation status information stored in said memory.

3. The image forming apparatus according to claim 1, further comprising:

warning means for giving a warning to an operator, said operation controlling means controlling said warning means to give a warning to an operator when operator identification information input by the operator through said identification-information input means coincides with the operator identification information stored in said memory.

4. The image forming apparatus according to claim 1, wherein said image printing means comprises:

full-color printing means for forming an image in full color on a sheet by reproducing the color of the document, said operation controlling means prohibiting said full-color printing means from operating when operator identification information input by an operator through said identification-information input means coincides with the operator identification information stored in said memory.

5. The image forming apparatus according to claim 1, wherein said image printing means comprises:

photograph-mode printing means for forming on a sheet an image with gradations which are faithful reproductions of gradations of the image of the document, said operation controlling means prohibiting said photograph-mode printing means from operating when operator identification information input by an operator through said identification-information input means coincides with the operator identification information stored in said memory.

6. The image forming apparatus according to claim 1, wherein said operation controlling means limits an available number of sheets on which an image is to be formed to a predetermined number when operator identification information input by an operator through said identification-information input means coincides with the operator identification information stored in said memory.

7. The image forming apparatus according to claim 1, wherein said image printing means comprises:

double-side printing means for forming images on both sides of a sheet by forming images on each side of the sheet and by automatically transporting, reversing and determining respective positions of the sheet and the document, said operation controlling means prohibiting said double-side printing means from operating when operator identification information input by an operator through said identification-information input means coincides with the operator identification information stored in said memory.

8. The image forming apparatus according to claim 1, further comprising:

a sheet feed cassette for feeding sheets of a standard size; and a manual sheet feed section for feeding sheets of desired sizes, said image printing means including sheet feeding means for selectively feeding a sheet from said sheet feed cassette or said manual sheet feed section, said operation controlling means prohibiting said sheet feeding means from feeding a sheet from said manual sheet feed section when operator identification information input by an operator through said identification-information input means coincides with the operator identification information stored in said memory.

9. An image forming apparatus comprising:

a memory;

image reading means for reading an image on a document and converting the image into image data;

image printing means for forming an image on a sheet based on the image data;

identification-information input means for inputting operator identification information for identifying an operator;

operation controlling means for storing pre-registered operator identification information and controlling said image printing means to form an image only when operator identification information input by an operator coincides with the pre-registered operator identification information;

image processing means for processing the image data for comparison with a specific image;

specific-image judging means for judging whether the image data is the specific image based on an output from said image processing means;

memory controlling means for storing operation status information including at least the operator identification information of an operator who has tried to carry out an image forming process from the specific image in said memory means when the image data obtained from the document is judged to be the specific image by said specific-image judging means; and operation status information output means for reading out the operation status information stored in said memory and for displaying or printing the information.

10. The image forming apparatus according to claims 1 or 9, wherein said memory is a non-volatile memory that retains data stored therein even when supply of power is cut off.

11. The image forming apparatus according to claims 1 or 9, further comprising:

a backup power source for supplying power to said memory when supply of power to a main body of the image forming apparatus is cut off.

12. The image forming apparatus according to claims 1 or 9, wherein said memory is a recording medium which is freely installed in or removed from a main body of the image forming apparatus while retaining data stored thereon.

13. The image forming apparatus according to claim 12, wherein said recording medium is locked with a lock which is unlocked only by a key possessed by a specific manager.

14. The image forming apparatus according to claims 1 or 9, further comprising:

transmitting means for transmitting data to an external device through a communication network; and transmission controlling means for controlling said transmitting means to transmit the operation status information including at least the operator identification information to said external device when said specific-image judging means judges that the image data obtained from the document is a specific image.

15. The image forming apparatus according to claims 1 or 9, wherein said identification-information input means comprises:

an identification-information recording medium which is possessed by an operator and on which operator identification information is recorded; and identification-information reading means, installed in a main body of the image forming apparatus, for reading the operator identification information from said identification-information recording medium.

16. The image forming apparatus according to claims 1 or 9, further comprising information-storage indicating means for indicating that the operation status information has been stored in said memory by said memory controlling means.

17. The image forming apparatus according to claims 1 or 9, wherein said identification-information input means includes fingerprint reading means for reading a fingerprint of an operator as operator identification information.

18. The image forming apparatus of claim 17, further comprising:

management-information storage means in which a fingerprint of an operator and at least a group to which the operator belongs are registered as operator management information; and fingerprint comparing means for judging whether an operator is a registered operator based on a fingerprint of the operator read by said fingerprint reading means and the registered operator management information in said management-information storing means and judging a group to which the operator belongs based on the operator management information when the operator is judged a registered operator, said operation controlling means permitting the operator to start a predetermined operation mode which the group to which the operator belongs is allowed to access.

19. The image forming apparatus according to claim 18, wherein said memory controlling means stores as operation status information at least the fingerprint of the operator in said memory when said specific-image judging means judges that the image data is the specific image, said output controlling means controlling said image processing means to generate an output image by adding a predetermined pattern to the image data when said specific-image judging means judges that the image data is a specific image.

20. The image forming apparatus according to claim 18, further comprising:

transmitting means for transmitting a warning to an external security system through a communication network; and transmission controlling means for controlling said transmitting means to transmit the warning to said external security system when said specific-image judging means judges that the image data is the specific image.

21. The image forming apparatus according to claim 18, wherein said fingerprint reading means includes an optical sensor installed in a switch which is to be depressed with a finger of an operator.

22. The image forming apparatus according to claim 21, wherein said switch is depressed by an operator to instruct a start of forming an image.

23. The image forming apparatus according to claim 18, wherein said management-information storage means comprises a non-volatile memory.

24. The image forming apparatus according to claim 18, wherein, when an operator is judged a registered operator by said fingerprint comparing means and when a group to which the operator belongs is permitted access to only one operation mode, said operation controlling means immediately activates the operation mode.

25. The image forming apparatus according to claim 18, further comprising:

a screen, said output controlling means displaying a plurality of operation modes which an operator is permitted to operate; and mode selecting means for selecting an operation mode to be activated from the operation modes displayed on said screen, said operation controlling means activating the operation mode selected by the operator through said mode selecting means.

26. The image forming apparatus according to claim 18, further comprising:

password input means through which an operator inputs a password; and password comparing means for judging whether a password input by an operator coincides with a predetermined password, said operation controlling means permitting the operator to activate a management-information registration mode for registering operator management information of the operator only when said password comparing means judges that the input password coincides with the predetermined password.

27. The image forming apparatus according to claim 18, wherein a fingerprint of a service engineer is registered as special operator management information which is distinguished from operator management information of ordinary operators in said management-information storage means, said fingerprint comparing means judging whether an operator is a service engineer based on a fingerprint of the operator read by said fingerprint reading means and the special operator management information, and said operation controlling means permitting the operator to activate a simulation mode to which only service engineers are allowed to access when said fingerprint comparing means judges that the operator is a service engineer.

28. The image forming apparatus according to claim 18, further comprising:

output means for outputting a sheet having thereon a formed image;

counting means for counting a total number of sheets output by said output means for each group;

upper limit setting means for setting a maximum number of sheets allowed to be output by each group, said operation controlling means prohibiting an operator belonging to a group which has output the set maximum number of sheets from performing an image forming operation.

29. The image forming apparatus according to claim 28, further comprising:

a screen; and output controlling means for displaying on said screen group information including a total number of sheets output and a set maximum number of sheets allowed to be output by each group.

30. The image forming apparatus according to claim 28, further comprising output controlling means for printing out group information including a total number of sheets output and a set maximum number of sheets allowed to be output by each group.

31. The image forming apparatus according to claim 28, wherein said upper limit setting means includes infinity setting means for setting infinity as a maximum number of sheets to be output for a group which is free to output a desired number of sheets.

32. The image forming apparatus according to claim 9, wherein the operation status information stored in said memory is read out only by an operator who input predetermined operator identification information.

33. The image forming apparatus according to claim 9, further comprising:

initialization permitting means for judging whether to permit an operator to input an instruction to erase the operation status information stored in said memory, said memory controlling means erasing the operation status information from said memory according to the instruction of the operator only when said initialization permitting means permits the operator to input the instruction.

34. The image forming apparatus according to claim 33, wherein said initialization permitting means comprises:

a separate member provided separate from the image forming apparatus, having a unique feature and possessed by a predetermined manager; and a main member arranged in a main body of the image forming apparatus and having a unique feature corresponding to the unique feature of said separate member, said initialization permitting means comparing the unique feature of said separate member with the unique feature of said main member and permitting the operator to input the instruction only when the unique feature of said separate member coincides with the unique feature of said main member.

35. The image forming apparatus according to claim 34, wherein said separate member is a key, and said main member is a keyhole into which said key is inserted.

36. The image forming apparatus according to claim 33, wherein said initialization permitting means comprises:

password input means through which an operator inputs a password;

password memory means for storing pre-registered passwords; and password comparing means for comparing a password input by the operator with the pre-registered passwords, said initialization permitting means permitting the operator to input the instruction only when the input password coincides with one of the pre-registered passwords.

37. The image forming apparatus according to claim 9, further comprising:

initialization permitting means for determining whether an instruction, which is input by an operator to erase the operation status information stored in said memory, is effective or not, said memory controlling means erasing the operation status information from said memory only when said initialization permitting means determines that the instruction input by the operator is effective.

38. The image forming apparatus according to claim 37, wherein said initialization permitting means comprises:

a separate member provided separate from the image forming apparatus, having a unique feature and possessed by a predetermined manager; and a main member arranged in a main body of the image forming apparatus and having a unique feature corresponding to the unique feature of said separate member, said initialization permitting means comparing the unique feature of said separate member with the unique feature of said main member and determining that the instruction input by the operator is effective only when the unique feature of said separate member coincides with the unique feature of said main member.

39. The image forming apparatus according to claim 37, wherein said initialization permitting means comprises:

password input means through which an operator inputs a password;

password memory means for storing pre-registered passwords; and password comparing means for comparing a password input by the operator with the pre-registered passwords, said initialization permitting means determining that the instruction input by the operator is effective only when the input password coincides with one of the pre-registered passwords.

40. The image forming apparatus according to claim 9, further comprising:

a clock for outputting date and time, the operation status information further including date and time which are output from said clock when said specific-image judging means judges that the image data obtained from the document is the specific image.

41. The image forming apparatus according to claim 9, further comprising:

number setting means through which an operator sets a number of sheets to be output, the operation status information further including the number of sheets to be output, which was set through said number setting means, when said specific-image judging means judges that the image data obtained from the document is the specific image.

42. The image forming apparatus according to claim 9, further comprising:

image-size detecting means for detecting a size of the image from the document, the operation status information further including a size of the image detected by said image-size detecting means based on a document whose image data was judged the specific image by said specific-image judging means.

43. The image forming apparatus according to claim 9, wherein the operation status information further includes the image data which was judged the specific image by said specific-image judging means.

44. The image forming apparatus according to claim 9, further comprising:

character-area separating means for separating the image data obtained from the document into a character area and another area, the operation status information further including image data of the character area separated from the image data which was judged the specific image by said specific-image judging means.

45. The image forming apparatus according to claim 9, further comprising:

data compressing means for compressing an amount of the image data obtained from the document, the operation status information further including the image data which was judged the specific image by said specific-image judging means and compressed by said data compressing means.

46. The image forming apparatus according to claim 45, wherein said data compressing means compresses the amount of the image data by converting an image density of the image data into a binary number based on a predetermined threshold value.

47. The image forming apparatus according to claim 45, wherein said data compressing means compresses the amount of the image data by converting an image density of the image data into a binary number using a dither method.

48. The image forming apparatus according to claim 45, wherein said data compressing means compresses the amount of the image data by converting an image density of the image data into a binary number using an error diffusing method.

49. An image forming method, which is used in an image forming apparatus capable of forming images in a full-color mode, comprising the steps of:

receiving operator identification information that has been inputted by an operator;

judging whether or not image data representing an image to be formed contains a specific image;

storing operator identification information of an operator who has tried to carry out an image forming process from the image data containing the specific image; and upon receipt of an instruction for forming an image from an operator, judging whether or not the operator identification information of the operator has been stored as the operator identification information of an operator who has previously tried to carry out an image forming process from image data containing the specific image, prior to the image forming process, and if stored prohibiting the formation of the image in the full-color mode.

50. An image forming method, which is used in an image forming apparatus capable of forming images in a photograph mode wherein gradations of an image of a document is reproducible, comprising the steps of:

receiving operator identification information that has been inputted by an operator;

judging whether or not image data to be used in an image forming process contains a specific image;

storing operator identification information of an operator who has tried to carry out an image forming process from the image data containing the specific image if it is judged that the image data contains the specific image; and upon receipt of an instruction for forming an image from an operator, judging whether or not the operator identification information of the operator has been stored as the operator identification information of an operator who has previously tried to carry out an image forming process from image data containing the specific image, prior to the image forming process, and if stored prohibiting the formation of an image in the photograph mode.

51. An image forming method, which is used in an image forming apparatus capable of forming images in a double-sided copy mode wherein images on both sides of a document are copied on respective sides of a sheet of paper, comprising the steps of:

receiving operator identification information that has been inputted by an operator;

judging whether or not image data to be used in an image forming process contains a specific image;

storing the operator identification information of an operator who has tried to carry out an image forming process from the image data containing the specific image if it is judged that the image data contains the specific image; and upon receipt of an instruction for forming an image from an operator, judging whether or not the operator identification information of the operator has been stored as the operator identification information of an operator who has previously tried to carry out an image forming process from image data containing a specific image, prior to the image forming process, and if stored prohibiting formation of an image in the double-sided copy mode.

52. An image forming apparatus comprising:

a memory;

receiving means for receiving image data which has transmitted together with operator identification information by an operator from an external device through a communication network;

image printing means for forming an image on a sheet of paper based on the image data;

image processing means for processing the image data for comparison with a specific image;

specific-image judging means for judging whether the image data is the specific image based on an output of said image processing means;

memory controlling means for storing operation status information including at least the operator identification information of an operator who has tried to carry out an image forming process from the specific image in said memory when the image data obtained from the document is judged to be the specific image by said specific-image judging means; and operation controlling means for storing pre-registered operator identification information and controlling said image printing means to form an image that is an exact copy of the image data only when the operator identification information inputted by an operator coincides with the pre-registered operator identification information and is not included in the operation status information that has been stored in said memory.

53. An image forming apparatus comprising:

a memory;

identification-information input means for inputting operator identification information for identifying an operator;

image reading means for reading an image on a document and converting the image into image data;

transmitting means for transmitting the image data to an external device through a communication network;

image processing means for processing the image data for comparison with a specific image;

specific-image judging means for judging whether the image data is the specific image based on an output of said image processing means;

memory controlling means for storing operation status information including at least the operator identification information of an operator who has tried to carry out an image forming process from the specific image in said memory when the image data obtained from the document is judged as the specific image by said specific-image judging means;

identification-information judging means for judging whether operator identification information input by an operator through said identification-information input means coincides with the operator identification information stored in said memory; and operation controlling means for prohibiting said image reading means from reading an image when said identification-information judging means judges that the input operator identification information coincides with the operator identification information stored in said memory.

54. An image forming apparatus comprising:

a memory;

identification-information input means for inputting operator identification information for identifying an operator;

image processing means for processing image data obtained from a document for comparison with a specific image;

specific-image judging means including a first criterion and a second criterion, for judging whether the image data is a specific image in accordance with an output of said image processing means based on the first criterion, and further judging whether the image data is the specific image in accordance with the output based on the second criterion when the image data is judged different from the specific image based on the first criterion, the second criterion being more severe than the first criterion so that the image data is more likely to be judged identical to the specific image based on the second criterion;

operation controlling means for prohibiting forming an image when said specific-image judging means judges that the image data is the specific image based on the first criterion;

memory controlling means for storing operation status information including the operator identification information of an operator who has tried to carry out an image forming process from image data containing the specific image in said memory when said specific-image judging means judges that the image data is the specific image based on the second criterion;

identification-information judging means for judging whether operator identification information input by an operator through said identification-information input means coincides with the operator identification information stored in said memory; and criteria controlling means for changing the first criterion to be closer to the second criterion when said identification-information judging means judges that the input operator identification information coincides with the operator identification information stored in said memory.

55. An image forming method for use in an image forming apparatus including a memory, comprising the steps of:

a) judging whether image data obtained from a document is a specific image based on a first criterion;

b) prohibiting formation of an image when the image data is judged identical to the specific image in said step a);

c) judging whether the image data is the specific image based on a second criterion when the image data is judged different from the specific image based on the first criterion in said step a), the second criterion being more severe than the first criterion so that image data is more likely to be judged identical to the specific image based on the second criterion; and d) storing operator identification information of an operator who has tried to carry out an image forming process from image data containing the specific image as specific operator identification information in the memory when the image data is judged the specific image in said step c).

56. The image forming method according to claim 55, further comprising the steps of:

e) judging whether operator identification information input by an operator coincides with the specific operator identification information stored in the memory prior to said step a); and f) changing the first criterion to be closer to the second criterion prior to said step a) when the operator identification information is judged identical to the specific operator identification information in said step e).

57. An image forming apparatus comprising:

a memory;

receiving means for receiving image data which was transmitted together with operator identification information by an operator from an external device through a communication network;

image printing means for forming an image on a sheet of paper based on the image data;

image processing means for processing the image data for comparison with a specific image;

specific-image judging means for judging whether the image data is the specific image based on an output of said image processing means;

memory controlling means for storing operation status information including at least the operator identification information of an operator who has tried to carry out an image forming process from the specific image in said memory when the image data obtained from the document is judged as the specific image by said specific-image judging means; and operation status information output means for reading out the operation status information stored in said memory and for displaying or printing the information.

58. An image forming apparatus comprising:

a memory;

identification-information input means for inputting operator identification information for identifying an operator;

image reading means for reading an image on a document and converting the image into image data;

transmitting means for transmitting the image data to an external device through a communication network;

image processing means for processing the image data for comparison with a specific image;

specific-image judging means for judging whether the image data is the specific image based on an output of said image processing means;

memory controlling means for storing operation status information including at least the operator identification information of an operator who has tried to carry out an image forming process from the specific image in said memory when the image data obtained from the document is judged as the specific image by said specific-image judging means; and operation status information output means for reading out the operation status information stored in said memory and for displaying or printing the information.

* * * * *